US011979656B2

(12) United States Patent
Fleizach et al.

(10) Patent No.: US 11,979,656 B2
(45) Date of Patent: May 7, 2024

(54) DEVICES, METHODS, AND GRAPHICAL USER INTERFACES FOR ASSISTED PHOTO-TAKING

(71) Applicant: Apple Inc., Cupertino, CA (US)

(72) Inventors: Christopher B. Fleizach, Gilroy, CA (US); Darren C. Minifie, Santa Cruz, CA (US); Eryn R. Wells, San Francisco, CA (US); Nandini Kannamangalam Sundara Raman, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/979,667

(22) Filed: Nov. 2, 2022

(65) Prior Publication Data

US 2023/0047300 A1    Feb. 16, 2023

Related U.S. Application Data

(63) Continuation of application No. 17/327,461, filed on May 21, 2021, now Pat. No. 11,588,969, which is a
(Continued)

(51) Int. Cl.
*H04N 23/60* (2023.01)
*H04N 23/611* (2023.01)
*H04N 23/63* (2023.01)

(52) U.S. Cl.
CPC ........... *H04N 23/64* (2023.01); *H04N 23/611* (2023.01); *H04N 23/632* (2023.01)

(58) Field of Classification Search
CPC ..... H04N 23/64; H04N 23/611; H04N 23/632
See application file for complete search history.

(56) References Cited

U.S. PATENT DOCUMENTS 9,579,236 B2 *   2/2017   Amedi ................. G09B 21/007
9,674,396 B1 *   6/2017   Pashintsev ......... H04N 1/00442
(Continued)

OTHER PUBLICATIONS

Office Action, dated Jul. 21, 2020, received in U.S. Appl. No. 16/586,852, 16 pages.
(Continued)

*Primary Examiner* — Yogesh K Aggarwal
(74) *Attorney, Agent, or Firm* — Morgan, Lewis & Bockius LLP

(57) ABSTRACT

An electronic device with a camera obtains, with the camera, one or more images of a scene. The electronic device detects a respective feature within the scene. In accordance with a determination that a first mode is active on the device, the electronic device provides a first audible description of the scene. The first audible description provides information indicating a size and/or position of the respective feature relative to a first set of divisions applied to the one or more images of the scene. In accordance with a determination that the first mode is not active on the device, the electronic device provides a second audible description of the plurality of objects. The second audible description is distinct from the first audible description and does not include the information indicating the size and/or position of the respective feature relative to the first set of divisions.

36 Claims, 39 Drawing Sheets

Related U.S. Application Data continuation of application No. 16/586,852, filed on Sep. 27, 2019, now Pat. No. 11,025,815.

(60) Provisional application No. 62/739,177, filed on Sep. 29, 2018.

(56) References Cited

U.S. PATENT DOCUMENTS

| | | |
|---|---|---|
| 2005/0208457 A1* | 9/2005 | Fink .................. G09B 21/00 434/112 |
| 2014/0192247 A1 | 7/2014 | Cheong et al. |
| 2014/0282002 A1 | 9/2014 | McKiel, Jr. |
| 2014/0314391 A1 | 10/2014 | Kim et al. |
| 2018/0114054 A1 | 4/2018 | Dow et al. |
| 2018/0210697 A1 | 7/2018 | Rakshit |
| 2018/0308241 A1 | 10/2018 | Johnston |
| 2019/0158731 A1 | 5/2019 | Demarty et al. |
| 2019/0208116 A1 | 7/2019 | Paul |
| 2020/0106955 A1 | 4/2020 | Fleizach et al. |
| 2021/0281746 A1 | 9/2021 | Fleizach et al. |

OTHER PUBLICATIONS

Notice of Allowance, dated Feb. 3, 2021, received in U.S. Appl. No. 16/586,852, 6 pages.

Office Action, dated Apr. 13, 2022, received in U.S. Appl. No. 17/327,461, 11 pages.

Office Action, dated Sep. 30, 2022, received in U.S. Appl. No. 17/327,461, 6 pages.

* cited by examiner

600

602
At an electronic device, obtain one or more images of a scene

604
The device includes a camera. Detect, using one or more sensors, an orientation of a first axis of the electronic device relative to a respective vector. In accordance with a determination that the first axis of the electronic device has moved within a predefined range of the respective vector, provide a first audible and/or tactile indication that the camera is obtaining level images of the scene.

606
In accordance with a determination that the orientation of the first axis of the electronic device has moved outside of the predefined range of the respective vector, provide a second audible and/or tactile indication. The second audible and/or tactile indication indicates that the camera is not obtaining level images of the scene.

608
In accordance with a determination that the orientation of the first axis of the electronic device meets movement threshold criteria upon moving within the predefined range of the respective vector, forgo provision of the first audible and/or tactile indication

610
Detect a plurality of objects within the scene

612
Provide a first audible description of the scene. The first audible description provides information corresponding to the plurality of objects as a group

614
In accordance with a determination that a number of objects in the scene is below a threshold, the first audible description includes a first summarization of the scene. In accordance with a determination that the number of objects in the scene is above the threshold, the first audible description includes a second summarization of the scene different from the first summarization of the scene (A)

Figure 6A

DEVICES, METHODS, AND GRAPHICAL USER INTERFACES FOR ASSISTED PHOTO-TAKING

RELATED APPLICATIONS

This application is a continuation of U.S. patent application Ser. No. 17/327,461, filed May 21, 2021, which is a continuation of U.S. patent application Ser. No. 16/586,852, filed Sep. 27, 2019, now U.S. Pat. No. 11,025,815, which claims priority to U.S. Provisional Patent Application No. 62/739,177, filed Sep. 29, 2018, entitled "Devices, Methods, and Graphical User Interfaces for Assisted Photo-Taking," each of which is hereby incorporated by reference in its entirety.

TECHNICAL FIELD

This relates generally to electronic devices with cameras, including but not limited to electronic devices with cameras that provide audible and/or tactile assistance for low-vision or blind users while taking photographs.

BACKGROUND

Taking a photograph is one of the most important features of any modern smartphone (or other portable multifunction device). Whether it is capturing a memory for a personal library, or for communicating on social media, users are constantly taking and sharing photos. Therefore, it is essential that all users, including low-vision and blind users, be able to take basic photographs, and desirable that they be able to take beautiful and artistic photographs.

Due to the inherent visual aspects of photography, it is difficult for low-vision and blind users to take great photographs with standard user interfaces.

SUMMARY

The above deficiencies and other problems associated with user interfaces for electronic devices with cameras are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, and programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device. The method includes obtaining one or more images of a scene. The method includes, after obtaining the one or more images of the scene, detecting a plurality of objects within the scene, providing a first audible description of the scene, and detecting a user input. The first audible description provides information corresponding to the plurality of objects as a group. The user input selects a respective object of the plurality of objects within the scene. The method includes, in response to the user input selecting the respective object within the scene, providing a second audible description of the respective object. The second audible description is distinct from the first audible description and includes a description of one or more characteristics specific to the respective object.

In accordance with some embodiments, a method is performed at an electronic device with a camera. The method includes obtaining one or more images of a scene and detecting a respective feature within the scene. The method further includes, in response to detecting the respective feature within the scene: in accordance with a determination that a first mode is active on the device, providing a first audible description of the scene, wherein the first audible description provides information indicating a size and/or position of the respective feature relative to a first set of divisions applied to the one or more images of the scene; and, in accordance with a determination that the first mode is not active on the device, providing a second audible description of the plurality of objects. The second audible description is distinct from the first audible description and does not include the information indicating the size and/or position of the respective feature relative to the first set of divisions.

In accordance with some embodiments, an electronic device includes a camera, optionally a display, optionally a touch-sensitive surface, optionally one or more device orientation sensors, optionally an audio system, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device with a camera, optionally a display, optionally a touch-sensitive surface, optionally one or more device orientation sensors, optionally an audio system, and optionally one or more tactile output generators, cause the device to perform or cause performance of the operations of any of the methods described herein. In accordance with some embodiments, a graphical user interface on an electronic device with a camera, optionally a display, optionally a touch-sensitive surface, optionally one or more device orientation sensors, optionally an audio system, optionally one or more tactile output generators, memory, and one or more processors to execute one or more programs stored in the memory includes one or more of the elements displayed in any of the methods described herein, which are updated in response to inputs, as described in any of the methods described herein. In accordance with some embodiments, an electronic device includes: a camera, optionally a display, optionally a touch-sensitive surface, optionally one or more device orientation sensors, optionally an audio system, optionally one or more tactile output generators; and means for performing or causing performance of the operations of any of the methods described herein. In accordance with some embodiments, an information processing apparatus, for use in an electronic device with a camera, optionally a display, optionally a touch-sensitive surface, optionally one or more device orientation sensors, optionally an audio system, optionally one or more tactile output generators, includes means for performing or causing performance of the operations of any of the methods described herein.

Thus, electronic devices with a camera, optionally a display, optionally a touch-sensitive surface, optionally one or more tactile output generators, optionally one or more device orientation sensors, and optionally an audio system, are provided with improved methods and interfaces for providing assisted photo-taking, thereby increasing the effectiveness, efficiency, and user satisfaction with such devices. Such methods and interfaces may complement or replace conventional methods for providing assisted photo-taking.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6C are flow diagrams of a process for providing users (e.g., low-vision and blind users) with non-visual assistance for taking photographs in accordance with some embodiments.

DESCRIPTION OF EMBODIMENTS

The systems, methods, and devices described herein aid low-vision and blind users in taking high-quality photographs by providing audible scene- and object-level descriptions of images (e.g. displayed in a live preview of image content being captured by a camera).

For example, the "rule of thirds" in photography suggests that an image should be compositionally divided into nine equal parts by two equally spaced horizontal lines and two equally spaced vertical lines (e.g., a three-by-three grid), and that important compositional elements should be placed along these lines or their intersections. Aligning important compositional elements with these lines creates more tension, energy, and interest in the composition than simply centering the subject. However, it is difficult with conventional user interfaces for low-vision and blind users to align compositional elements within images.

As described below, the systems, methods, and devices described herein aid low-vision and blind users in taking high-quality photographs by providing audible descriptions of images with respect to a set of divisions of the image (e.g., a three-by-three grid), thus helping low vision and blind users compose images, e.g., according to the rule of thirds.

Figure 2:
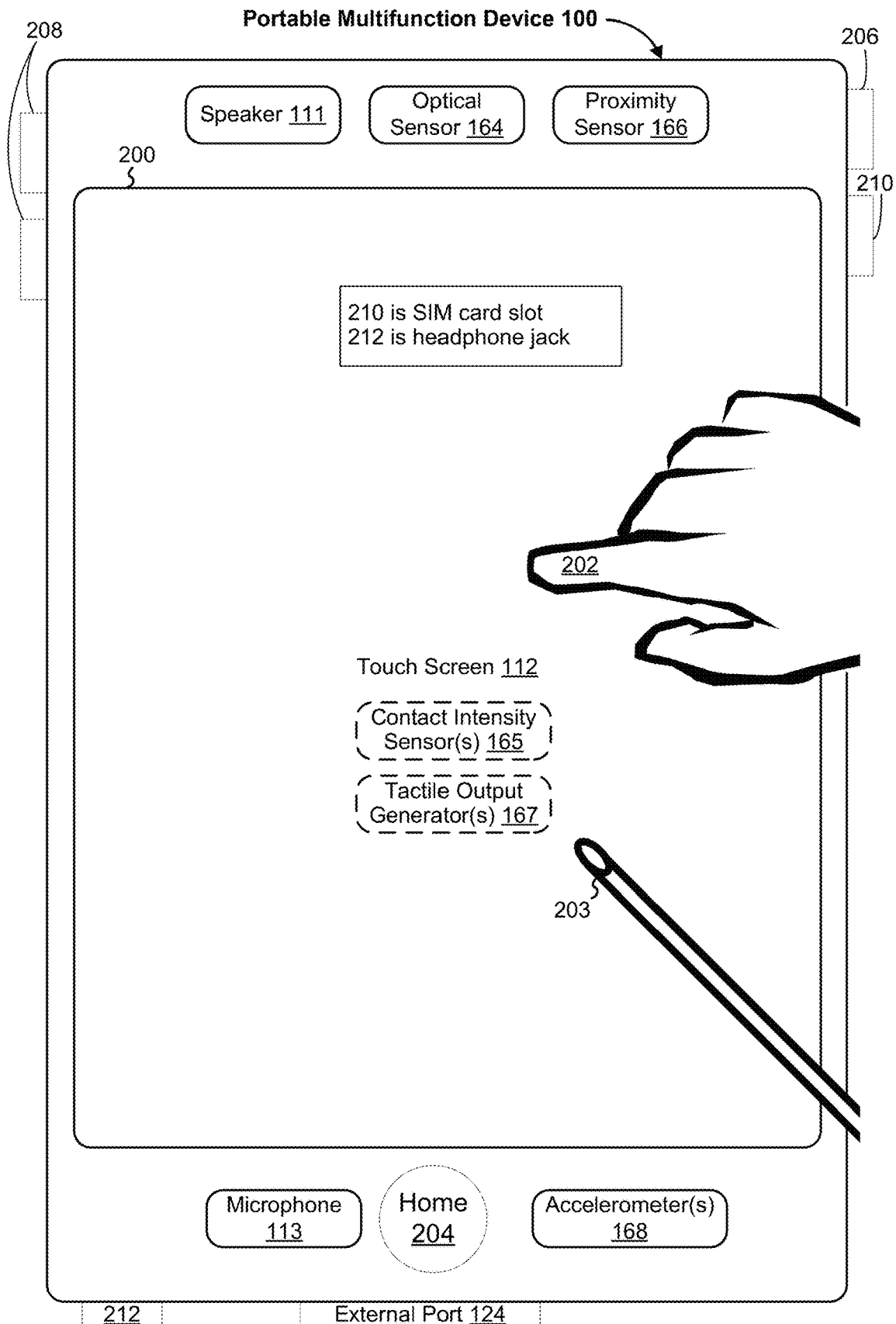
FIG. 2 illustrates a portable multifunction device having a touch screen in accordance with some embodiments.
Figure 3:
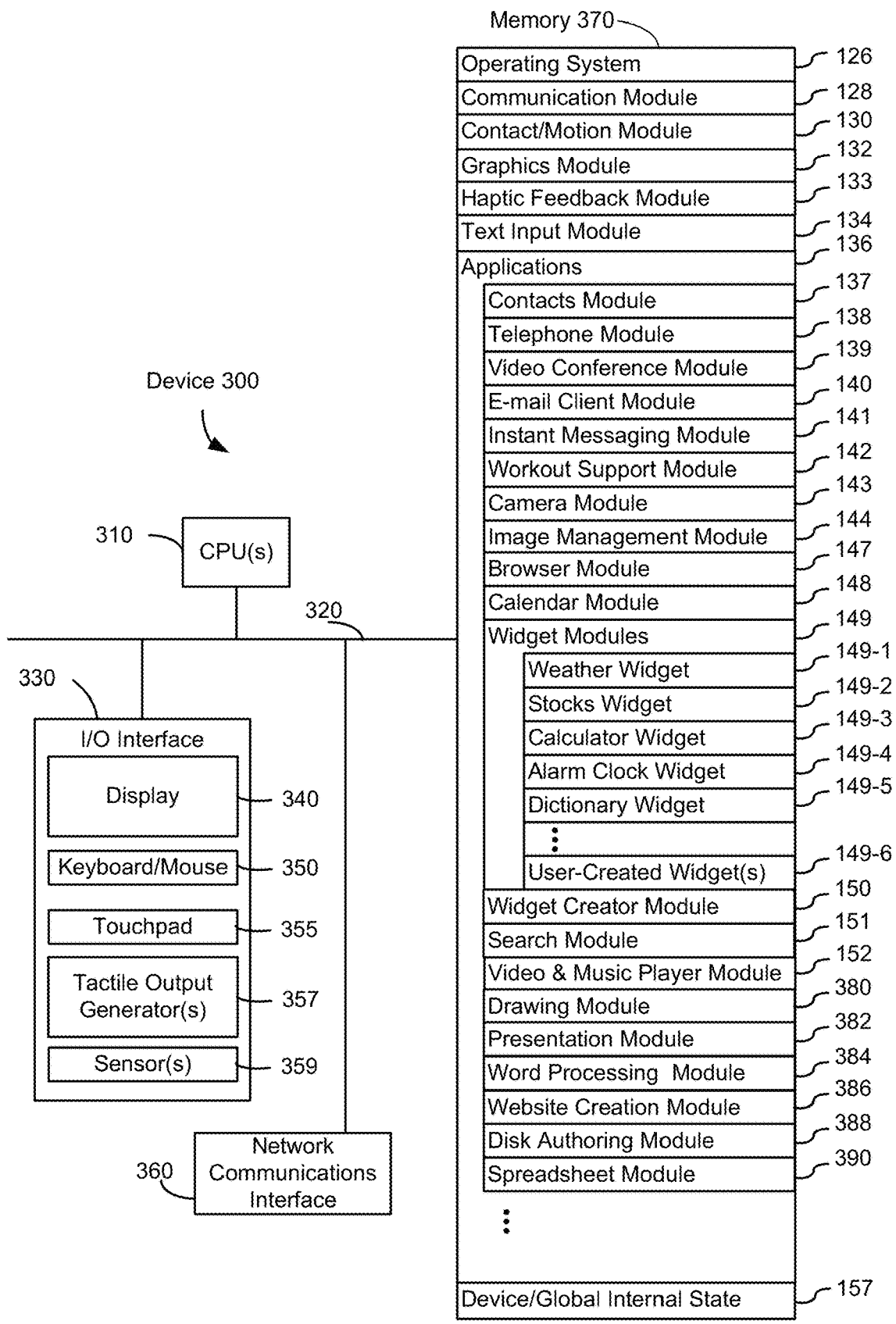
FIG. 3 is a block diagram of an example multifunction device with a display and a touch-sensitive surface in accordance with some embodiments.
Figure 4A:
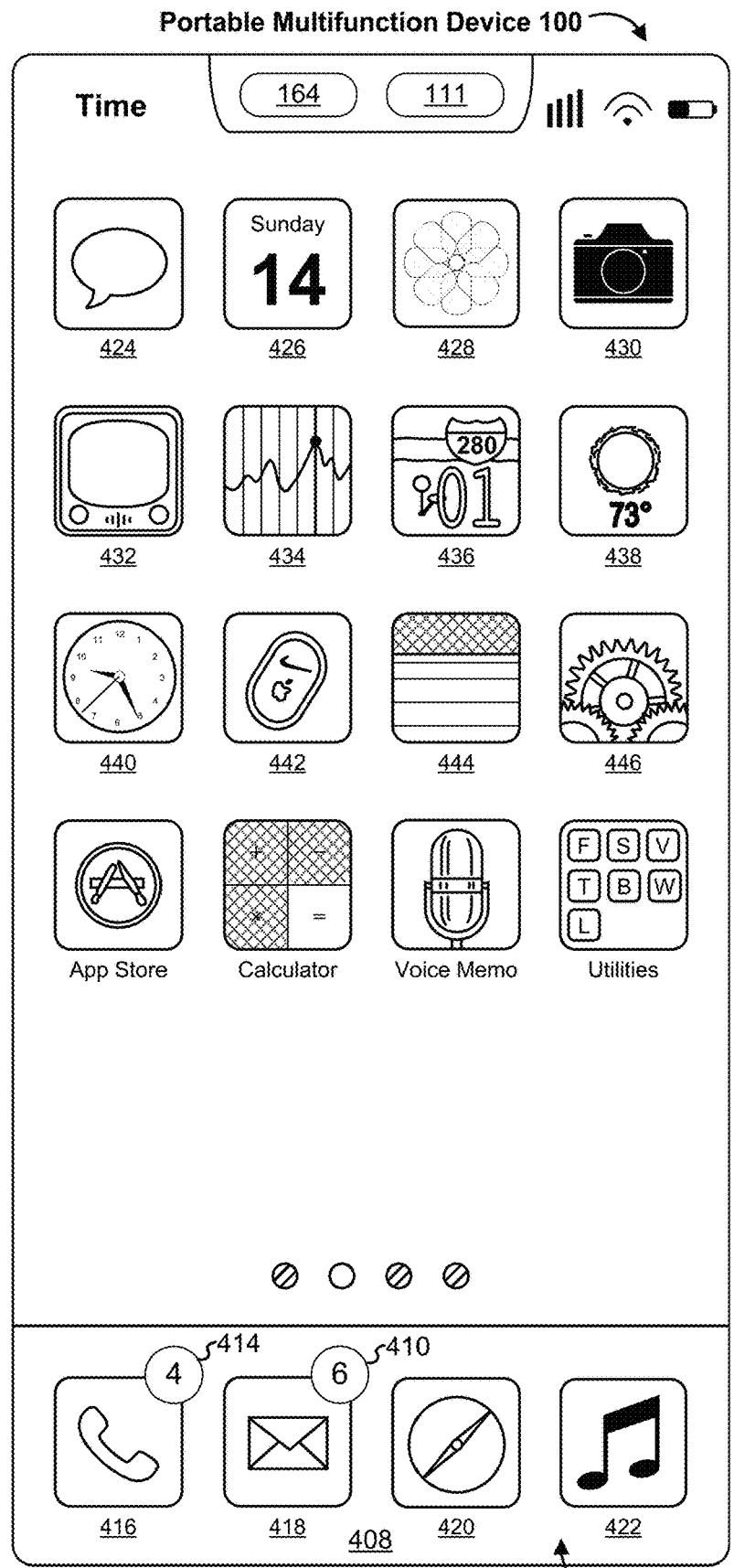
FIG. 4A illustrates an example user interface for a menu of applications on a portable multifunction device in accordance with some embodiments.
Figure 4B:
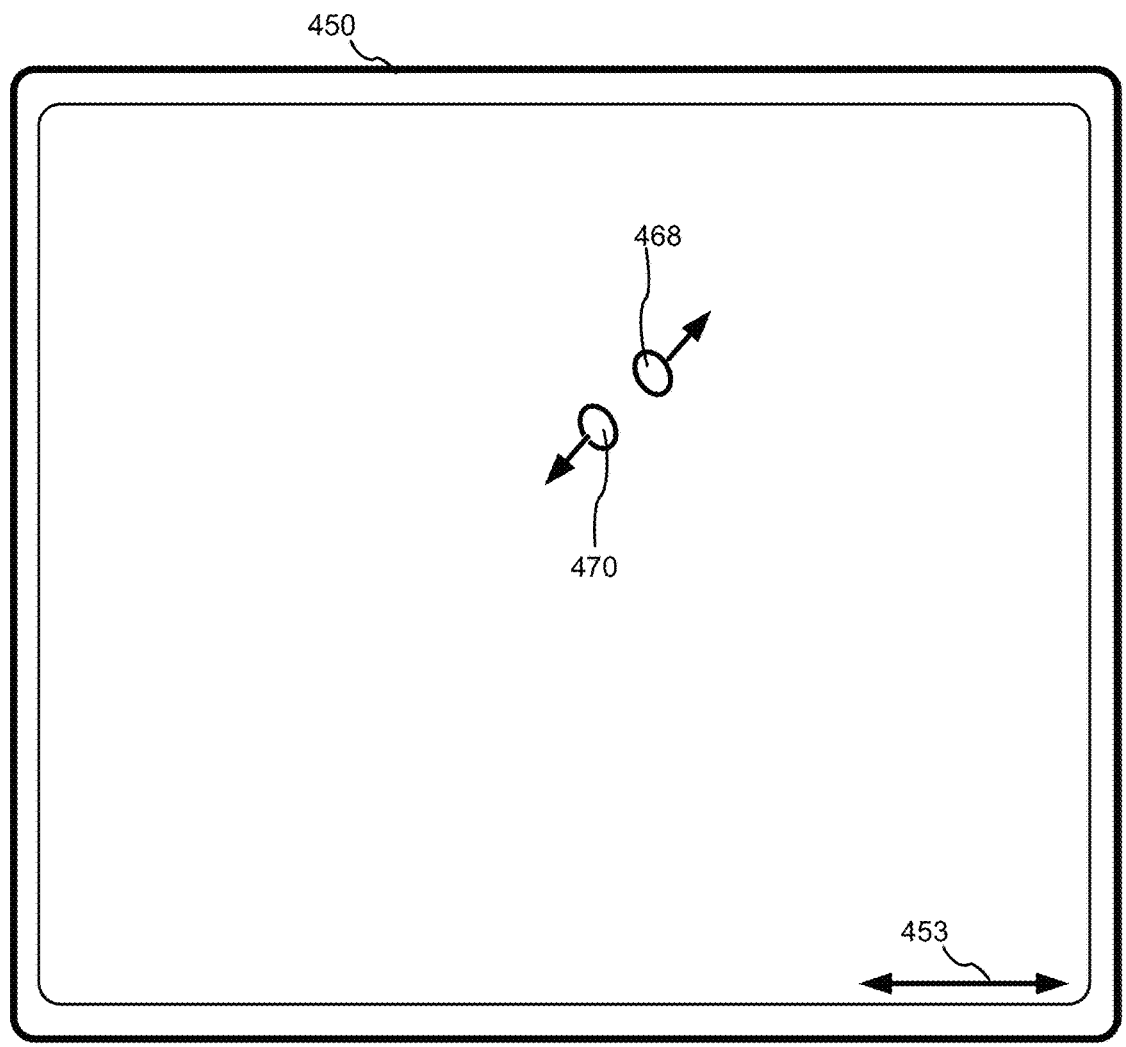
FIG. 4B illustrates an example user interface for a multifunction device with a touch-sensitive surface that is separate from the display in accordance with some embodiments.
Figure 4B:
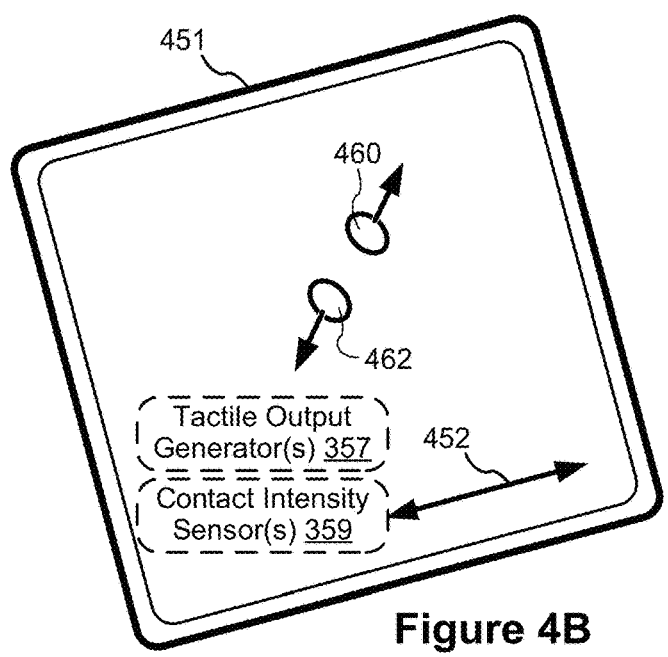
Figure 5A:
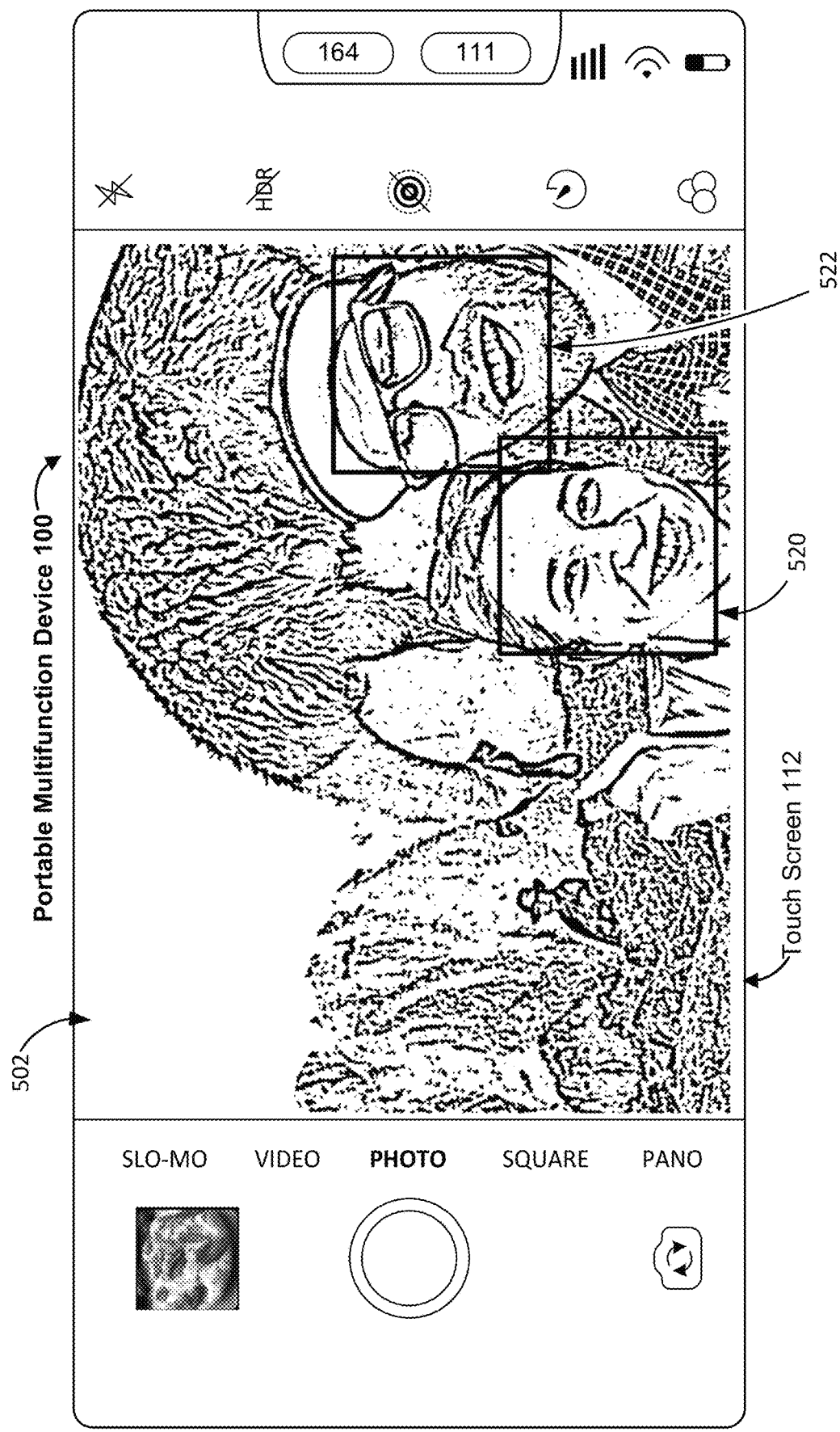
FIGS. 5A-5AA illustrate example user interfaces for providing users (e.g., low-vision and blind users) with non-visual assistance for taking photographs in accordance with some embodiments.
Figure 6B:
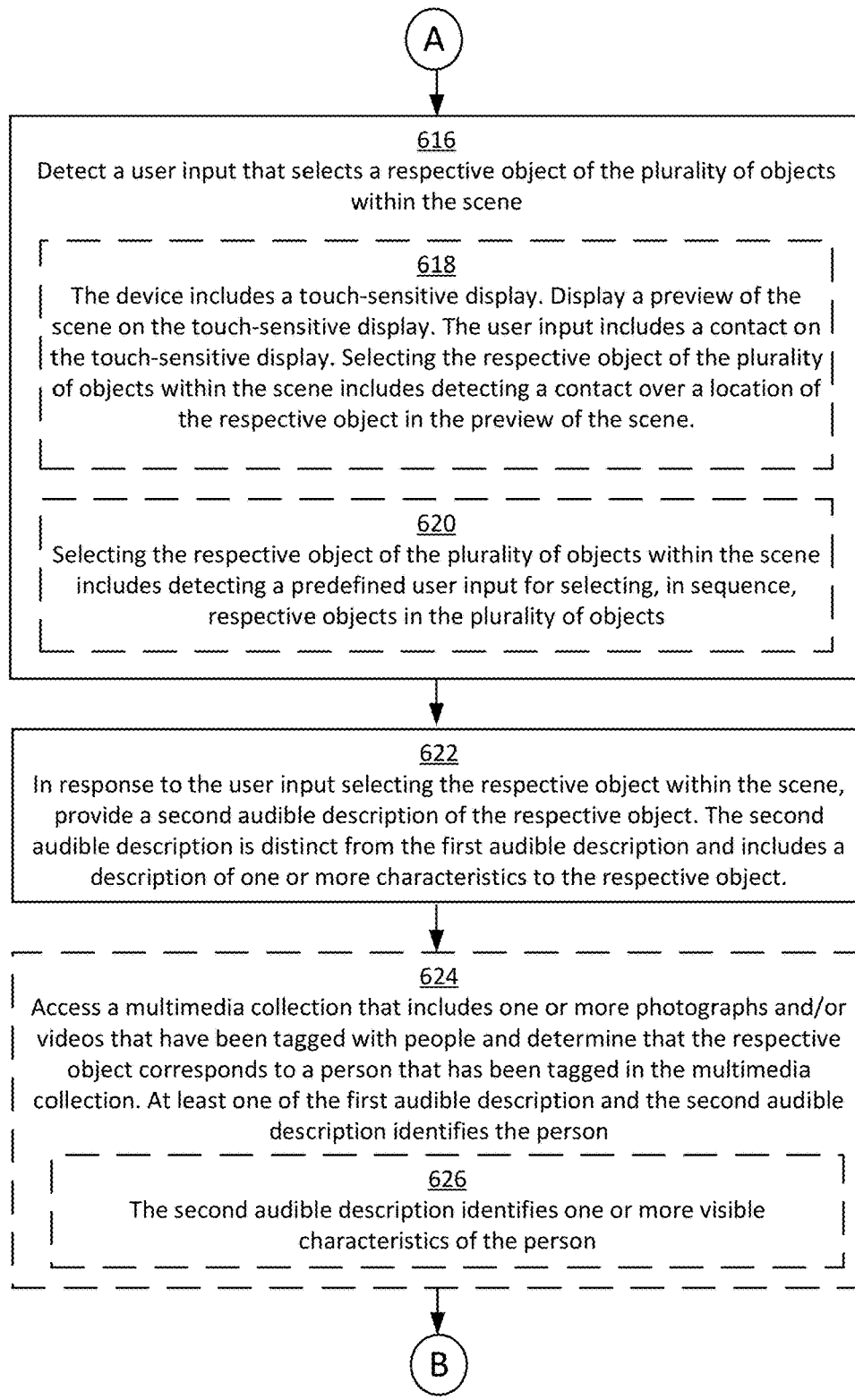
Figure 6C:
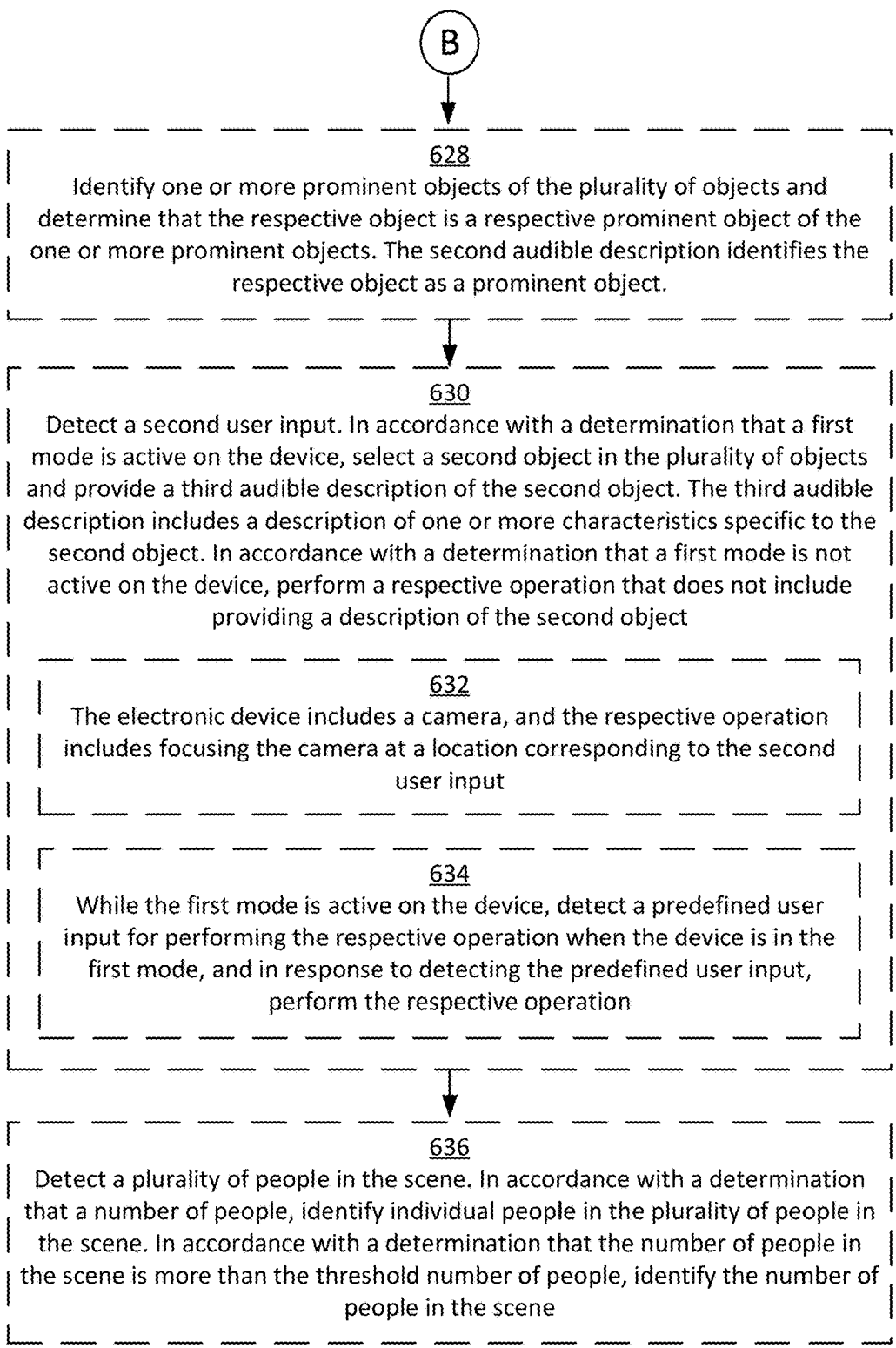
Figure 7A:
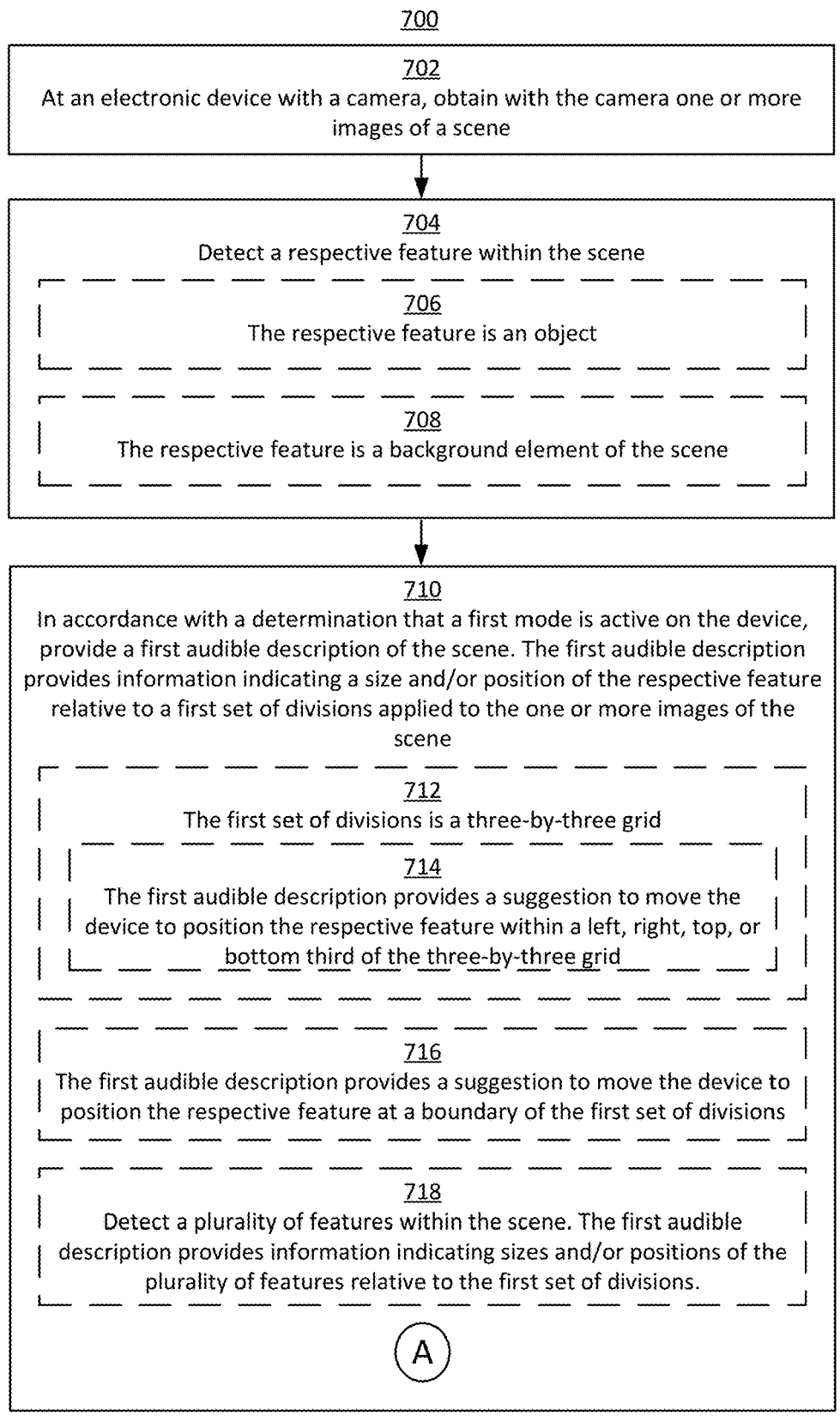
FIGS. 7A-7B are flow diagrams of a process for providing users (e.g., low-vision and blind users) with non-visual assistance for composing artistic photographs in accordance with some embodiments.
Figure 7B:
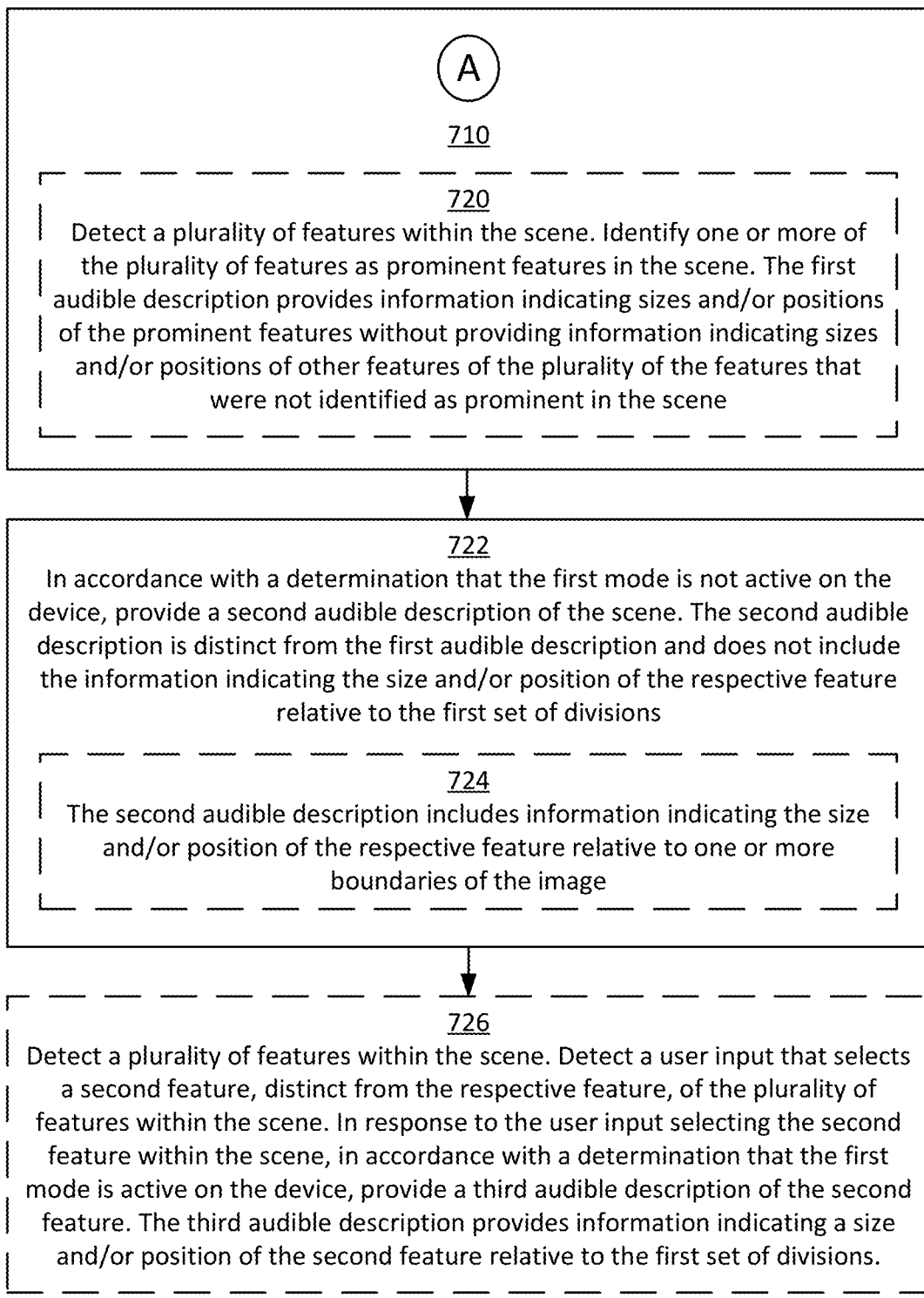

Below, FIGS. 1A-1C, 2, and 3 provide a description of example devices. FIGS. 4A-4B and 5A-5AA illustrate example user interfaces for providing feedback to users to improve photo-taking. FIGS. 6A-6C illustrate a flow diagram of a method of providing audible guidance to aid vision-impaired users in capturing high-quality images. FIGS. 7A-7B illustrate a flow diagram of a method of providing audible guidance to aid vision-impaired users in capturing images with good compositions. The user interfaces in FIGS. 5A-5AA are used to illustrate the processes in FIGS. 6A-6C and 7A-7B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch-screen displays and/or touch-pads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
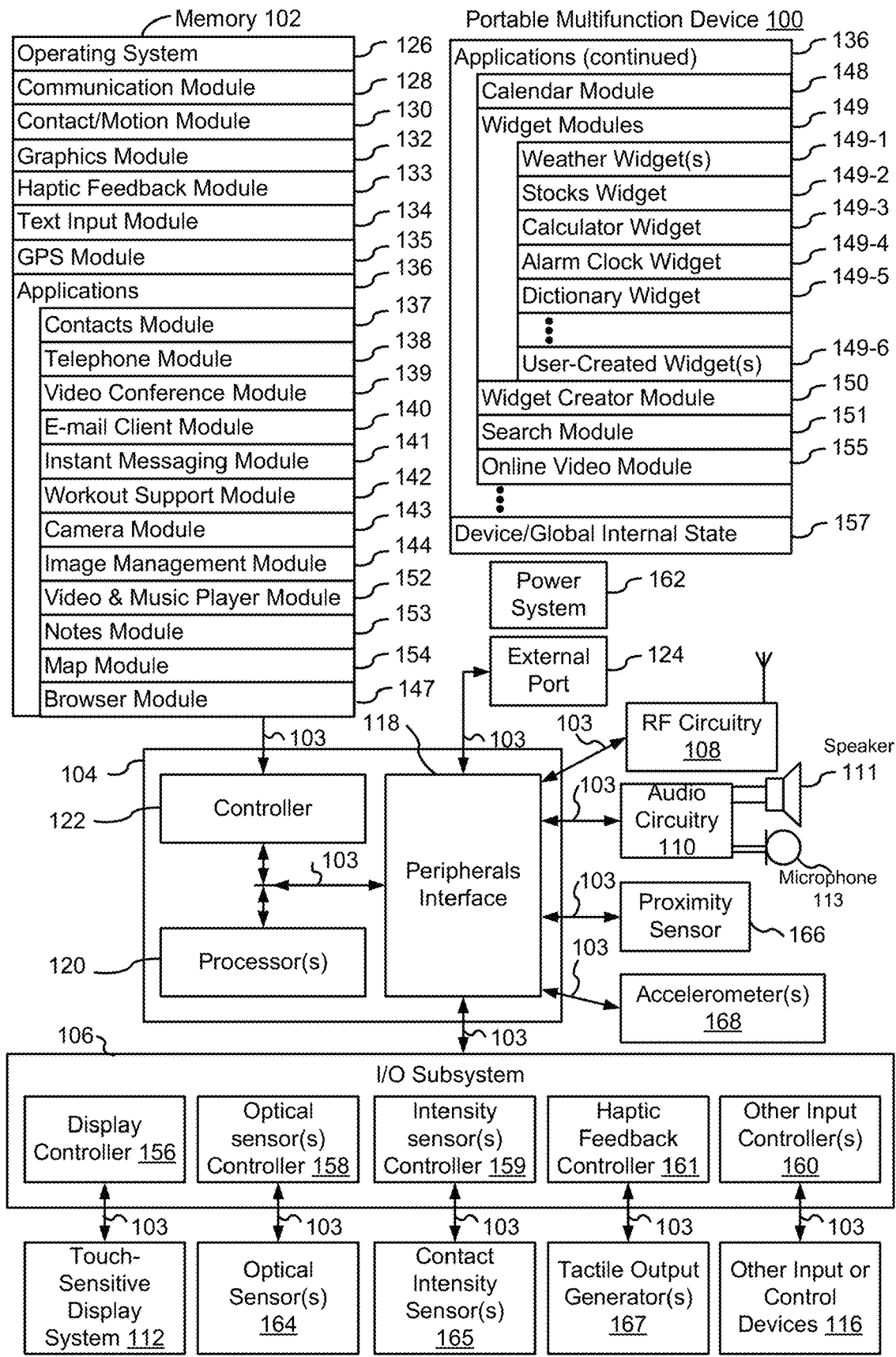
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2).

The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California In some embodiments, the external port is a Lightning connector that is the same as, or similar to and/or compatible with the Lightning connector used in some iPhone®, iPod Touch®, and iPad® devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the pre-defined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have a criterion that is met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g., for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
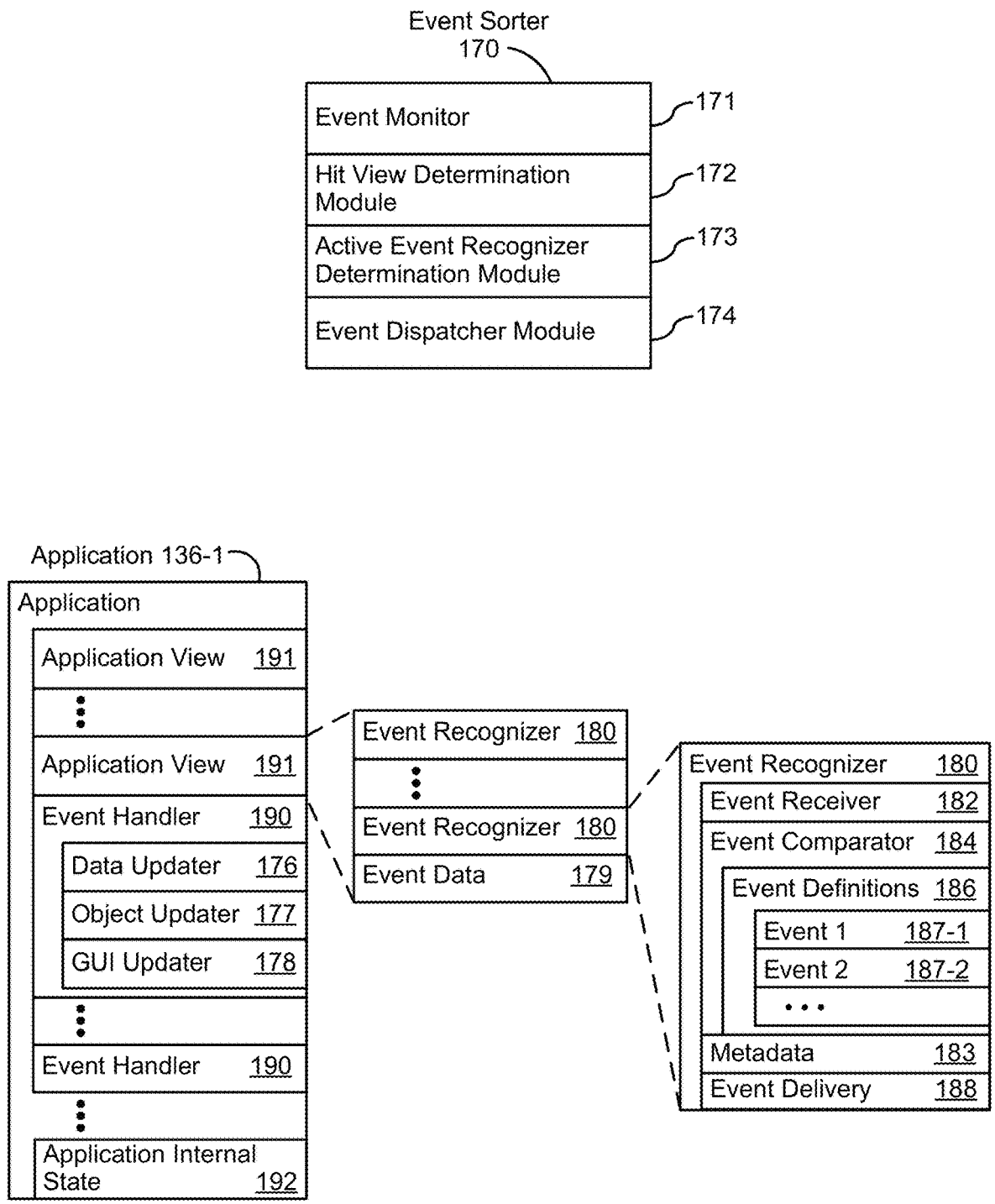
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that are displayed on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions;

detected eye movements; biometric inputs; and/or any combination thereof are optionally utilized as inputs corresponding to sub-events which define an event to be recognized.

Figure 1C:
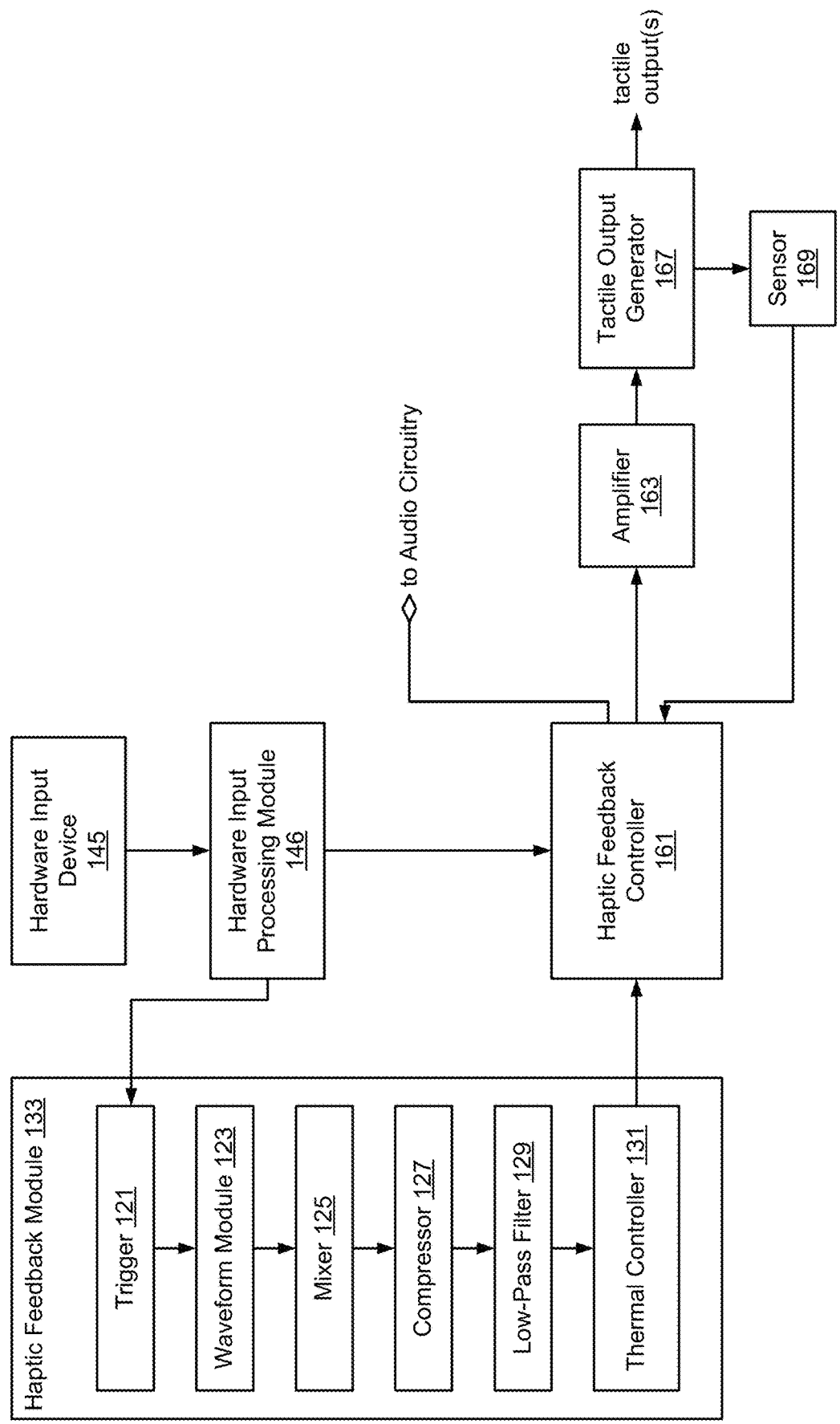
FIG. 1C is a block diagram illustrating a tactile output module in accordance with some embodiments.

FIG. 1C is a block diagram illustrating a tactile output module in accordance with some embodiments. In some embodiments, I/O subsystem 106 (e.g., haptic feedback controller 161 (FIG. 1A) and/or other input controller(s) 160 (FIG. 1A)) includes at least some of the example components shown in FIG. 1C. In some embodiments, peripherals interface 118 includes at least some of the example components shown in FIG. 1C.

In some embodiments, the tactile output module includes haptic feedback module 133. In some embodiments, haptic feedback module 133 aggregates and combines tactile outputs for user interface feedback from software applications on the electronic device (e.g., feedback that is responsive to user inputs that correspond to displayed user interfaces and alerts and other notifications that indicate the performance of operations or occurrence of events in user interfaces of the electronic device). Haptic feedback module 133 includes one or more of: waveform module 123 (for providing waveforms used for generating tactile outputs), mixer 125 (for mixing waveforms, such as waveforms in different channels), compressor 127 (for reducing or compressing a dynamic range of the waveforms), low-pass filter 129 (for filtering out high frequency signal components in the waveforms), and thermal controller 131 (for adjusting the waveforms in accordance with thermal conditions). In some embodiments, haptic feedback module 133 is included in haptic feedback controller 161 (FIG. 1A). In some embodiments, a separate unit of haptic feedback module 133 (or a separate implementation of haptic feedback module 133) is also included in an audio controller (e.g., audio circuitry 110, FIG. 1A) and used for generating audio signals. In some embodiments, a single haptic feedback module 133 is used for generating audio signals and generating waveforms for tactile outputs.

In some embodiments, haptic feedback module 133 also includes trigger module 121 (e.g., a software application, operating system, or other software module that determines a tactile output is to be generated and initiates the process for generating the corresponding tactile output). In some embodiments, trigger module 121 generates trigger signals for initiating generation of waveforms (e.g., by waveform module 123). For example, trigger module 121 generates trigger signals based on preset timing criteria. In some embodiments, trigger module 121 receives trigger signals from outside haptic feedback module 133 (e.g., in some embodiments, haptic feedback module 133 receives trigger signals from hardware input processing module 146 located outside haptic feedback module 133) and relays the trigger signals to other components within haptic feedback module 133 (e.g., waveform module 123) or software applications that trigger operations (e.g., with trigger module 121) based on activation of a user interface element (e.g., an application icon or an affordance within an application) or a hardware input device (e.g., a home button or an intensity-sensitive input surface, such as an intensity-sensitive touch screen). In some embodiments, trigger module 121 also receives tactile feedback generation instructions (e.g., from haptic feedback module 133, FIGS. 1A and 3). In some embodiments, trigger module 121 generates trigger signals in response to haptic feedback module 133 (or trigger module 121 in haptic feedback module 133) receiving tactile feedback instructions (e.g., from haptic feedback module 133, FIGS. 1A and 3).

Waveform module 123 receives trigger signals (e.g., from trigger module 121) as an input, and in response to receiving trigger signals, provides waveforms for generation of one or more tactile outputs (e.g., waveforms selected from a predefined set of waveforms designated for use by waveform module 123).

Mixer 125 receives waveforms (e.g., from waveform module 123) as an input, and mixes together the waveforms. For example, when mixer 125 receives two or more waveforms (e.g., a first waveform in a first channel and a second waveform that at least partially overlaps with the first waveform in a second channel) mixer 125 outputs a combined waveform that corresponds to a sum of the two or more waveforms. In some embodiments, mixer 125 also modifies one or more waveforms of the two or more waveforms to emphasize particular waveform(s) over the rest of the two or more waveforms (e.g., by increasing a scale of the particular waveform(s) and/or decreasing a scale of the rest of the waveforms). In some circumstances, mixer 125 selects one or more waveforms to remove from the combined waveform (e.g., the waveform from the oldest source is dropped when there are waveforms from more than three sources that have been requested to be output concurrently by tactile output generator 167).

Compressor 127 receives waveforms (e.g., a combined waveform from mixer 125) as an input, and modifies the waveforms. In some embodiments, compressor 127 reduces the waveforms (e.g., in accordance with physical specifications of tactile output generators 167 (FIG. 1A) or 357 (FIG. 3)) so that tactile outputs corresponding to the waveforms are reduced. In some embodiments, compressor 127 limits the waveforms, such as by enforcing a predefined maximum amplitude for the waveforms. For example, compressor 127 reduces amplitudes of portions of waveforms that exceed a predefined amplitude threshold while maintaining amplitudes of portions of waveforms that do not exceed the predefined amplitude threshold. In some embodiments, compressor 127 reduces a dynamic range of the waveforms. In some embodiments, compressor 127 dynamically reduces the dynamic range of the waveforms so that the combined waveforms remain within performance specifications of the tactile output generator 167 (e.g., force and/or moveable mass displacement limits).

Low-pass filter 129 receives waveforms (e.g., compressed waveforms from compressor 127) as an input, and filters (e.g., smooths) the waveforms (e.g., removes or reduces high frequency signal components in the waveforms). For example, in some instances, compressor 127 includes, in compressed waveforms, extraneous signals (e.g., high frequency signal components) that interfere with the generation of tactile outputs and/or exceed performance specifications of tactile output generator 167 when the tactile outputs are generated in accordance with the compressed waveforms. Low-pass filter 129 reduces or removes such extraneous signals in the waveforms.

Thermal controller 131 receives waveforms (e.g., filtered waveforms from low-pass filter 129) as an input, and adjusts the waveforms in accordance with thermal conditions of device 100 (e.g., based on internal temperatures detected within device 100, such as the temperature of haptic feedback controller 161, and/or external temperatures detected by device 100). For example, in some cases, the output of haptic feedback controller 161 varies depending on the temperature (e.g., haptic feedback controller 161, in response to receiving same waveforms, generates a first tactile output when haptic feedback controller 161 is at a first temperature and generates a second tactile output when haptic feedback controller 161 is at a second temperature that is distinct from the first temperature). For example, the magnitude (or the amplitude) of the tactile outputs may vary depending on the temperature. To reduce the effect of the temperature variations, the waveforms are modified (e.g., an amplitude of the waveforms is increased or decreased based on the temperature).

In some embodiments, haptic feedback module 133 (e.g., trigger module 121) is coupled to hardware input processing module 146. In some embodiments, other input controller(s) 160 in FIG. 1A includes hardware input processing module 146. In some embodiments, hardware input processing module 146 receives inputs from hardware input device 145 (e.g., other input or control devices 116 in FIG. 1A, such as a home button or an intensity-sensitive input surface, such as an intensity-sensitive touch screen). In some embodiments, hardware input device 145 is any input device described herein, such as touch-sensitive display system 112 (FIG. 1A), keyboard/mouse 350 (FIG. 3), touchpad 355 (FIG. 3), one of other input or control devices 116 (FIG. 1A), or an intensity-sensitive home button. In some embodiments, hardware input device 145 consists of an intensity-sensitive home button, and not touch-sensitive display system 112 (FIG. 1A), keyboard/mouse 350 (FIG. 3), or touchpad 355 (FIG. 3). In some embodiments, in response to inputs from hardware input device 145 (e.g., an intensity-sensitive home button or a touch screen), hardware input processing module 146 provides one or more trigger signals to haptic feedback module 133 to indicate that a user input satisfying predefined input criteria, such as an input corresponding to a "click" of a home button (e.g., a "down click" or an "up click"), has been detected. In some embodiments, haptic feedback module 133 provides waveforms that correspond to the "click" of a home button in response to the input corresponding to the "click" of a home button, simulating a haptic feedback of pressing a physical home button.

In some embodiments, the tactile output module includes haptic feedback controller 161 (e.g., haptic feedback controller 161 in FIG. 1A), which controls the generation of tactile outputs. In some embodiments, haptic feedback controller 161 is coupled to a plurality of tactile output generators, and selects one or more tactile output generators of the plurality of tactile output generators and sends waveforms to the selected one or more tactile output generators for generating tactile outputs. In some embodiments, haptic feedback controller 161 coordinates tactile output requests that correspond to activation of hardware input device 145 and tactile output requests that correspond to software events (e.g., tactile output requests from haptic feedback module 133) and modifies one or more waveforms of the two or more waveforms to emphasize particular waveform(s) over the rest of the two or more waveforms (e.g., by increasing a scale of the particular waveform(s) and/or decreasing a scale of the rest of the waveforms, such as to prioritize tactile outputs that correspond to activations of hardware input device 145 over tactile outputs that correspond to software events).

In some embodiments, as shown in FIG. 1C, an output of haptic feedback controller 161 is coupled to audio circuitry of device 100 (e.g., audio circuitry 110, FIG. 1A), and provides audio signals to audio circuitry of device 100. In some embodiments, haptic feedback controller 161 provides both waveforms used for generating tactile outputs and audio signals used for providing audio outputs in conjunction with generation of the tactile outputs. In some embodiments, haptic feedback controller 161 modifies audio signals and/or waveforms (used for generating tactile outputs) so that the audio outputs and the tactile outputs are synchronized (e.g., by delaying the audio signals and/or waveforms). In some embodiments, haptic feedback controller 161 includes a digital-to-analog converter used for converting digital waveforms into analog signals, which are received by amplifier 163 and/or tactile output generator 167.

In some embodiments, the tactile output module includes amplifier 163. In some embodiments, amplifier 163 receives waveforms (e.g., from haptic feedback controller 161) and amplifies the waveforms prior to sending the amplified waveforms to tactile output generator 167 (e.g., any of tactile output generators 167 (FIG. 1A) or 357 (FIG. 3)). For example, amplifier 163 amplifies the received waveforms to signal levels that are in accordance with physical specifications of tactile output generator 167 (e.g., to a voltage and/or a current required by tactile output generator 167 for generating tactile outputs so that the signals sent to tactile output generator 167 produce tactile outputs that correspond to the waveforms received from haptic feedback controller 161) and sends the amplified waveforms to tactile output generator 167. In response, tactile output generator 167 generates tactile outputs (e.g., by shifting a moveable mass back and forth in one or more dimensions relative to a neutral position of the moveable mass).

In some embodiments, the tactile output module includes sensor 169, which is coupled to tactile output generator 167. Sensor 169 detects states or state changes (e.g., mechanical position, physical displacement, and/or movement) of tactile output generator 167 or one or more components of tactile output generator 167 (e.g., one or more moving parts, such as a membrane, used to generate tactile outputs). In some embodiments, sensor 169 is a magnetic field sensor (e.g., a Hall effect sensor) or other displacement and/or movement sensor. In some embodiments, sensor 169 provides information (e.g., a position, a displacement, and/or a movement of one or more parts in tactile output generator 167) to haptic feedback controller 161 and, in accordance with the information provided by sensor 169 about the state of tactile output generator 167, haptic feedback controller 161 adjusts the waveforms output from haptic feedback controller 161 (e.g., waveforms sent to tactile output generator 167, optionally via amplifier 163).

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, labeled "Music;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms (milliseconds) in duration (e.g., 40, 100, or 120 ms, depending on the magnitude of the second intensity threshold, with the delay time increasing as the second intensity threshold increases). This delay time helps to avoid accidental recognition of deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Example factors are described in U.S. patent application Ser. Nos. 14/399,606 and 14/624,296, which are incorporated by reference herein in their entireties.

User Interfaces and Associated Processes

Attention is now directed towards embodiments of user interfaces ("UI") and associated processes that may be implemented on an electronic device, such as portable multifunction device 100 or device 300, with camera, (optionally) a display, a touch-sensitive surface, (optionally) one or more tactile output generators for generating tactile outputs, (optionally) one or more device orientation sensors, and (optionally) an audio system.

FIGS. 5A-5AA illustrate example user interfaces 502 for providing users (e.g., low-vision and blind users) with non-visual assistance for taking photographs, in accordance with some embodiments. Unless otherwise noted, in some embodiments, FIG. 5A-5AA illustrate examples of user interfaces that are provided when an accessibility mode of the device is active (e.g., an accessibility mode for low vision and blind users).

The user interfaces in these figures are used to illustrate the processes described below, including the processes in FIGS. 6A-6C and 7A-7B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIG. 5A illustrates device 100 displaying a user interface 502 for a camera application. While the device 100 displays the user interface 502 for the camera application, device 100 captures one or more images of a scene and displays a live preview of the images in the user interface 502 (e.g., displays images in real-time as the images are acquired by the camera). In some embodiments, after obtaining one or more images of a scene (or while obtaining the one or more images of the scene), device 100 detects a plurality of objects within the scene. For example, FIG. 5A illustrates that device 100 has detected two people in the foreground of the live preview of the scene as indicated by bounding boxes 520 and 522. (Note that, in some embodiments, bounding boxes 520 and 522 are not displayed.)

In some embodiments, a bounding box is determined for an object with which the user can interact in order to receive non-visual feedback about the object. In some embodiments, device 100 identifies prominent objects within the scene and determines bounding boxes for the prominent objects within the scene. For example, there are numerous other objects that in the scene shown in FIG. 5A that device 100 optionally identifies (e.g., the llama, a person in the background, the mountain, clouds). In some embodiments, device 100 allows the user to interact (as described below) only with objects that are above a prominence threshold, so as not to overwhelm the user by cluttering the scene with detected objects.

In some embodiments, device 100 provides an audible description of the scene. In some embodiments, the audible description includes information that corresponds to the plurality of objects as a whole (e.g., "Two people in the lower right corner of the screen," or "Two faces near the camera").

In some embodiments, device 100 accesses a multimedia collection that includes one or more photographs and/or videos that have been tagged with people (e.g., people in a user's list of contacts and/or people whose names have been manually entered by the user). In some embodiments, device 100 uses the tagged photographs to identify people within the scene (e.g., people in the live preview, e.g., using facial recognition). In some embodiments, the audible description of the scene identifies the individuals in the scene by name (e.g., states the name of individual as tagged in the multimedia collection, e.g., "Samantha and Alex are close to the camera in the bottom right of the screen").

Figure 5B:
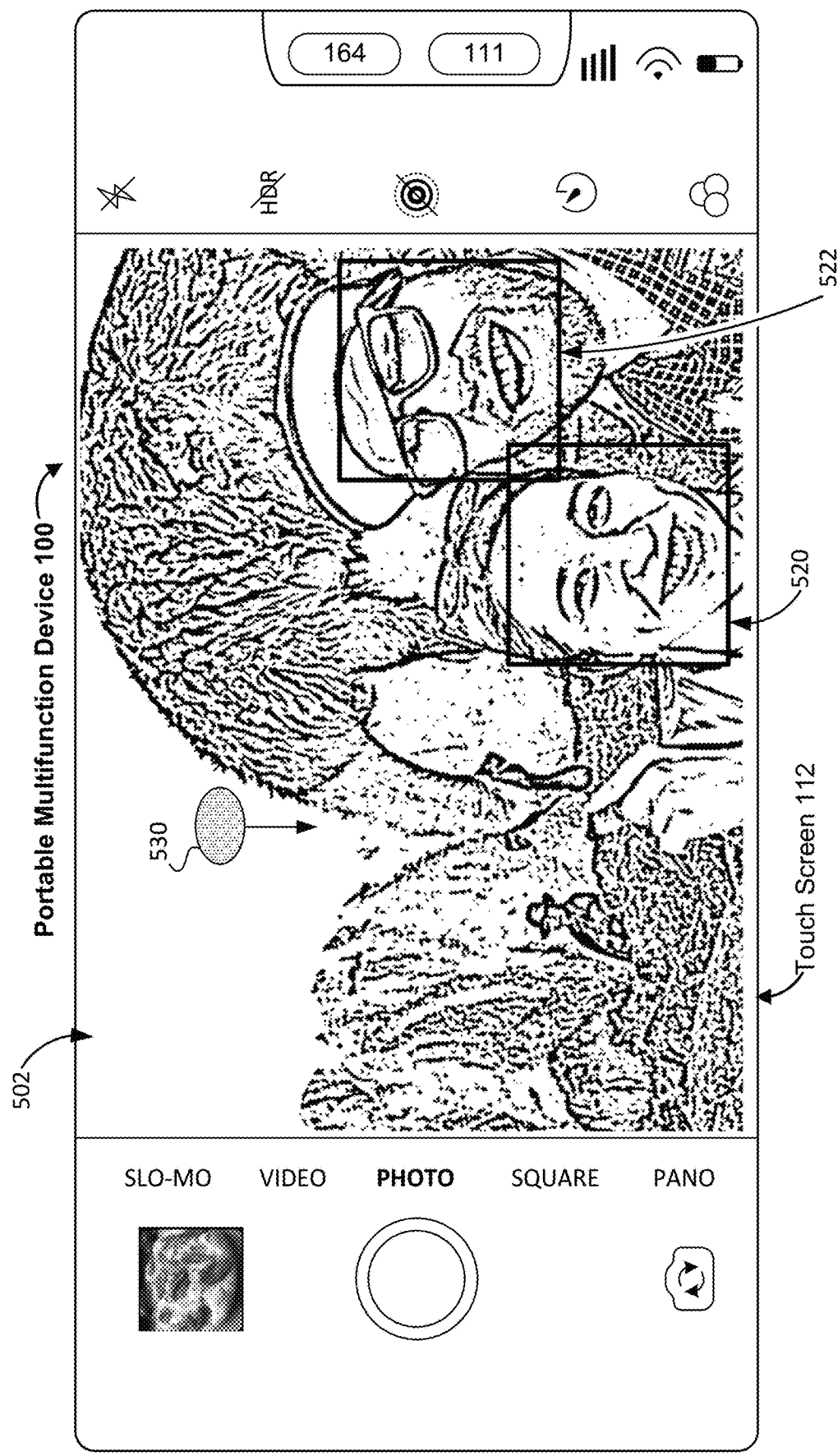
Figure 5C:
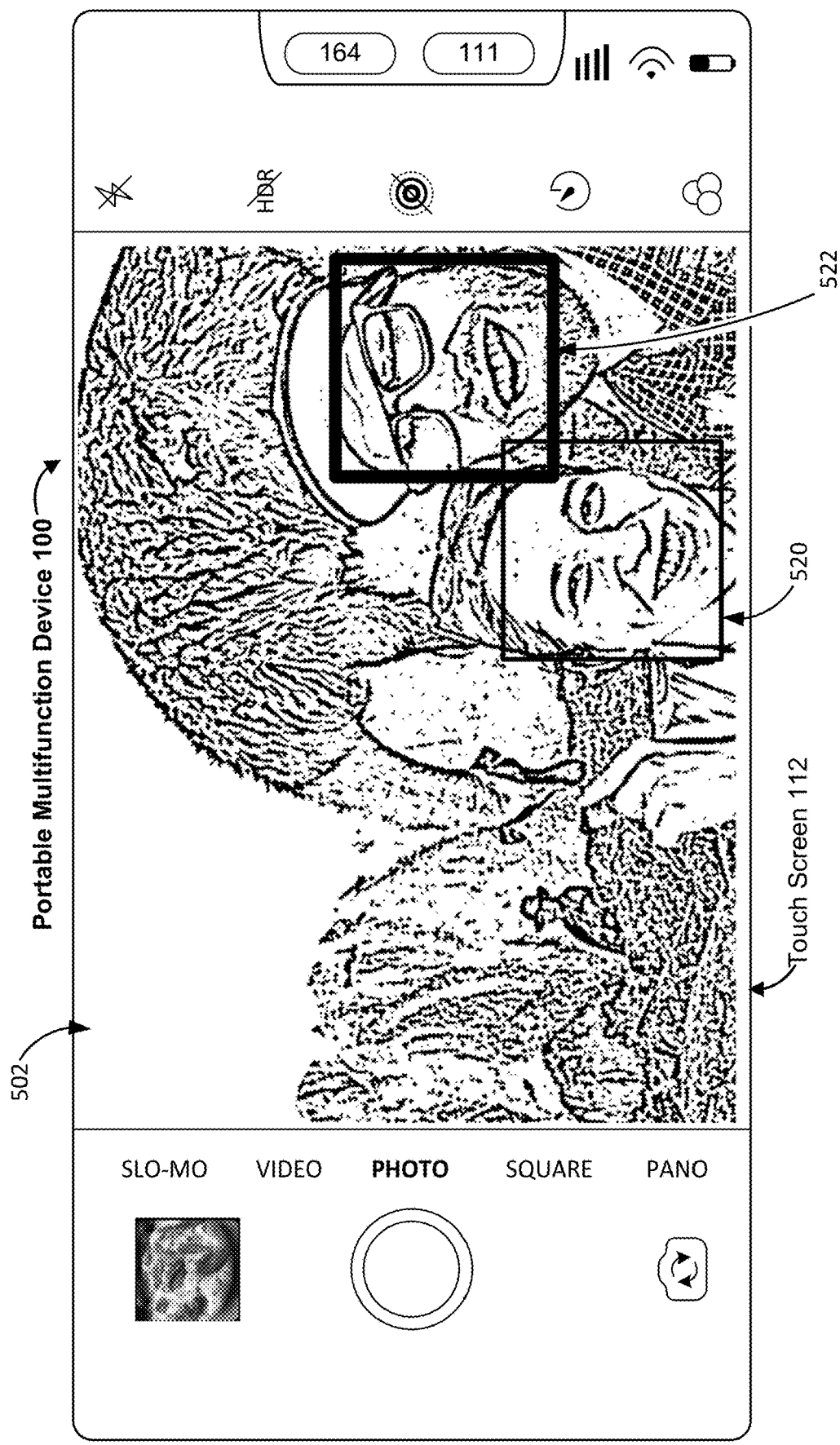

FIGS. 5B and 5C illustrate device 100 displaying the live preview of the user interface 502 at a later time (e.g., after FIG. 5A). In FIGS. 5B-5C, device 100 detects a user input 530 on touch screen 112 (e.g., a swipe gesture). As shown in FIG. 5C, in some embodiments, the user input 530 selects a respective bounding box, or selects a respective object of the plurality of objects within the scene (e.g., selects the object corresponding to bounding box 522). In some embodiments, device 100 displays a visual change to bounding box 522 to indicate that the object corresponding to bounding box 522 has been selected (e.g., displays bounding box 522 in bold). In some embodiments, the object closest to the respective user input is selected by device 100 in response to user input 530. In some embodiments, after the respective object has been selected, device 100 provides a second audible description of the respective object (e.g., "A smiling, bearded man near the camera on the right edge of the image," or "A bearded man wearing sunglasses and a hat in the lower right corner of the screen," or "Alex is smiling in the lower right part of the screen," etc.). The second audible description is distinct from the first audible description. The second audible description includes a description of one or more characteristics (e.g., gender, facial expression, facial features, presence/absence of glasses, hats, or other accessories, etc.) specific to the respective object or individual (e.g., the object in the selected bounding box 522).

Figure 5D:
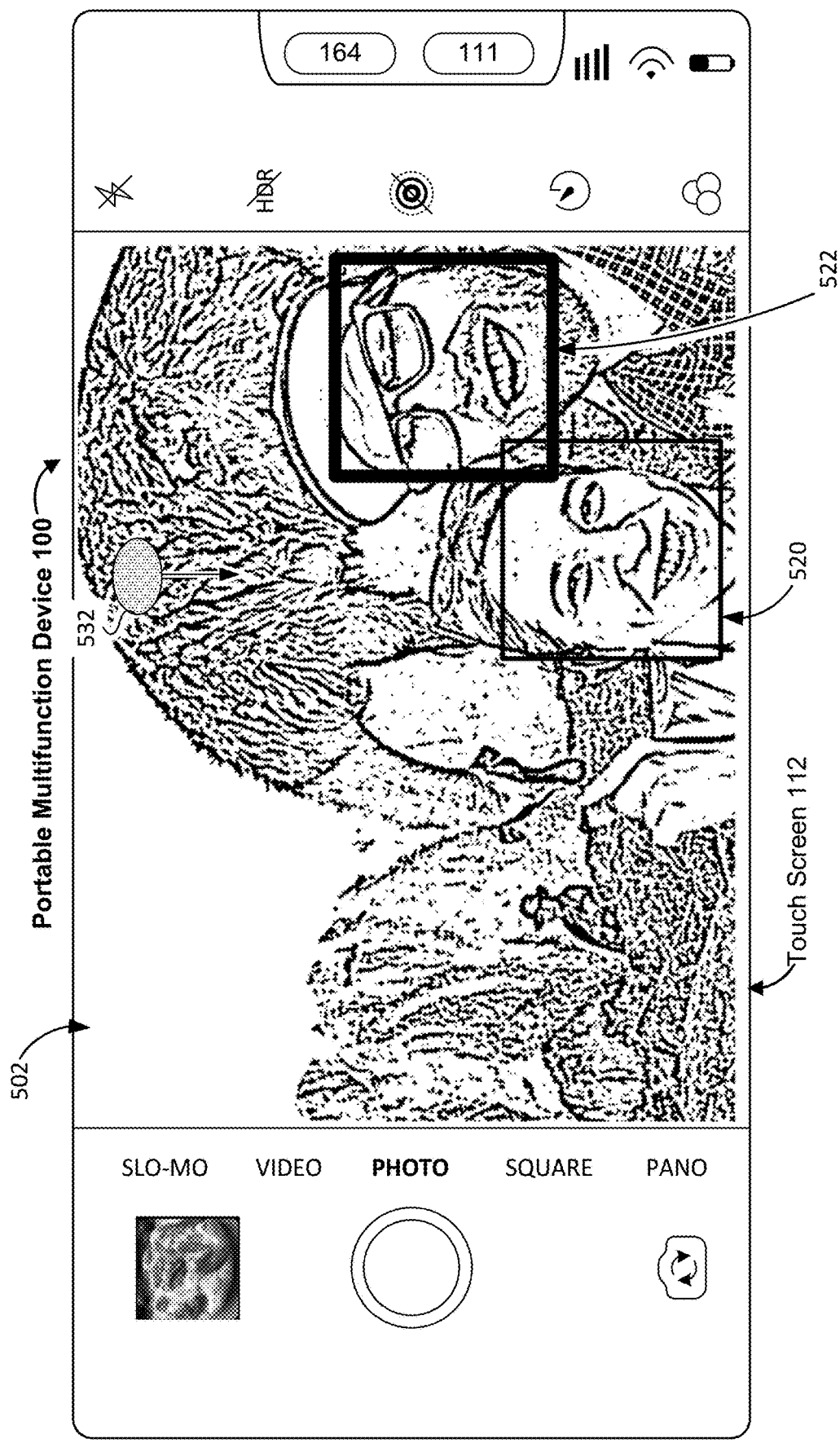
Figure 5E:
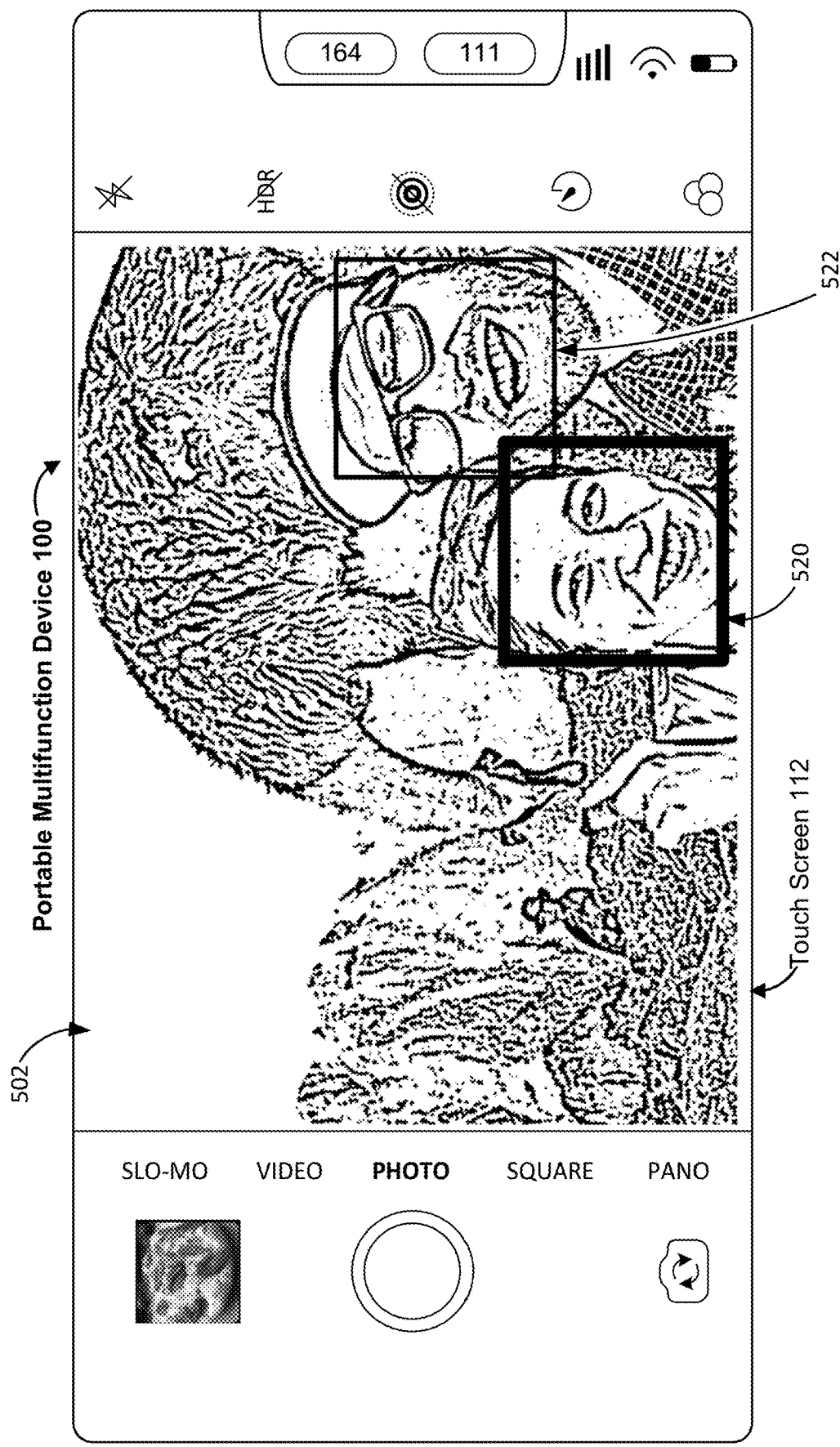

FIGS. 5D and 5E illustrate device 100 displaying the live preview and detecting a second user input 532 on touch screen 112 (e.g., a second swipe gesture). In some embodiments, the user input 532 selects a next bounding box, or next object of the plurality of objects within the scene (e.g., selects the object corresponding to bounding box 520). The device 100 provides a third audible description of the second object (e.g., selected bounding box 520). The third audible description includes a description of one or more characteristics specific to the second object (e.g., "A smiling woman with brown hair," or "Samantha," etc.). A user may thus cycle through descriptions of the characteristics of the plurality of objects identified by device 100 in the scene displayed on touch screen 112. In some embodiments, the user input for cycling through the descriptions of the various objects is independent of the user input's location on the display (e.g., the user may repeatedly swipe down anywhere on the display to cycle through the objects). Thus, low vision and blind users do not have to be able to see the display to hear the audible descriptions of the objects in the scene.

Figure 5F:
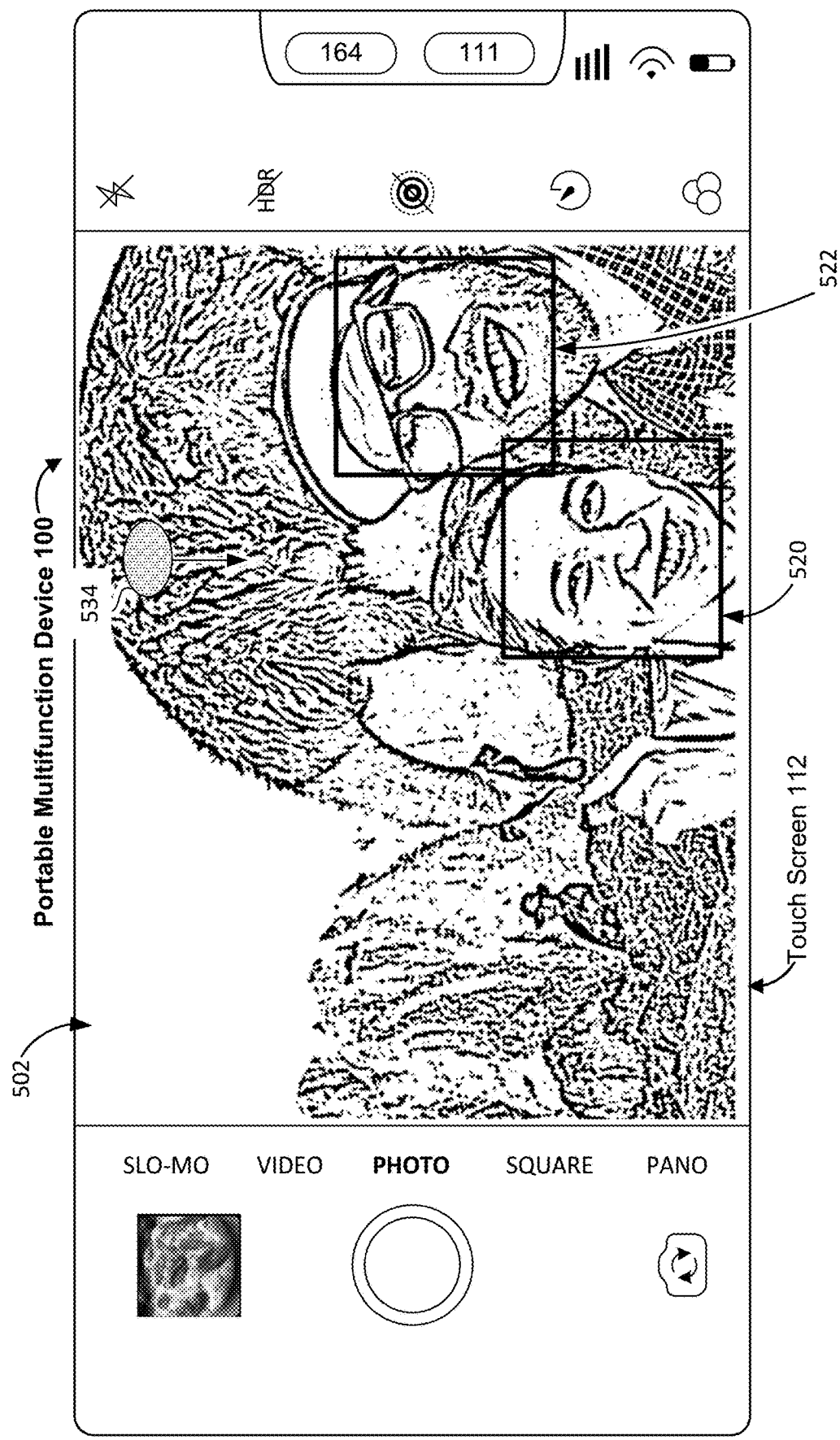
Figure 5G:
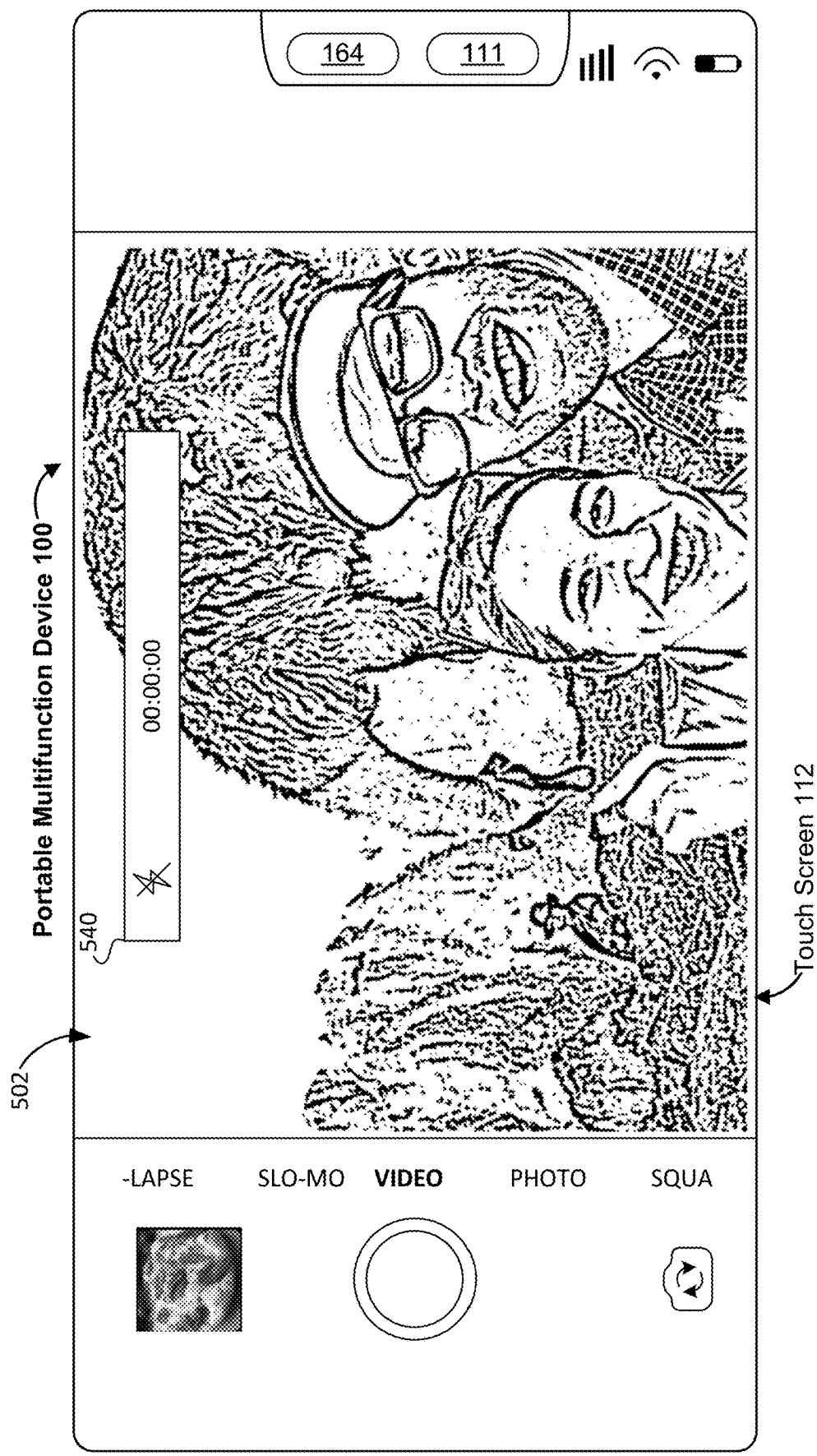

FIGS. 5F-5G illustrate device 100's response to a user input that is analogous to those shown in FIGS. 5A-5E. However, in contrast to FIGS. 5A-5E, FIGS. 5F-5G provide an example in which device 100 is not in an accessibility mode. Thus, in some embodiments, device 100 responds differently to the same user input when device 100 is not in the accessibility mode, as compared to when device 100 is in the accessibility mode.

To that end, FIG. 5F illustrates device 100 displaying a live preview in user interface 502 and detecting a third user input 534 (e.g., a swipe gesture). When the accessibility mode is not active on device 100, device 100 performs an operation that does not include providing a description of an object (e.g., device 100 performs one of a plurality of other possible operations). For example, device 100 switches from a photograph acquisition mode (FIG. 5F) to a video acquisition mode (FIG. 5G) in response to the third user input

534. In FIG. 5G, the video bar 540 shows time elapsed, in this case "00:00:00" preparatory for a user to begin recording a video.

Figure 5H:
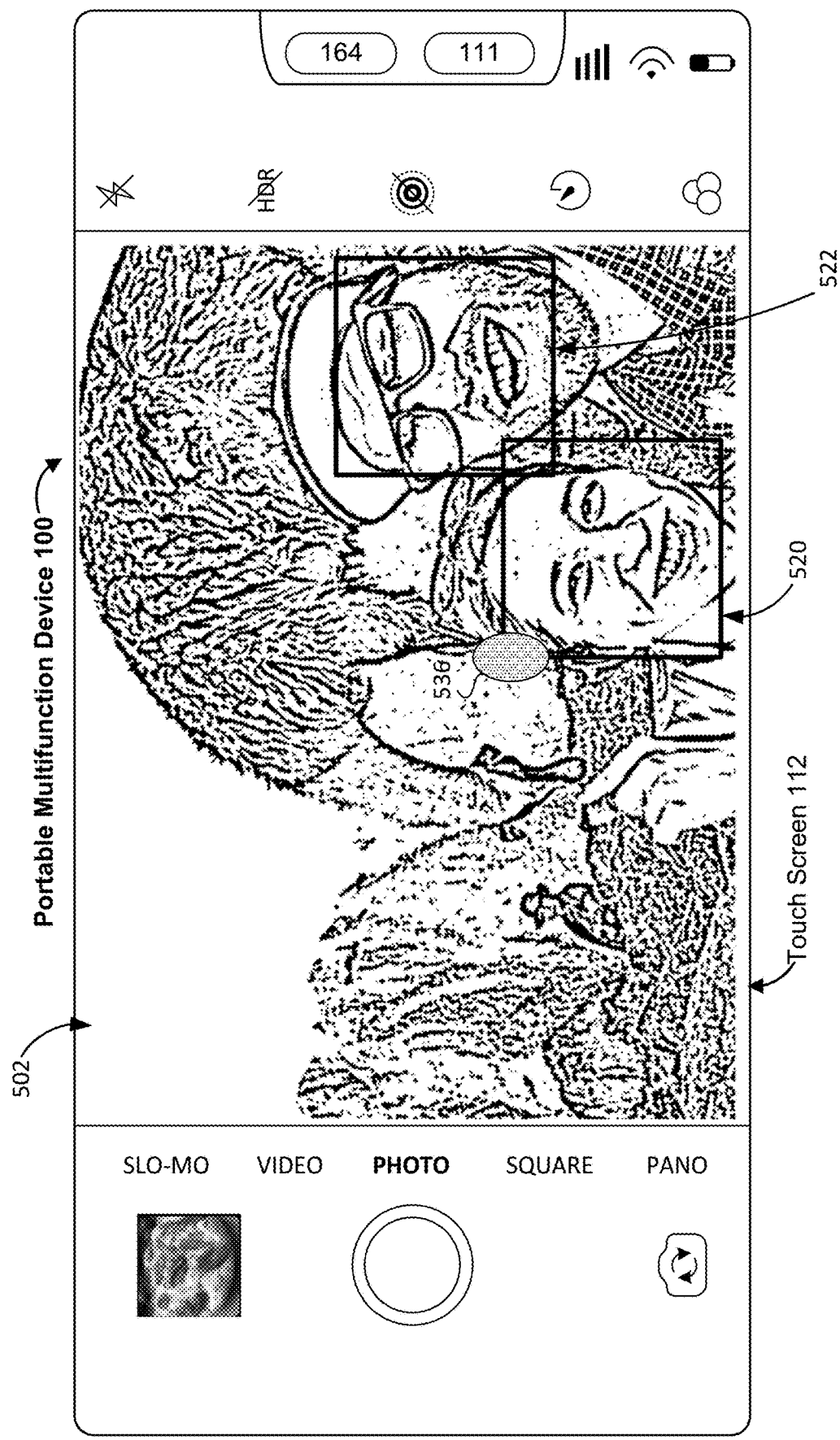
Figure 5I:
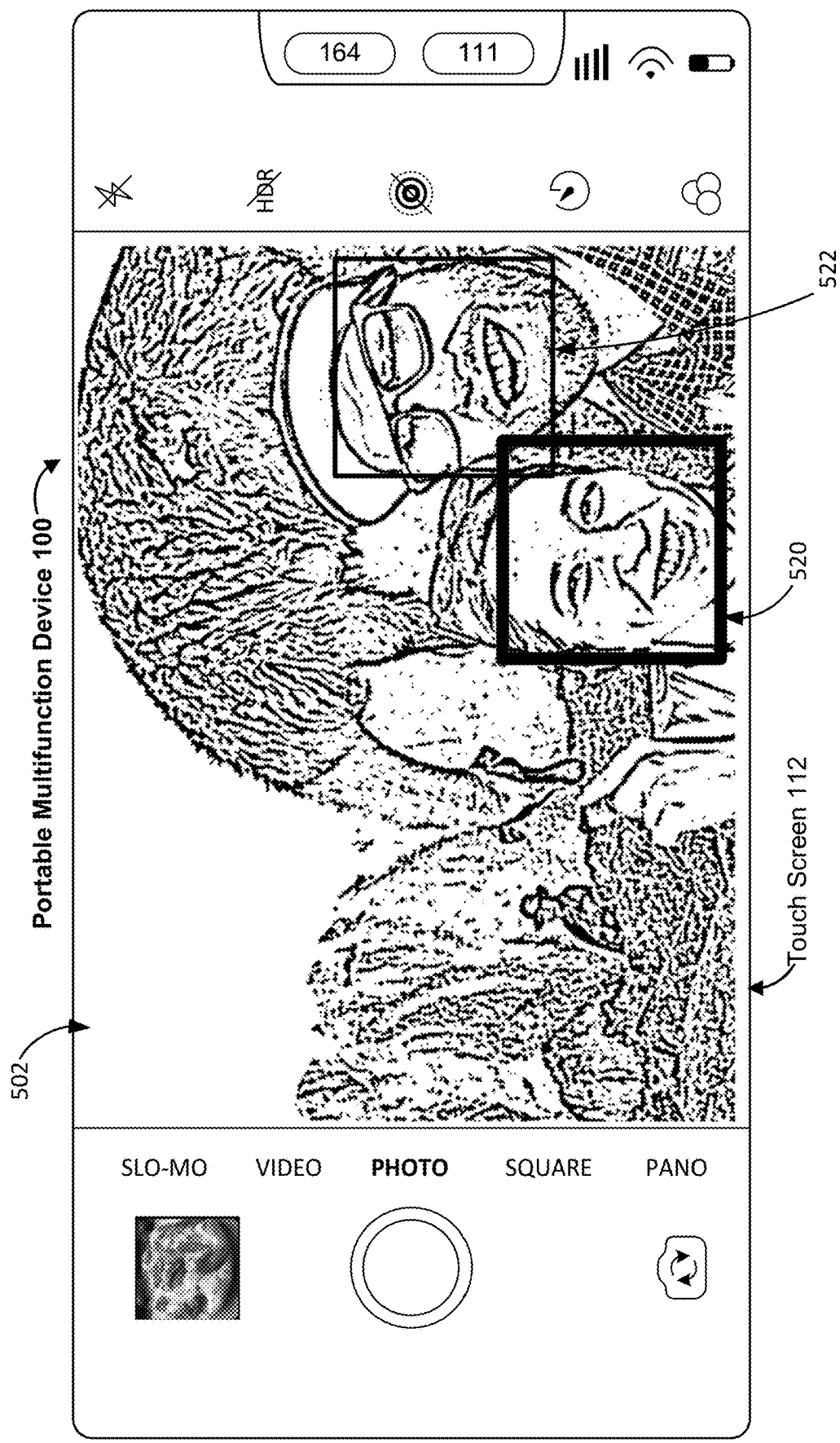
Figure 5J:
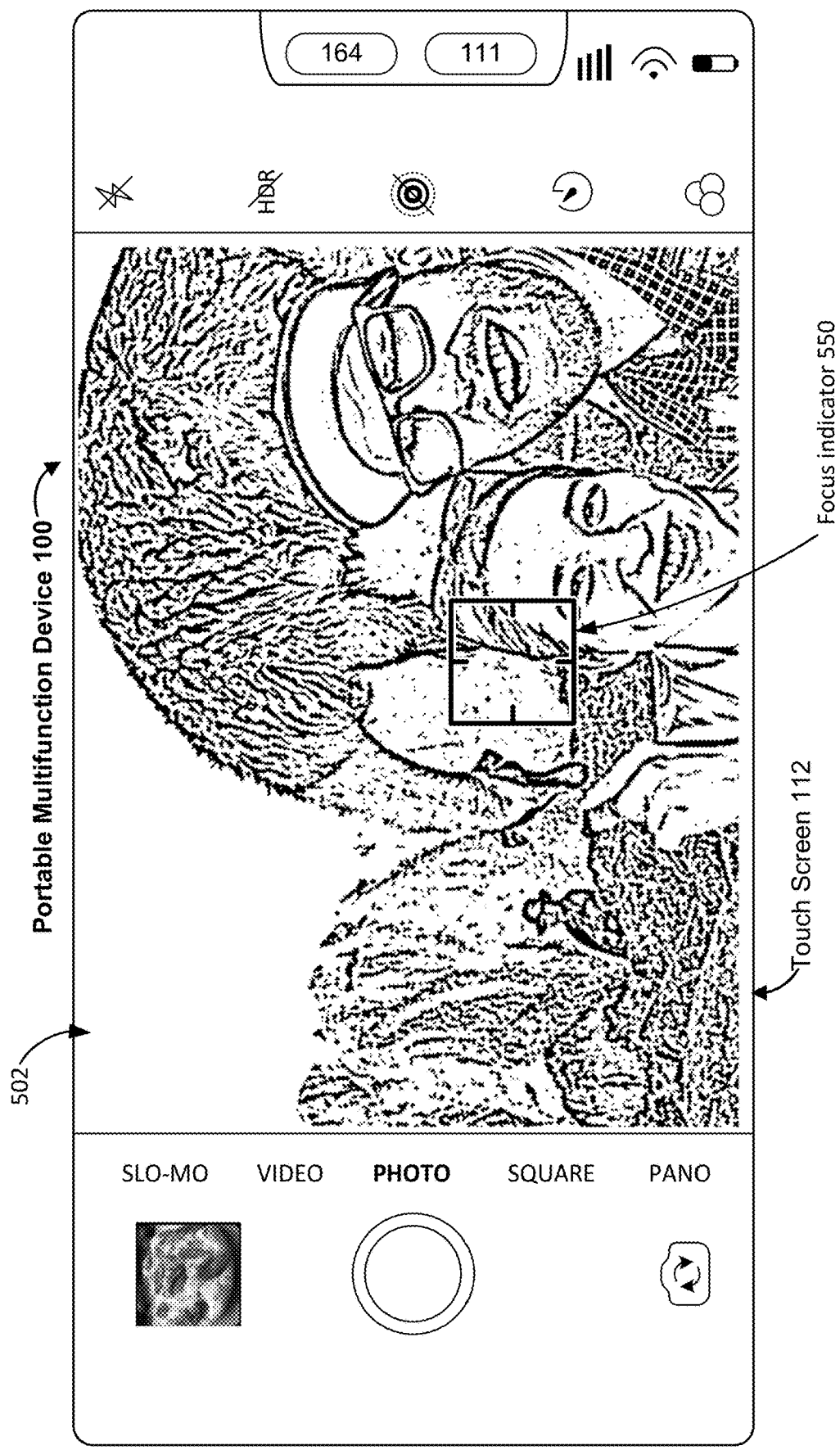

FIGS. 5H-5J illustrate another example in which device 100 responds differently to the same user input depending on whether device 100 is in the accessibility mode. The input (user input 536) is shown in FIG. 5H, while the accessibility mode response is shown in FIG. 5I and the non-accessibility mode response is shown in FIG. 5J.

When device 100 is in the accessibility mode, as shown in FIG. 5I, if user input 536 occurs within one of the bounding boxes, device 100 selects the respective bounding box (e.g., bounding box 520 is selected) and provides an audible description of the object within the selected bounding box (e.g., "smiling woman in the lower right corner of the screen"). In some embodiments or in some circumstances, the object (e.g., the individual) outlined by the bounding box is identified by device 100 as a person in the user's contact list. In such embodiments or circumstances, the device 100 provides an audible identification of the individual when the user input 536 selects the bounding box outlining the respective individual (e.g., "Samantha is wearing sunglasses").

Also note that, while FIGS. 5A-5E illustrate an example in which the object selection input is independent of the user input's location on the touchscreen 112, FIG. 5H-5I and FIG. 5K-5L (discussed below) provide examples in which the object is selected based on a location of the contact on the touchscreen 112.

When device 100 is not in the accessibility mode, device 100 responds to input 536 differently, by performing an alternative operation. For example, in some embodiments, regardless of whether the user input occurs within one of the bounding boxes 520 and 522, when device 100 is not in the accessibility mode, in response to detecting user input 536, device 100 focuses the camera at the selected location (e.g., as depicted by focus indicator 550 in FIG. 5J). In this manner, the user can direct the focus of device 100 to produce a desired photo or video.

Figure 5K:
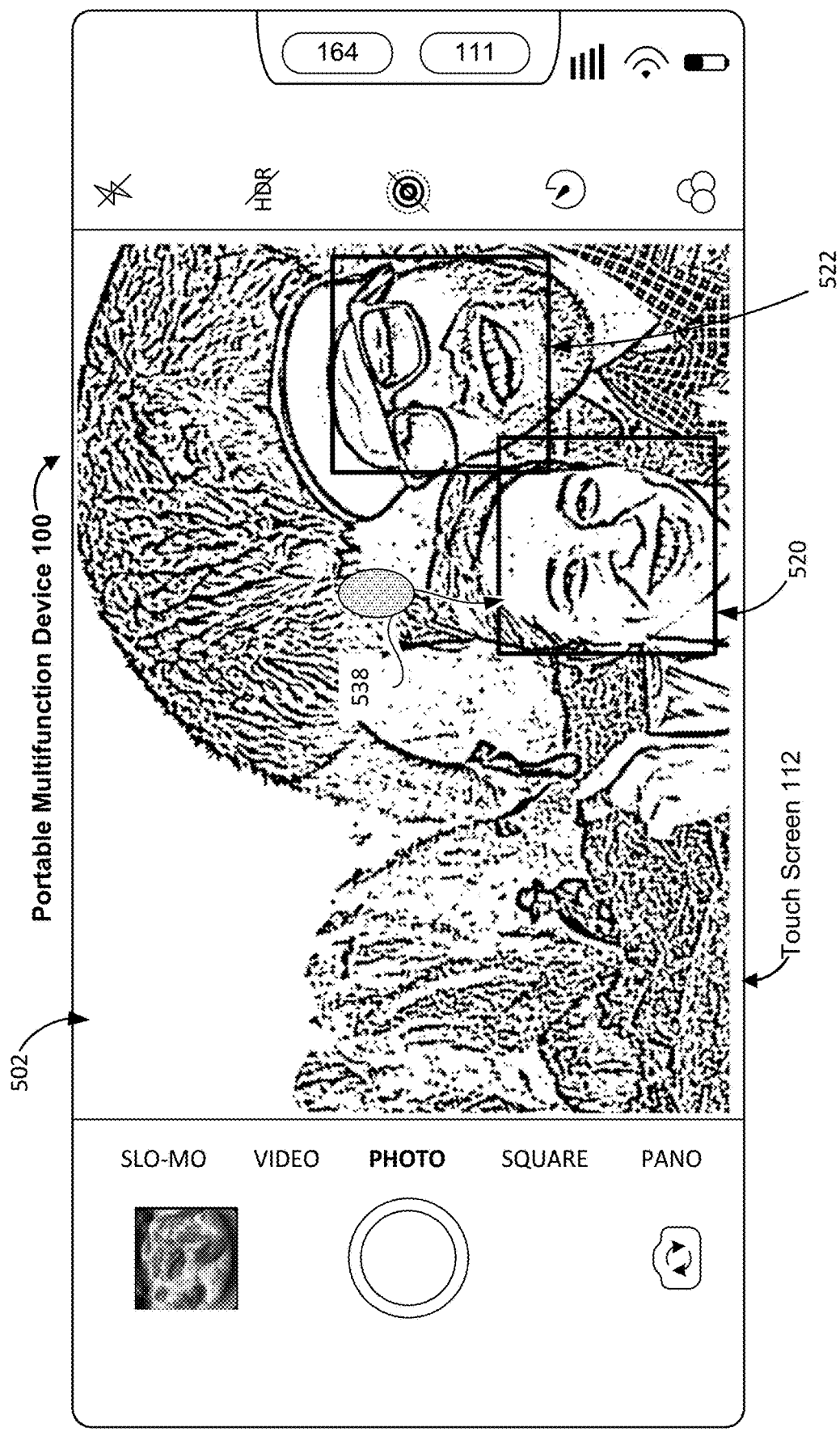
Figure 5L:
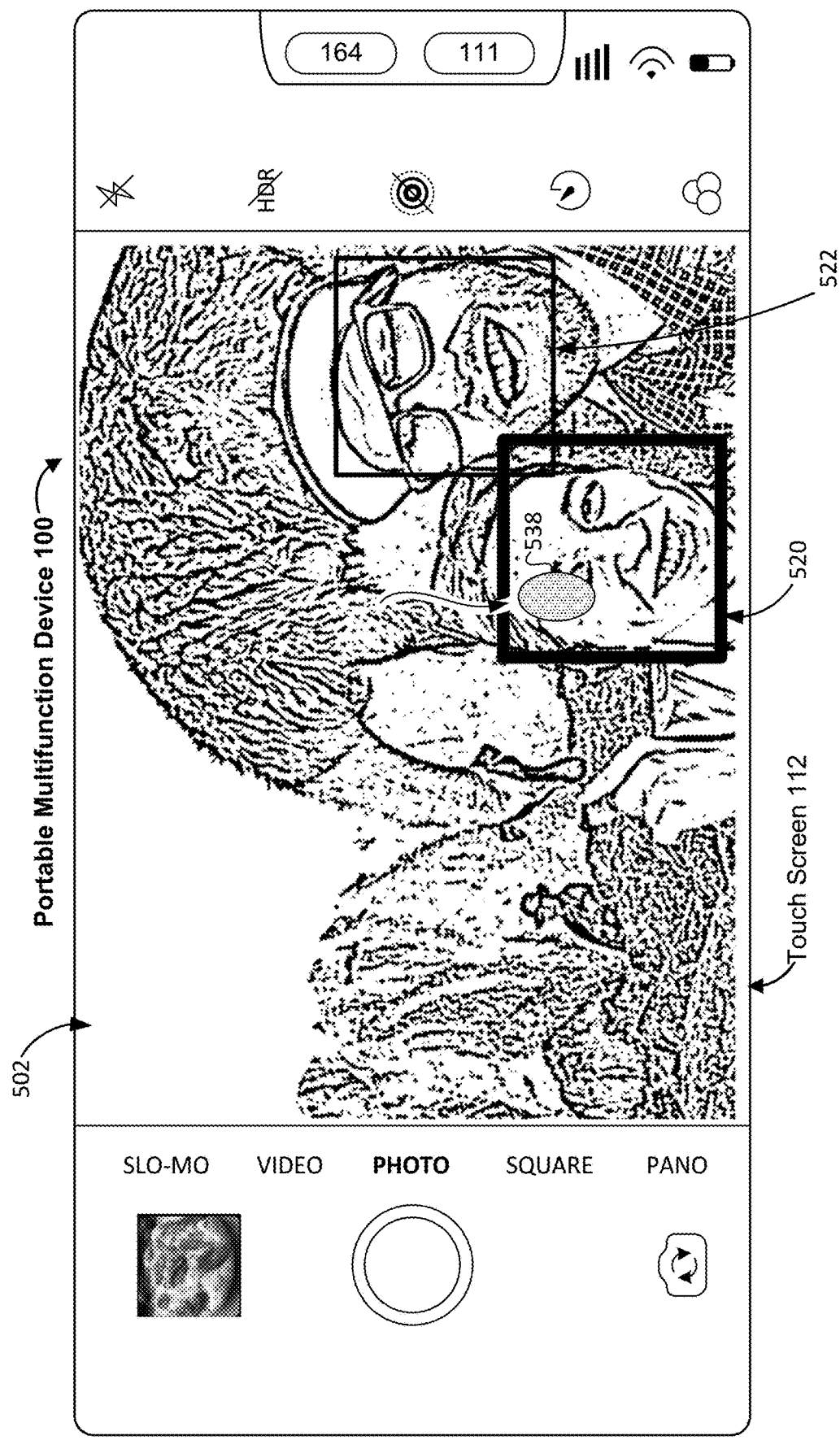

In some embodiments, as shown in FIG. 5K, when device 100 is displaying a live preview and is in the accessibility mode, a user input 538 (e.g., a dragging touch) can select any bounding box on touch screen 112 (e.g., bounding box 520). Upon selection of the bounding box (e.g., as shown in FIG. 5L, user touch 538 moves within the selected bounding box 520), the device provides a description of the object or individual outlined by the selected bounding box (e.g., "Samantha close to the camera" or "smiling woman with brown hair and sunglasses"). In some embodiments, a set of gesture recognizers for recognizing touch-based gestures in a normal mode of operation are disabled when device 100 is in the accessibility mode. In this manner, a low vision or blind user can move his or her finger around the touch screen to search for objects and hear descriptions of those objects, without triggering functionality that would normally be triggered if device 100 were not in the accessibility mode (e.g., switching to a different acquisition mode or refocusing the camera).

Figure 5M:
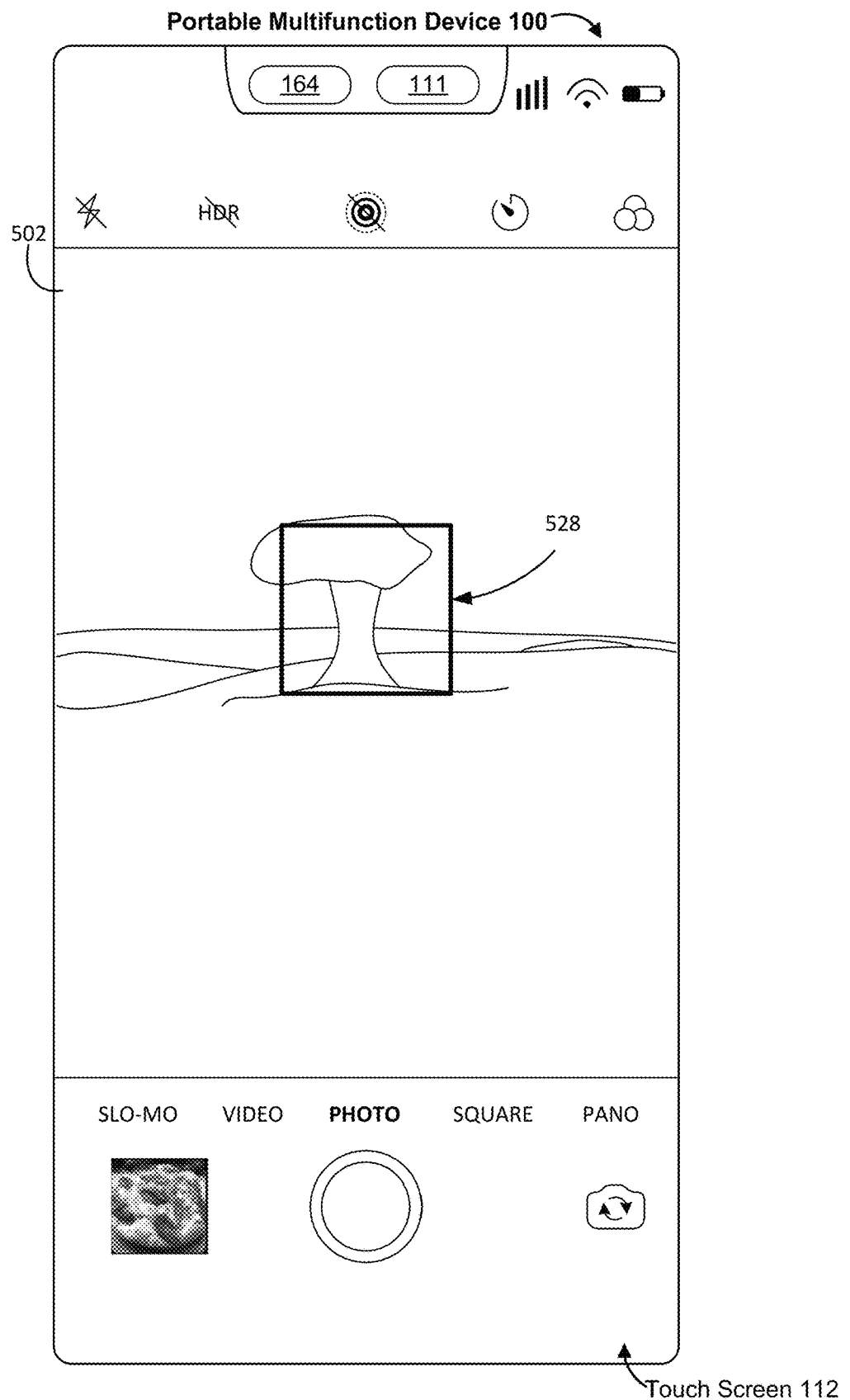

FIG. 5M illustrates device 100 displaying a live preview in the user interface 502. In contrast to the previous Figures, FIG. 5M shows a different scene. In some embodiments, after obtaining one or more images of a scene, device 100 detects one or more prominent objects within the scene (e.g., as indicated by bounding box 528). In some embodiments, device 100 provides an audible description that identifies the respective prominent object outlined by the bounding box (e.g., "A tree is prominent in the middle of this scene").

Figure 5N:
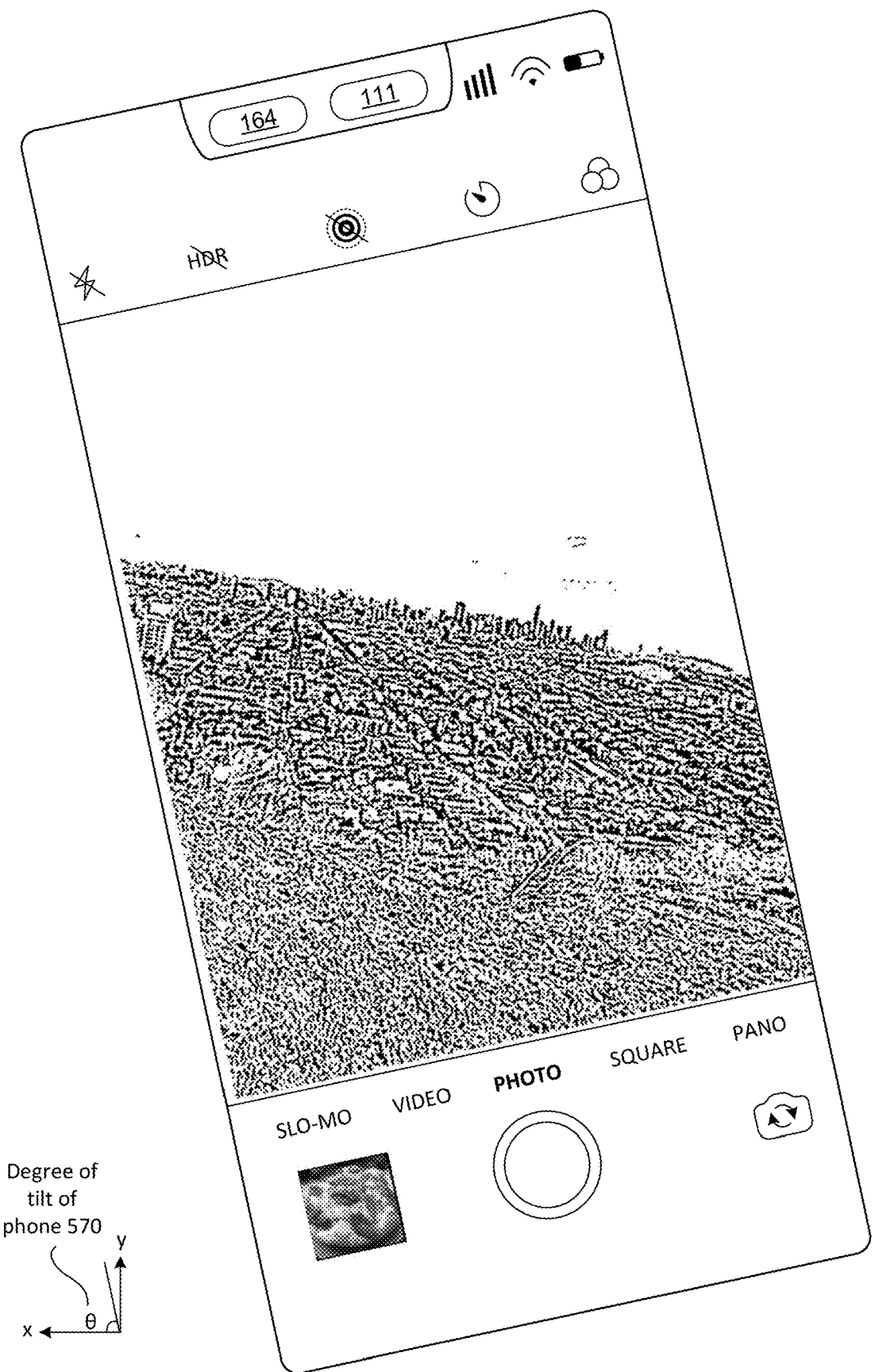
Figure 5O:
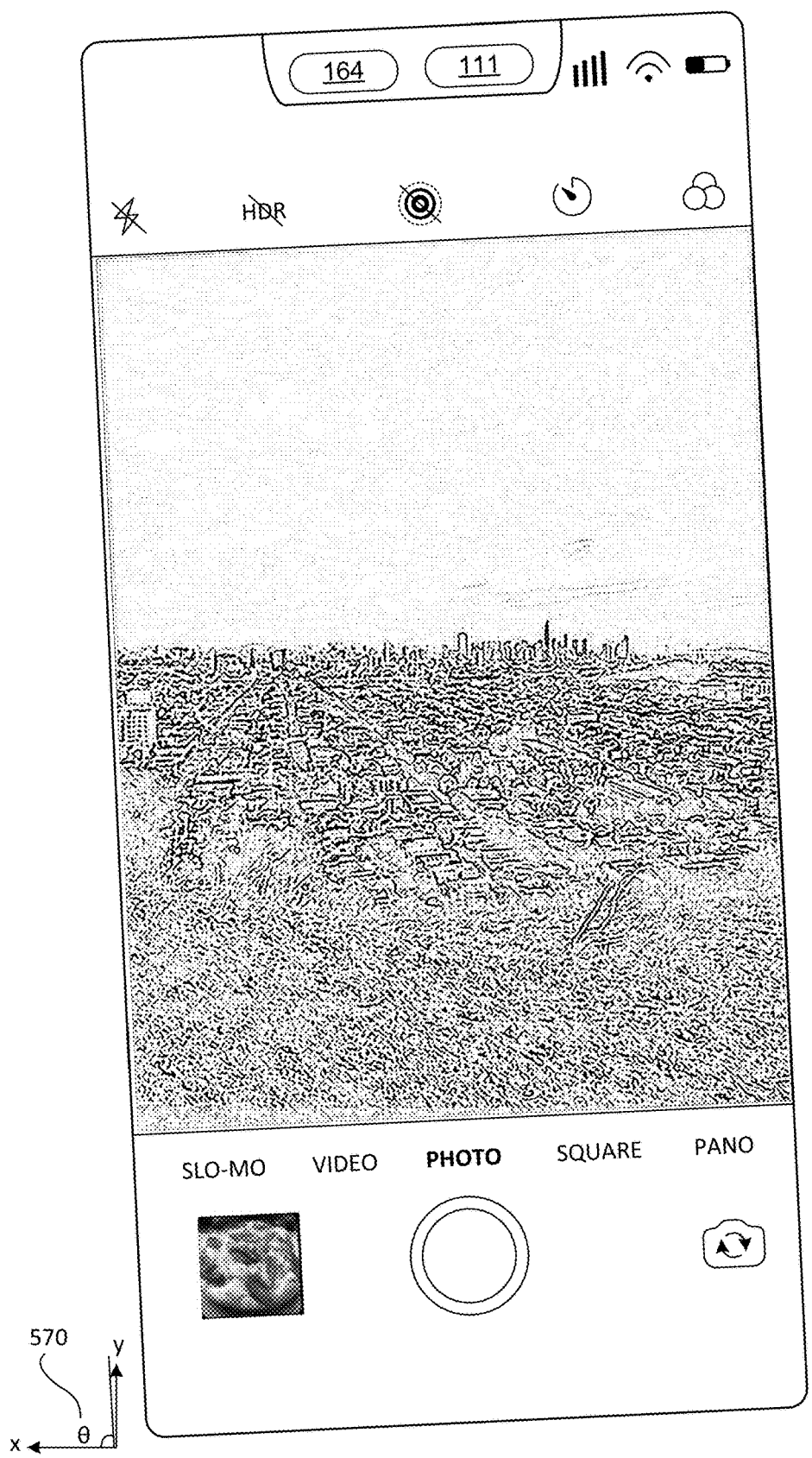
Figure 5P:
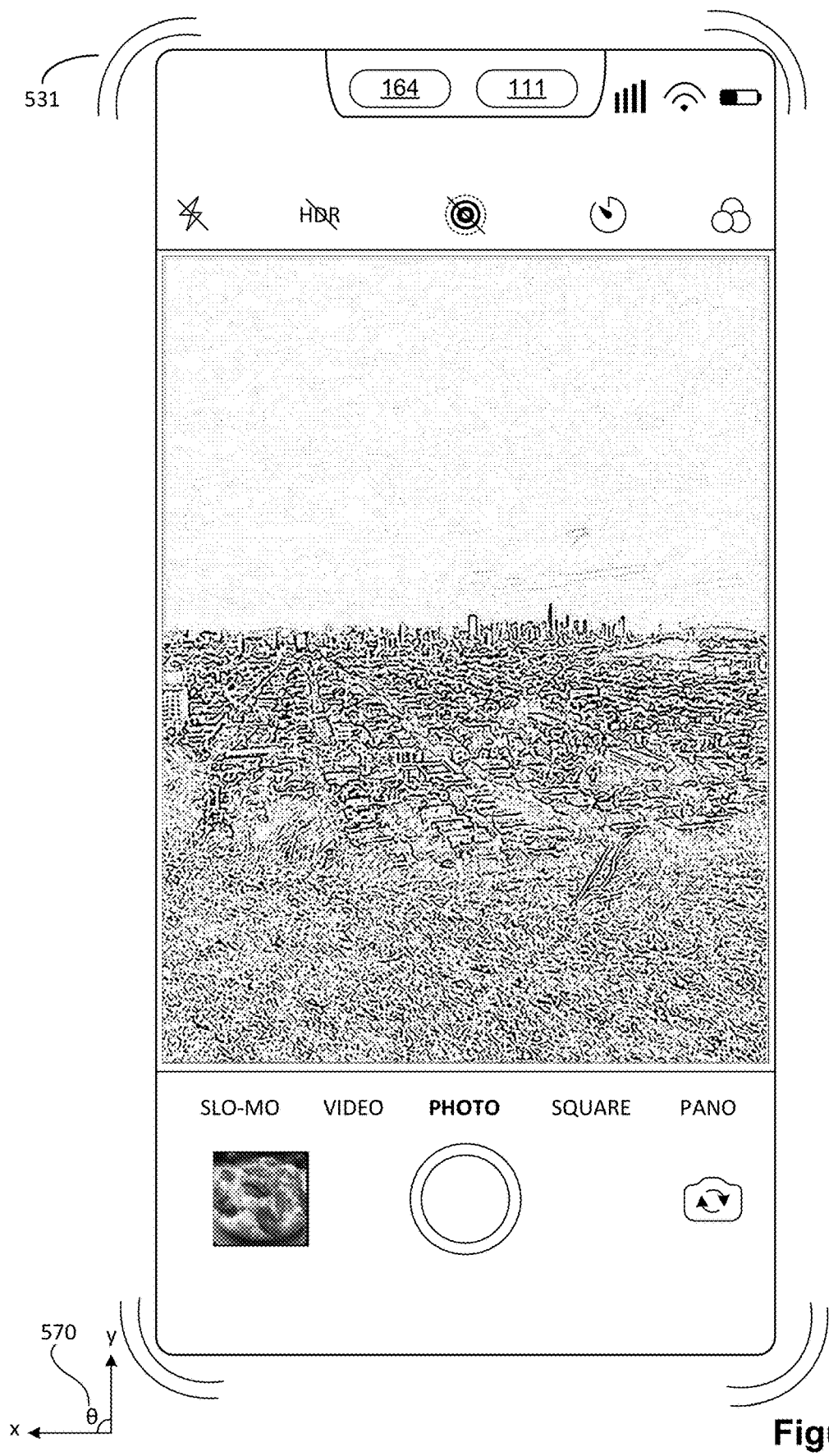

FIGS. 5N-5P illustrate an example in which device 100 provides feedback to inform the user that the device 100 is level. In FIG. 5N, device 100 is in an upright position (e.g., capturing images in portrait mode) but tilted from level (e.g., when the device is level, 0 would be 90° from the x vector). The degree of tilt of the device 570 (e.g., of a respective edge of the device, such as either of the longest edges of the device), 0, is less than 90° from the x vector (e.g., a horizontal vector). In some circumstances, the degree of tilt of the device may be greater than 90° from the x vector. In FIG. 5O, the degree of tilt of the device 570, 0, is still less than 90° from the x vector but greater than the previous degree of tilt 570 (e.g., device 100 has moved toward level). In FIG. 5P, as shown by the degree of tilt of the device 570, the device has rotated into a level position (e.g., moved within a predefined range of 90°, such as within 0.25 degrees, 0.5 degrees, or 1 degree of level). In some embodiments, once the device 100 has reached a level position, device 100 provides an audible output indicating that the device is level (e.g., a sound such as a ding). In addition, or as an alternative to the audible output, in some embodiments, once the device has reached a level position, device 100 provides a tactile output 531 indicating that device 100 is level. In some embodiments, the device 100 also provides tactile and/or audible feedback in accordance with a determination that the subject matter of the scene has changed. For example, in some embodiments, device 100 provides tactile and/or audible feedback in accordance with a determination that a person (or other object or feature) has entered (or exited) the live preview.

Figure 5Q:
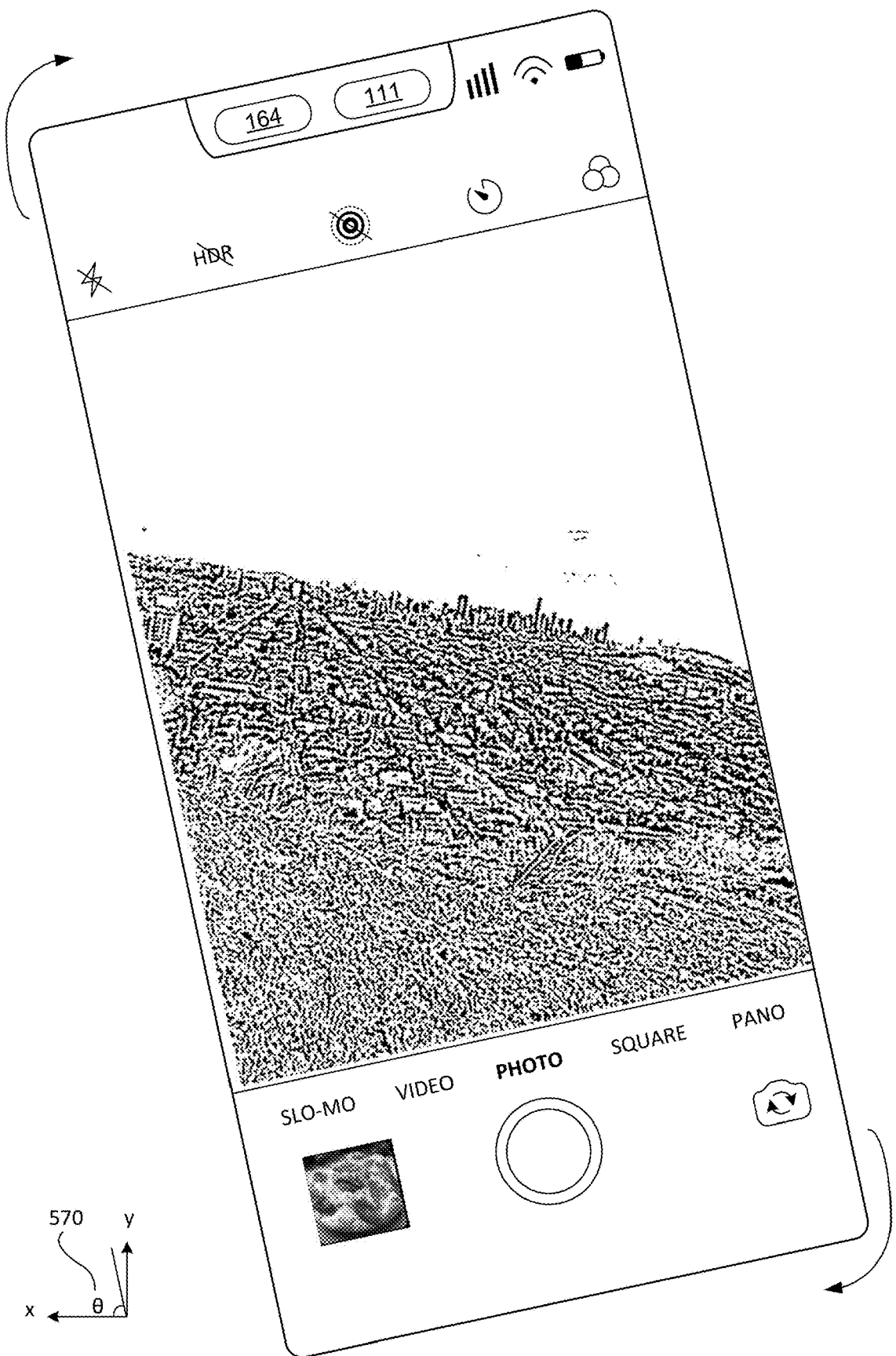
Figure 5R:
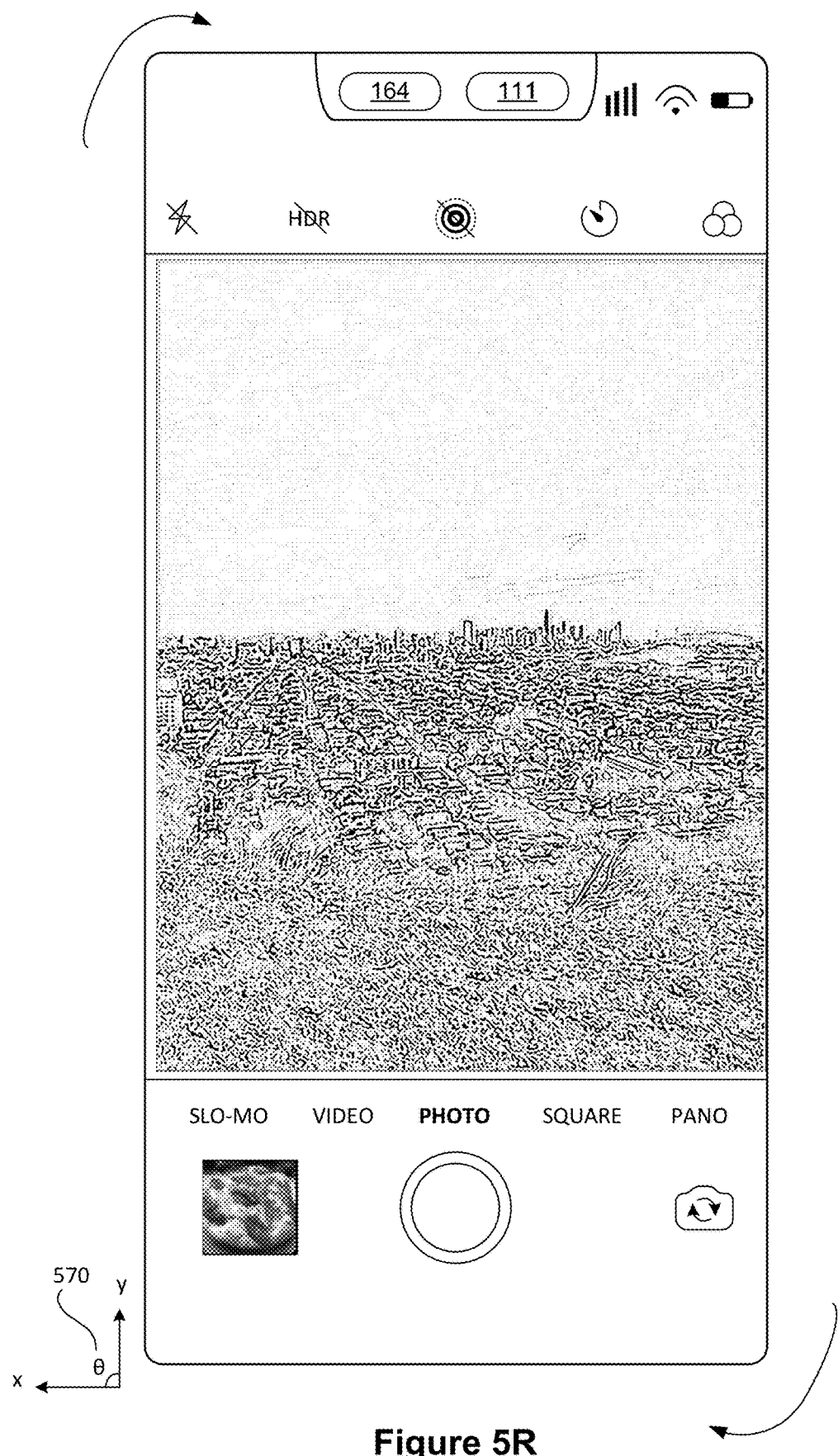
Figure 5S:
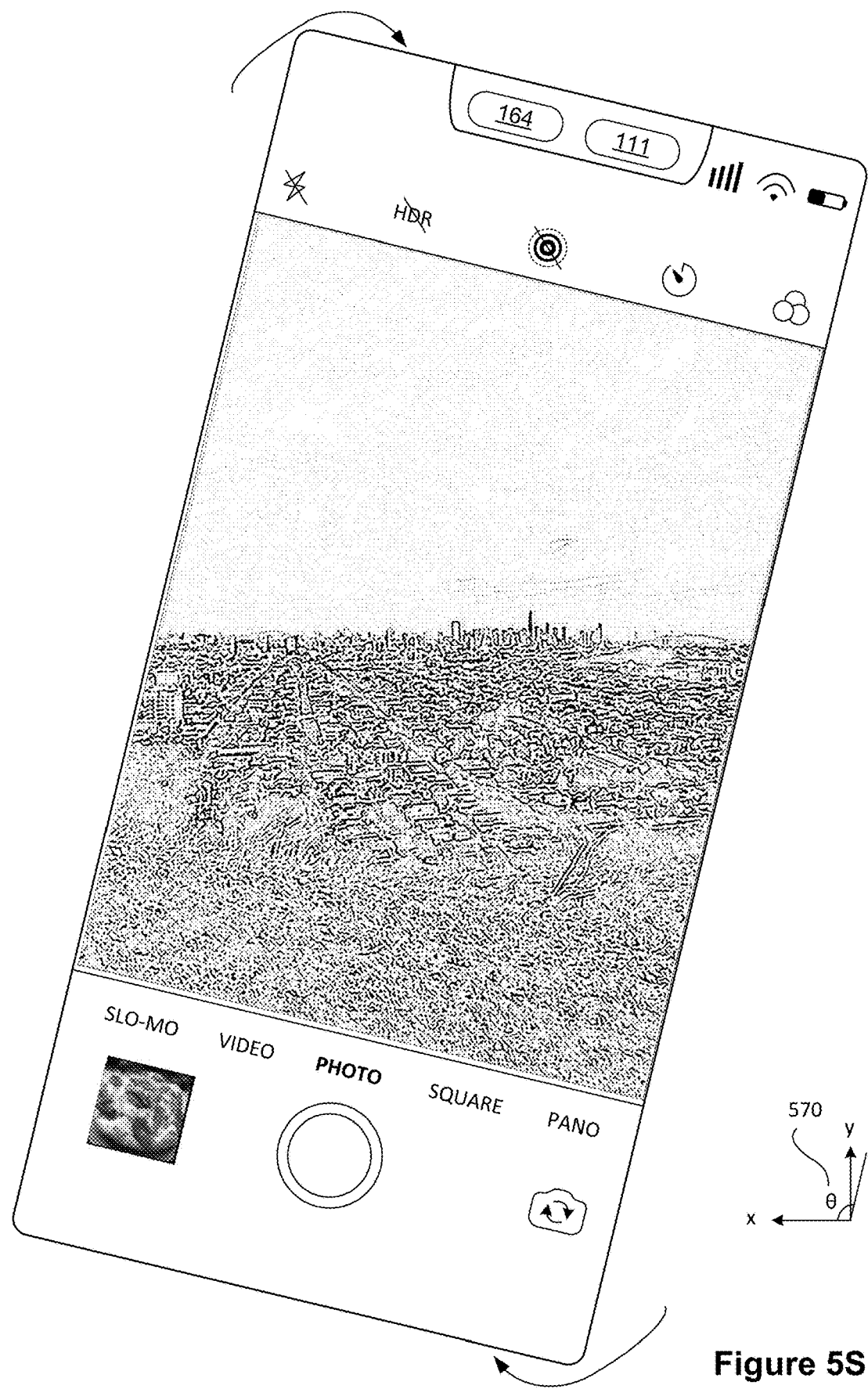

In some embodiments, as shown in FIGS. 5Q-5S, when device 100 moves too quickly through level (e.g., a measured rate of rotational movement of the device exceeds a predefined threshold), device 100 forgoes indicating that device 100 is level. In this manner, device 100 avoids overwhelming the user with tactile and/or audible feedback when the user is, for example, moving the camera to a new position (e.g., swinging the camera around to capture a photo in a different area). Note that, more generally, in some embodiments, to avoid overwhelming the user, the device forgoes provision of some of the tactile and/or audible feedback described herein. For example, in accordance with a determination that feedback-skipping criteria are met, the device forgoes provision of a tactile and/or audible output. In addition to the example described above, in some embodiments, the feedback-skipping criteria are met when other feedback (e.g., audible feedback) is already being provided or is provided. As a more specific example, in some embodiments, the device forgoes providing spoken, audible, and/or tactile output indicating that the device is level while audible output describing the scene is being provided.

To that end, in FIG. 5Q, device 100 is in an upright position (e.g., capturing images in a portrait mode) but tilted from level. The degree of tilt of the device 570, 0, is less than 90° from the x vector. In FIG. 5R, the degree of tilt of the device 570, 0, has reached approximately 90° (e.g., the device has reached the level position). However, as compared to FIGS. 5N-5P, device 100 is rotated quickly through the level position (e.g., the measured rate of rotational movement of the device exceeds a predefined threshold as the device reaches the level position), so device 100 forgoes audible and/or tactile output indicating that device 100 is level. As shown in FIG. 5S, the degree of tilt of the device 570, 0, is rotated more than 90° from the x vector.

Figure 5T:
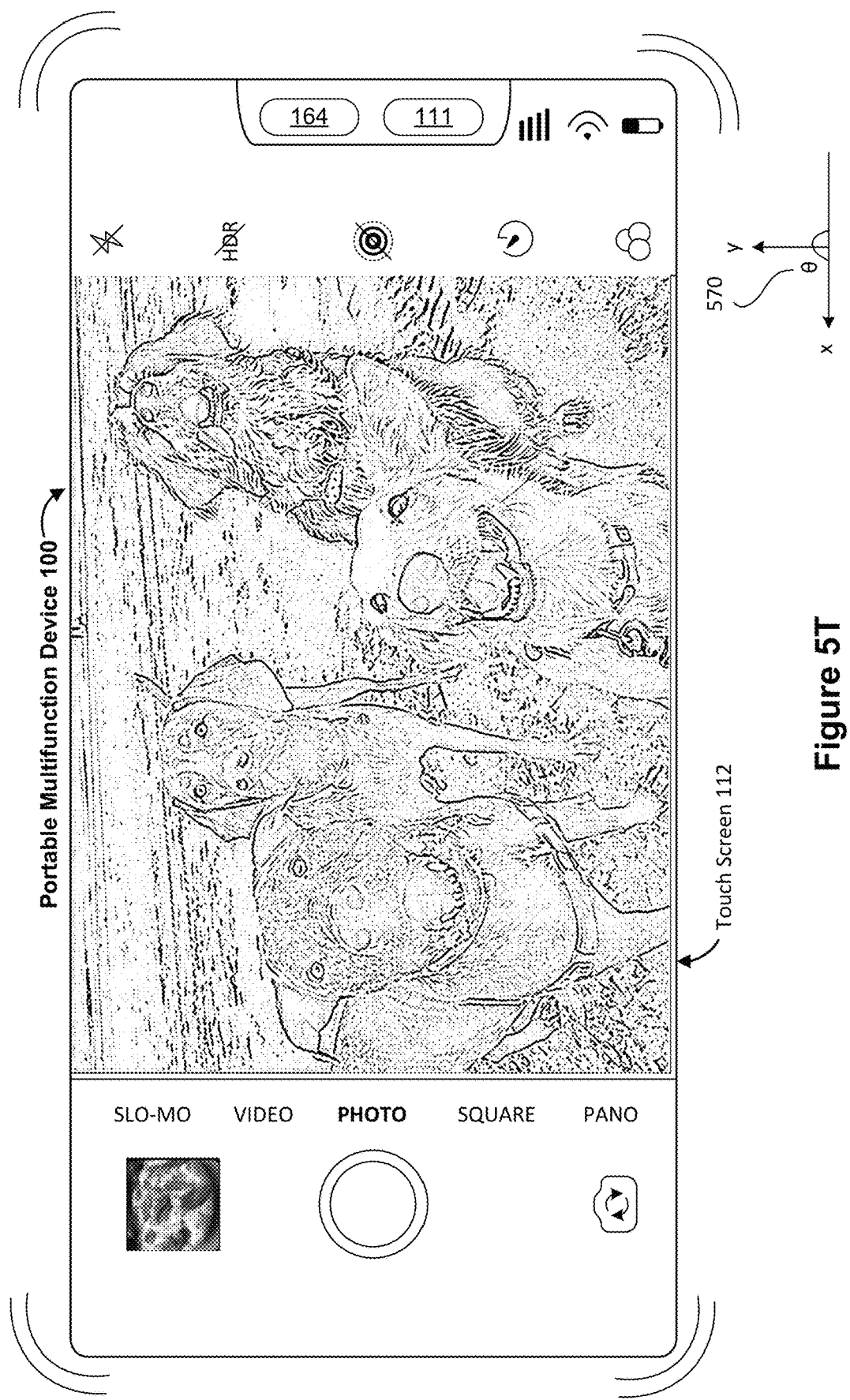

In some embodiments, device 100 selects an axis to which to compare to the level vector based on the mode the device is in (e.g., the orientation of the user interface of device 100, e.g., portrait mode vs. landscape mode). To that end, FIG. 5T illustrates device 100 displaying a live preview in landscape mode. In FIG. 5T, device 100 provides an audible and tactile output when the user interface, displayed in landscape mode rather than portrait mode, is level (e.g., is within a predefined range of level, such as 0.25 degrees, 0.5 degrees, or 1 degree of level). In some embodiments, device 100 moves through portrait mode and into landscape mode (e.g., the device is rotated at least 90°) and provides audible and/or tactile output that device 100 has become level in landscape mode. In some embodiments, a device 100 moves through landscape mode and into portrait mode (e.g., the device is rotated 180° relative to the x vector) and provides audible and/or tactile output that device 100 has become level in portrait mode. When determining whether the device is level in landscape mode, in some embodiments, device 100 determines whether the degree of tilt of the device 578 (e.g., the respective edge of the device), 0, has reached the plumb position (e.g., moved within a predefined range of 180°, such as within 0.25 degrees, 0.5 degrees, or 1 degree of level).

In some embodiments, device 100 determines the number of objects in the scene. In some embodiments, when the number of objects is below a threshold number, the first audible description summarizes the objects in the scene (e.g., "a brown dog near the camera," "a brown dog," "a yellow dog near the camera," and/or "a sitting dog"). In some embodiments, when the number of objects is above a threshold number, the first audible description summarizes the scene (e.g., "four dogs"). In some embodiments, the threshold number of objects is at least 2 objects, at least 3 objects, at least 4 objects, at least 5 objects, at least 10 objects, at least 15 objects, or at least 20 objects.

Figure 5U:
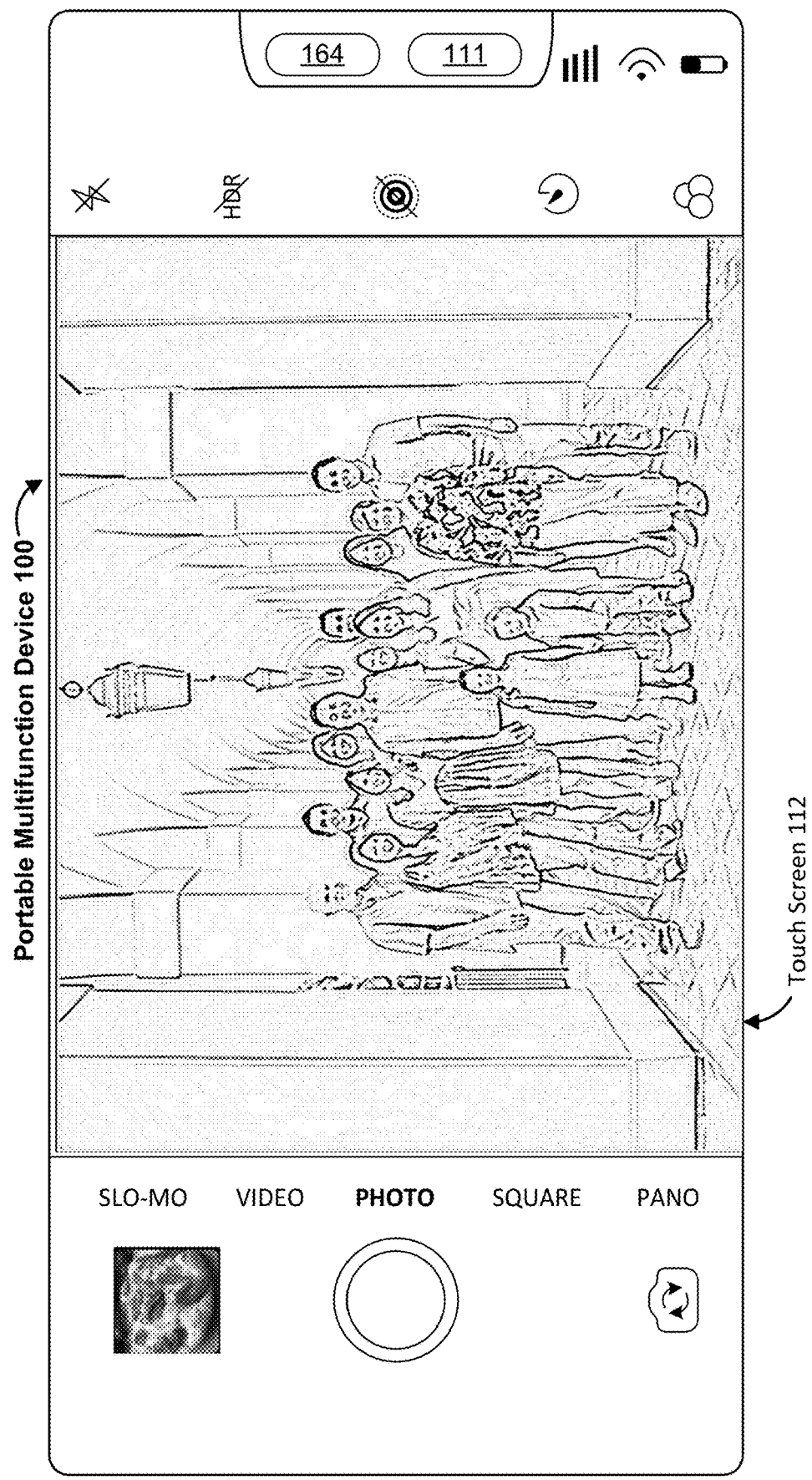

FIG. 5U illustrates device 100 displaying a live preview of another scene in the user interface 502. In some embodiments, device 100 determines a number of objects in the scene (e.g., a plurality of people in the scene). In FIG. 5U, the number of people in the image exceeds a threshold number of people. In such embodiments, device 100 provides an audible description that identifies the number of people in the scene (e.g., "There are fourteen people in the scene, far from the camera"). In some embodiments, the threshold number of people is at least 2 people, at least 3 people, at least 4 people, at least 5 people, at least 10 people, at least 15 people, or at least 20 people.

Figure 5V:
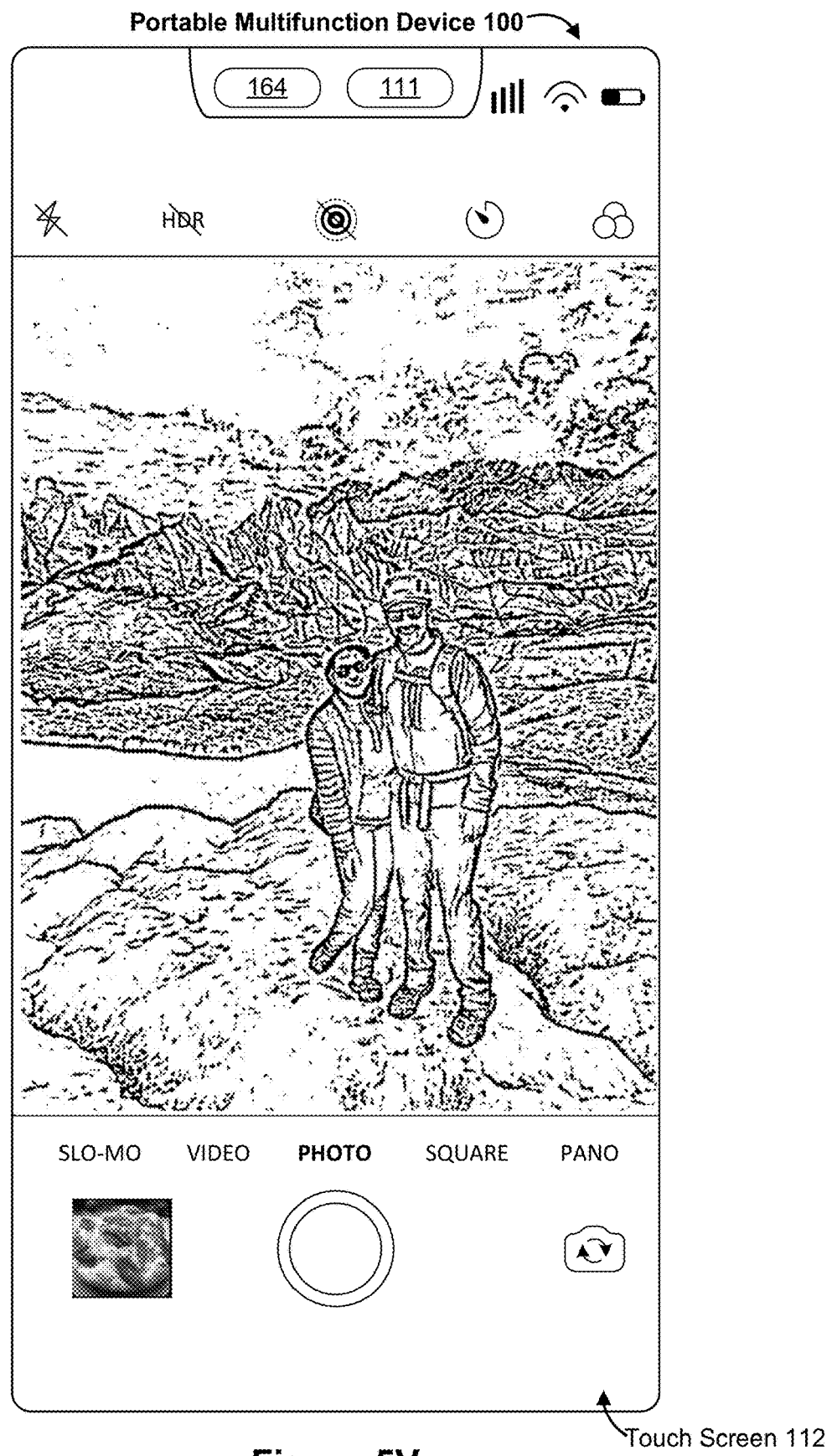

FIG. 5V illustrates device 100 displaying a live preview of another scene in the user interface 502. In some embodiments, the number of people in the image is less than a threshold number of people. In such embodiments, the device 100 identifies individual people within the scene (e.g., "Samantha and Alex far away in the image, centered in the image").

Figure 5W:

In some embodiments, as shown in FIG. 5W, when the live preview updates (e.g., the user zooms in or out of a scene, or moves closer to or farther from the objects) the audible description of the scene and/or a selected object is updated (e.g., "Samantha and Alex are now closer to the camera" or "Samantha and Alex are now closer to the camera and are on the right side of the screen").

Figure 5X:
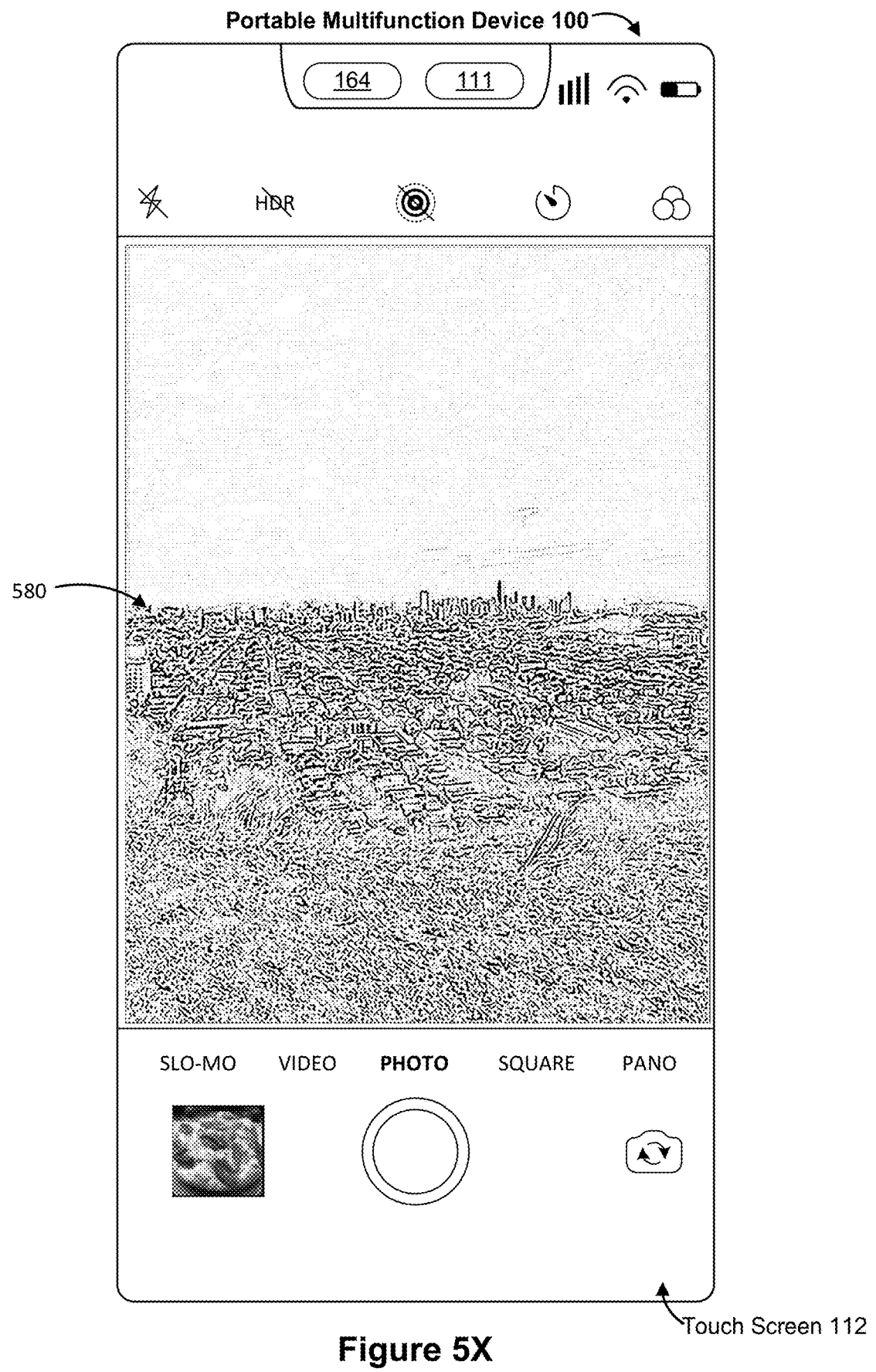

FIGS. 5X-5AA illustrate examples in which device 100 provides different feedback depending on which of a plurality of accessibility modes is active. For example, in some embodiments, device 100 may be in either a standard accessibility mode or an artistic accessibility mode for taking photographs. The former may be appropriate for, e.g., taking selfies and functional photographs (e.g., pictures of receipts) whereas the latter may be appropriate when the user wants to take a compositionally complex photograph. For example, in the artistic accessibility mode, the device provides audible descriptions of a live preview based on the "rule of thirds," which suggests that an image should be compositionally divided into nine equal parts by two equally spaced horizontal lines and two equally spaced vertical lines (e.g., a three-by-three grid), and that important compositional elements should be placed along these lines or their intersections.

FIG. 5X illustrates a device 100 displaying a live preview in a standard accessibility mode. In some embodiments, in the standard accessibility mode, device 100 provides information regarding the position of a respective feature within the scene (e.g., the horizon 580) with respect to boundaries of the image and/or the center of the image (e.g., without respect to the rule of thirds, as described below). For example, in the standard accessibility mode, device 100 provides an audible description of the scene such as "A landscape" or "The horizon is at a distance from the camera in the center of the image."

Figure 5Y:
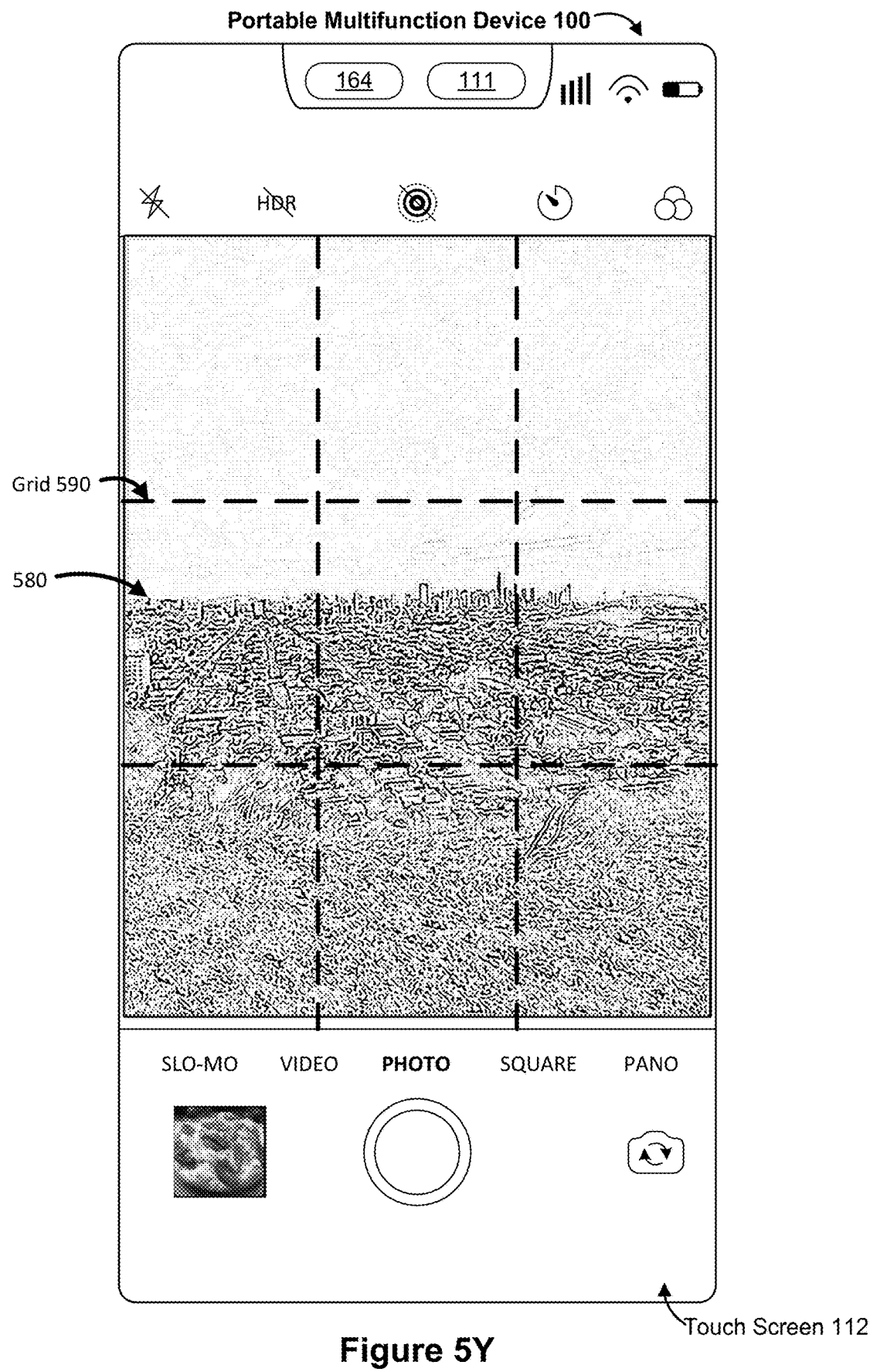
Figure 5Z:
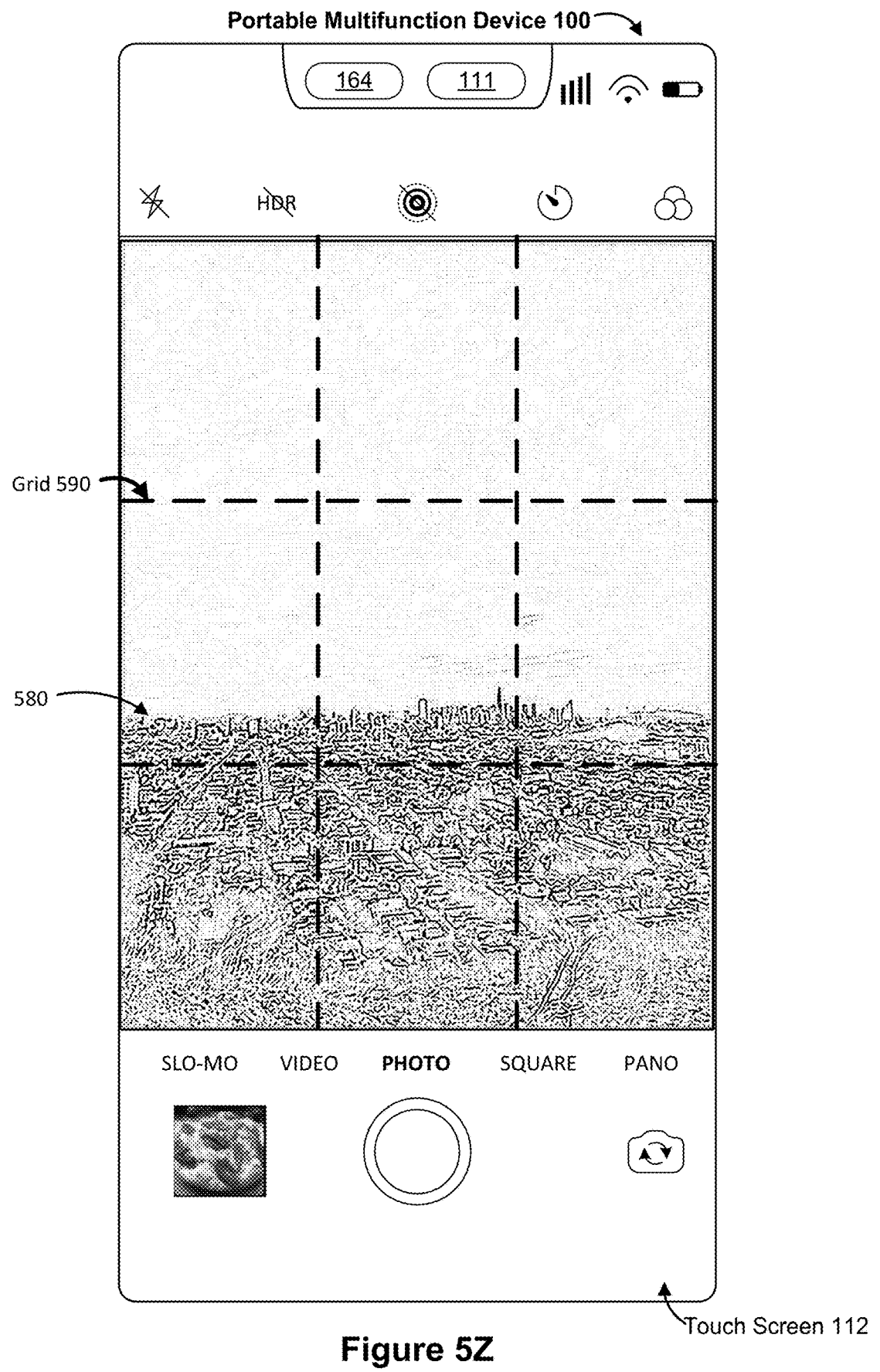
Figure 5A:
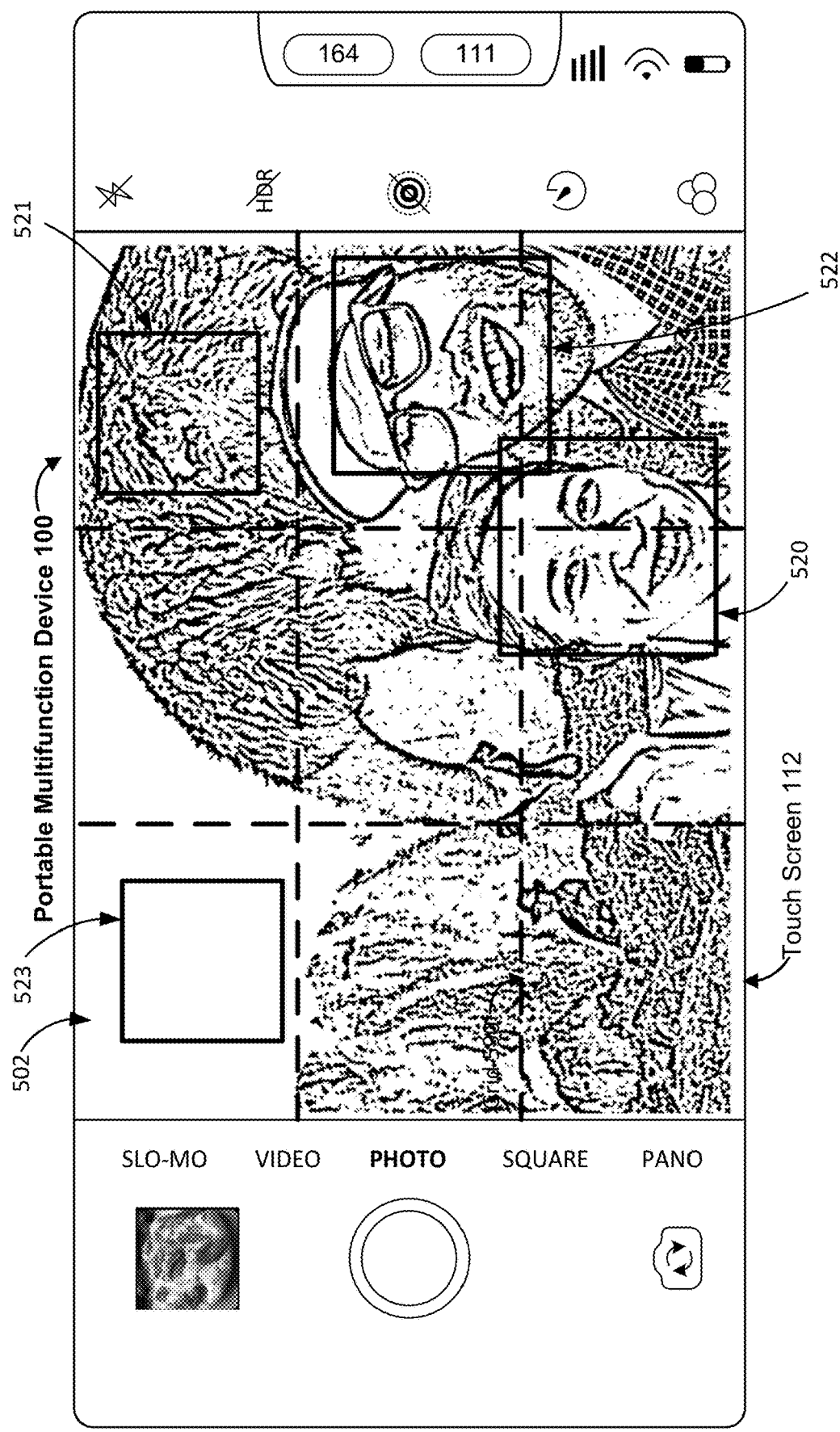

In some embodiments, when the artistic accessibility mode is active on device 100, as illustrated in FIG. 5Y, device 100 provides information regarding the position of a respective feature within the scene (e.g., the horizon 580) with respect to a three-by-three grid 590 (e.g., using the rule of thirds). In some embodiments, the three-by-three grid is displayed. In some embodiments, device 100 suggests that the user move a respective feature to one of the boundaries outlined by the three-by-three grid 590. For example, the device 100 suggests that the composition of the photograph would be improved by positioning the horizon 580 at a boundary of the three-by-three grid. As shown in FIG. 5Z, the user has moved device 100 so that the horizon 580 is closer to the boundary between the middle and the lower thirds of the three-by-three grid 590. This helps to achieve a more beautiful image.

In some embodiments, as illustrated in FIG. 5AA, the user can select a feature in a scene and, subsequently receive "rule of thirds" guidance for that feature. To that end, FIG. 5AA illustrates device 100 displaying a live preview of the scene shown in FIGS. 5A-5L. In some embodiments, device 100 detects a plurality of respective features within the scene (e.g., features delineated by bounding boxes 520, 521, 522 and 523). In some embodiments, one or more of the respective features are objects (e.g., the objects corresponding to bounding boxes 520, 521, and 522) and one or more of the respective features are background elements (e.g., the sky, indicated by bounding box 523). In some embodiments, when the artistic accessibility mode is active on device 100, when the user selects a respective feature (e.g., a respective object, as described with reference to FIGS. 5A-5L), device 100 provides an audible description of the respective feature with respect to the three-by-three grid (rather than, or in addition to, the descriptions provided with reference to the examples in FIGS. 5A-5L).

FIGS. 6A-6C are flow diagrams illustrating a method 600 of providing users (e.g., low-vision and blind users) with non-visual assistance for taking photographs, in accordance with some embodiments. Method 600 is performed at an electronic device (e.g., device 300, FIG. 3, or portable multifunction device 100, FIG. 1A) with a camera. In some embodiments, the device includes a display and a touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, method 600 provides an intuitive way for low-vision or blind users to efficiently take high-quality photographs. Taking a photograph is one of the most important features of any modern smartphone (or other portable multifunction device). Whether it is capturing a memory for a personal library, or for communicating on social media, users are constantly taking and sharing photos. Therefore, it is essential that all users, including low-vision and blind users, be able to take basic photographs, and desirable that they be able to take beautiful and artistic photographs.

Due to the inherent visual aspects of photography, it is difficult for low-vision and blind users to take great photographs with standard user interfaces. As described below, method 600 aids low-vision and blind users in taking high-quality photographs by providing audible scene- and object-level descriptions of images (e.g. displayed in a live preview of image content being captured by the camera). Providing audible descriptions of images enhances the operability of the device and makes the user-device interface more efficient (e.g., by reducing the number of attempts that a low-vision or blind user must go through to take a quality photograph). For battery-operated electronic devices, allowing low vision and blind users to take quality photographs more efficiently conserves power and increases the time between battery charges.

The electronic device obtains (602) one or more images of a scene. In some embodiments, the electronic device includes a camera. In some embodiments, the one or more images are obtained by the camera (e.g., displayed in a live preview of image content being captured by the camera, as shown in FIG. 5A). In some embodiments, the live preview is a displayed as part of an image capture user interface (e.g., within a camera application). In some embodiments, the live preview is displayed in a camera mini-application in a messaging user interface (e.g., of a messaging application).

In some embodiments, the device includes the camera. The device detects (604), using one or more sensors, an orientation of a first axis of the electronic device relative to a respective vector, as shown in FIGS. 5N-5T. In some embodiments, the first axis is or is parallel to a side edge or a top or bottom edge of the device. In some embodiments, the respective vector is a level vector or a plumb vector. In accordance with a determination that the first axis of the electronic device has moved within a predefined range of the respective vector, the device provides a first audible and/or tactile indication that the camera is obtaining level images of the scene. In some embodiments, the predefined range is +/−0.25 degrees, 0.5 degrees, or 1 degree. In some embodiments, the first axis is determined in accordance with a displayed orientation of the user interface on the device (e.g., is or is parallel to a side edge of the electronic device when the device is in landscape mode and is or is parallel to a top or bottom edge of the electronic device when the device is in portrait mode).

In some embodiments, rather than using the one or more sensors (e.g., gyroscopes, MEMS accelerometers, magnetometers), the device detects the respective vector in the one or more images obtained by the camera (e.g., detects a level feature, such as the horizon). In some embodiments, the device uses the respective vector detected in the scene to determine that the first axis of the electronic device has moved within a predefined range of the respective vector.

Providing an audible and/or tactile indication that the camera is obtaining level images of the scene allows low-vision and blind users to take quality photographs more efficiently (e.g., with fewer attempts). Providing improved feedback for low vision and blind users enhances the operability of the device and makes the user-device interface more efficient (e.g., by helping the user to provide proper inputs and reducing the amount of effort required to take quality photographs).

In some embodiments, in accordance with a determination that the orientation of the first axis of the electronic device has moved outside of the predefined range of the respective vector, the device provides (606) a second audible and/or tactile indication. The second audible and/or tactile indication indicates that the camera is not obtaining level images of the scene. In some embodiments, the first audible and/or tactile indication includes a first sound and the second audible and/or tactile indication includes a second sound, different from the first sound. For example, the tactile indication that the camera is not obtaining level images is analogous to the tactile indication that the camera is obtaining level images, as described with reference to FIG. 5P. The second audible indication that the camera is not obtaining level images of the scene is analogous to the audible indication that the camera is obtaining level images of the scene, as described with reference to FIG. 5P, but the second audible indication differs in at least one characteristic (e.g., a different sound such as a "bing" versus a "beep," a different pitch, etc.).

Providing an audible and/or tactile indication that the camera is not obtaining level images of the scene allows low-vision and blind users to take quality photographs more efficiently (e.g., with fewer attempts). Providing improved feedback for low vision and blind users enhances the operability of the device and makes the user-device interface more efficient (e.g., by helping the user to provide proper inputs and reducing the amount of effort required to take quality photographs).

In some embodiments, in accordance with a determination that the orientation of the first axis of the electronic device meets movement threshold criteria upon moving within the predefined range of the respective vector, the device forgoes (608) provision of the first audible and/or tactile indication. In some embodiments, the movement threshold criteria include a criterion that is met when the entire device is moving above a threshold speed (e.g., a linear speed). In some embodiments, the movement threshold criteria include a criterion that is met when a rotational speed of the first axis is above a threshold rotational speed (e.g., as illustrated by FIGS. 5Q-5S).

Forgoing the audible and/or tactile indication that the camera is obtaining level images when the device is moving too fast prevents bombarding the user with audible and/or tactile feedback, which helps users pay attention to more important feedback. This is especially important for low-vision and blind users, since the amount of non-visual feedback is typically greatly increased. Providing improved feedback for low vision and blind users enhances the operability of the device and makes the user-device interface more efficient (e.g., by helping the user to provide proper inputs and reducing the amount of effort required to take quality photographs).

After obtaining the one or more images of the scene (and/or while device continues to obtain images of the scene) (e.g., in response to obtaining the one or more images of the scene), the device detects (610) a plurality of objects within the scene (e.g., as illustrated with bounding boxes 520 and 522 in FIG. 5A). In some embodiments, the detected objects include people, animals, and/or food. In some embodiments, an object is anything identified as prominent in the one or more images (e.g., trees, buildings, signs, etc.).

The device provides (612) a first audible description of the scene, wherein the first audible description provides information corresponding to the plurality of objects as a group (e.g., a scene-level description). In some embodiments, the first audible description is provided while a first mode (e.g., an accessibility mode) is active on the device. In some embodiments, the first audible description is provided in accordance with a determination that the first mode is active on the device. In some embodiments, the first audible description is provided without user input after obtaining (e.g., in response to obtaining) the one or more images of the scene. As described in more detail below, in some embodiments, the first audible description identifies how many prominent objects are present in the scene (e.g., includes a count of prominent objects, e.g., "four dogs"). In some embodiments, the first audible description identifies how many people are present in the scene (e.g., includes a count of people) and, optionally, their sizes and/or locations in the image (e.g., "centered in the image," "on the left side of the image," "near the top edge of the image").

In some embodiments, in accordance with a determination that a number of objects in the scene is below a threshold, the first audible description includes (614) a first summarization of the scene (e.g., as described with respect to FIGS. 5V and 5T). In some embodiments, in accordance with a determination that the number of objects in the scene is above the threshold, the first audible description includes a second summarization of the scene, different from the first summarization of the scene (e.g., as illustrated by FIG. 5U). In some embodiments, a level of summarization is selected in accordance with the number of objects in the scene. In some embodiments, the level of summarization is selected from a plurality of levels of summarization. In some embodiments, the device identifies a length of the first audible description in accordance with each respective level of a plurality of levels of summarization, and selects a level of the plurality of levels of summarization at which the length of the first audible description meets predefined criteria. The first audible description is generated in accordance the selected level of summarization. In some embodiments, the predefined criteria include a criterion that the audible description not exceed N seconds in length, where N is a number between 2 and 15, or where N is a user selectable parameter (e.g., using a control in a settings user interface).

Selecting an appropriate level of summarization prevents bombarding the user with feedback and helps the user focus on important information about the image. Providing improved feedback for low vision and blind users enhances the operability of the device and makes the user-device interface more efficient (e.g., by helping the user to provide proper inputs and reducing the amount of effort required to take quality photographs).

The device detects (616) a user input that selects a respective object of the plurality of objects within the scene, as illustrated by FIGS. 5B, 5D, 5H, 5K and 5L. In some embodiments, the device includes (618) a touch-sensitive display. In some embodiments, the device displays a preview of the scene on the touch sensitive display. In some embodiments, the user input includes a contact on the touch-sensitive display, and selecting the respective object of the plurality of objects within the scene includes detecting a contact over a location of the respective object in the preview of the scene (e.g., as shown in FIGS. 5K-5L).

In some embodiments, selecting the respective object of the plurality of objects within the scene includes detecting movement of the contact over the location of the respective object in the preview of the scene. For example, when the first mode is active on the device, the device detects a contact (e.g., a finger) moving over the displayed preview. In response, when the contact is over a respective object, the device selects that object (e.g., the user input 538 selects bounding box 520 in FIGS. 5K-5L). In some embodiments, the device establishes a bounding box for each of the plurality of objects. In some embodiments, the bounding box is displayed in the preview (e.g., as shown in FIG. 5A). In some embodiments, the bounding box is not displayed in the preview (e.g., as shown in FIG. 5W). In some embodiments, the contact is considered to be at the location of the respective object in the preview of the scene when the contact enters the respective object's bounding box. In some embodiments, when the first mode is not active on the device, a user input that includes a contact (e.g., and movement of the contact) triggers different functionality on the device as compared to when the first mode is active on the device. For example, in some circumstances, a swipe gesture causes the device to enter into an alternate image acquisition mode (e.g., an image acquisition mode with a different image aspect ratio, a video acquisition mode, a slo-mo image acquisition mode (e.g., a video mode in which the image capture rate is increased relative to the video acquisition mode, as to provide a dramatic slo-motion effect when played back a standard frame rate), or time-lapse image acquisition mode), as shown in FIG. 5G when the accessibility mode is not active.

Allowing a user to select objects by moving (e.g., tracing) his or her finger over a live preview when an accessibility mode is active more efficiently customizes the user interface for low-vision and blind users. Providing improved inputs for performing an operation for low vision and blind users enhances the operability of the device and makes the user-device interface more efficient (e.g., by helping the user to provide proper inputs and reducing the amount of effort required to take quality photographs).

In some embodiments, selecting (620) the respective object of the plurality of objects within the scene includes detecting a predefined user input (e.g., a predefined gesture on a touch-sensitive surface) for selecting, in sequence, respective objects in the plurality of objects, for example as shown in FIGS. 5B-5E. In some embodiments, the predefined user input is a predefined gesture on a touch-sensitive display (e.g., that is displaying a live preview of the scene). In some embodiments, selection of the respective object is independent of the location of the predefined gesture. In some embodiments, the predefined gesture is a swipe gesture. In some embodiments, the predefined gesture is a gesture for selecting, in sequence, respective objects in the plurality of objects based on a determination that the first mode is active on the device. Thus, a visually-impaired user can cause the device to cycle through descriptions of the individual objects by repeatedly providing inputs to the device (e.g., by swiping anywhere on the display).

In some embodiments, when the first mode is not active on the device, the predefined gesture triggers different functionality on the device. For example, in some circumstances, a swipe gesture causes the device to enter into an alternate image acquisition mode (e.g., an image acquisition mode with a different image aspect ratio, a video acquisition mode, a slo-mo image acquisition mode, or time-lapse image acquisition mode). For example, as shown in FIGS.

5F-5G, when the first mode (e.g., the accessibility mode) is not active on the device, the user input causes the device to enter video mode.

Allowing a user to select objects in sequence when the accessibility mode is active (e.g., with a location-independent gesture, such as a swipe on the display) more efficiently customizes the user interface for low-vision and blind users. Providing improved inputs for performing an operation for low vision and blind users enhances the operability of the device and makes the user-device interface more efficient (e.g., by helping the user to provide proper inputs and reducing the amount of effort required to take quality photographs).

In response to the user input selecting the respective object within the scene, the device provides (622) a second audible description of the respective object (e.g., an object-level description). The second audible description is distinct from the first audible description and includes a description of one or more characteristics specific to the respective object (e.g., one or more characteristics that distinguish the respective object from other objects within the scene). For example, as shown in FIGS. 5B-5C, when the user selects bounding box 522, device 100 provides an audible description of the object corresponding to bounding box 522 (e.g., "A smiling, bearded man near the camera," or "A bearded man wearing sunglasses and a hat in the lower right corner of the screen," or "Alex is smiling in the lower right part of the screen," etc.). In some embodiments, the second audible description is provided while the first mode (e.g., the accessibility mode) is active on the device. In some embodiments, the second audible description is provided in accordance with a determination that the first mode is active on the device. In some embodiments, the second audible description does not include a description of other objects, besides the respective object, of the plurality of objects within the scene.

In some embodiments, the first audible description (e.g., the scene-level description) includes one or more first characteristics of the individual objects. For example, as described with reference to FIGS. 5A-5C and/or FIGS. 5V-5W, the first audible description identifies the people in the scene (e.g., by name) or states, e.g., "two people, one wearing glasses, the other wearing a hat." In some embodiments, the second audible description (e.g., the object-level description) includes one or more second characteristics of the respective object that are different from the one or more first characteristics of the respective object identified in the first audible description (e.g., the second audible description provides additional characteristics of the respective object that were not identified in the first audible description). For example, as described with reference to FIGS. 5A-5C, the first audible description identifies people in the scene by name, and the second audible description informs the user that the selected person has a beard and is wearing sunglasses.

In some embodiments, the device accesses (624) a multimedia collection that includes one or more photographs and/or videos that have been tagged with people and determines that the respective object corresponds to a person that has been tagged in the multimedia collection. In some embodiments, the multimedia collection is stored on the electronic device. At least one of the first audible description and the second audible description identifies the person (e.g., based on the tagging of the person in the multimedia collection), as described for FIG. 5E.

In some embodiments, as described with reference to FIGS. 5A-5C, the second audible description identifies (626) one or more visible characteristics of the person (e.g., whether the person is smiling or not smiling, has short hair or long hair, the color of the person's hair, whether the person has visible tattoos, facial hair, and/or glasses). In some embodiments, as illustrated with FIG. 5C, the second audible description identifies a location of the object in the scene. For example, as described with reference to FIGS. 5V-5W, the second audible description states "one person near the top right of the screen" or "one person centered in the scene." In some embodiments, the second audible description includes information indicating the proximity of the respective object to the camera (e.g., "one face, large face" or "one person near the camera" or "one person, far from the camera.")

In some embodiments, the second audible description updates as the one or more characteristics specific to the respective object change. In some embodiments, as described with reference to FIGS. 5V-5W, the device detects the change to the one or more characteristics of the respective object. For example, the second audible description at first states "one person near the top right of the screen," and later, when the person has been centered in the image, states "one person centered on the screen." In some embodiments, the first audible description also updates as the scene, as a whole, changes (e.g., in some embodiments, the device detects changes to the plurality of objects as a group, such as changes to the existing plurality of objects, an addition of an object (e.g., another person has entered the scene), or detects that an object is no longer present (e.g., a person has left the scene)).

Informing the user of who is in the camera view, and optionally identifying characteristics of the person by name (e.g., "Tim's face is centered") helps low-vision and blind users take quality photographs and understand the contents of their photographs. Providing improved feedback for low vision and blind users enhances the operability of the device and makes the user-device interface more efficient (e.g., by helping the user to provide proper inputs and reducing the amount of effort required to take quality photographs).

In some embodiments, the device identifies (628) one or more prominent objects of the plurality of objects (e.g., the object in bounding box 528 in FIG. 5M) and determines that the respective object is a respective prominent object of the one or more prominent objects. In some embodiments, the second audible description identifies the respective object as a prominent object. In some embodiments, the second audible description identifies a location of the respective prominent object within the image. For example, the second audible description states, "A plate of food is prominent within the image and near the top right corner of the image." As another example, in FIG. 5M, the device identifies a tree as a prominent object and describes the tree as being centered in the image.

Informing the user of which objects are prominent in an image helps low-vision and blind users take quality photographs and understand the contents of their photographs. Providing improved feedback for low vision and blind users enhances the operability of the device and makes the user-device interface more efficient (e.g., by helping the user to provide proper inputs and reducing the amount of effort required to take quality photographs).

In some embodiments, the device detects (630) a second user input (e.g., user input 532 shown on FIG. 5D). In some embodiments, the electronic device includes or is coupled with a touch-sensitive surface and detecting the second user input includes detecting a gesture on the touch-sensitive surface. In some embodiments, the display is a touch-sensitive display and detecting the second user input includes detecting a gesture on the touch-sensitive display. In some embodiments, detecting the gesture includes detecting a contact at a respective location in the preview that corresponds to a location of a second object of the plurality of objects within the scene, wherein the second object is distinct from the respective object. For example, FIGS. 5K-5L illustrate an example in which the device detects a finger moving around the touch-sensitive display and, in response, the device outputs descriptions of objects as the user's finger passes over the objects.

In some embodiments, in accordance with a determination that a first mode (e.g., an accessibility mode) is active on the device, the second user input selects a second object of the plurality of objects and provides a third audible description of the second object. For example, in FIGS. 5C-5E, after providing a description of the object corresponding to bounding box 522 (FIG. 5C), the device 100 detects user input 532 (FIG. 5D), and, in response, selects an object corresponding to bounding box 520 and gives a description of that object (FIG. 5E). In some embodiments, the third audible description includes a description of one or more characteristics specific to the second object. In some embodiments, the third audible description does not include a description of other objects, besides the second object, of the plurality of objects within the scene.

In some embodiments, in accordance with a determination that the first mode is not active on the device, the device performs a respective operation that does not include providing a description of the second object. In some embodiments, the second user input is a predefined user input associated with the respective operation when the first mode is not active on the device. For example, when the first mode is not active on the device, in response to detecting a tap gesture on the touch-sensitive display, the device adjusts one or more settings of the camera (such as an exposure, or focus) based on properties of the object at the respective location. For example, and as described in more detail below, when the first mode is not active on the device, user input 536 in FIG. 5H initiates focus indicator 550 in FIG. 5J.

In some embodiments, the electronic device includes (632) a camera and the respective operation includes focusing the camera at a location corresponding to the second user input (e.g., when the user input includes a contact over a live preview of the scene (e.g., displayed on a touch-sensitive display), the camera focuses at a location of the contact over the live preview).

In some embodiments, while the first mode is active (634) on the device, the device detects a predefined user input (e.g., a predefined gesture on the touch-sensitive surface) for performing the respective operation when the device is in the first mode. In response to detecting the predefined user input, the device performs the respective operation. In some embodiments, the predefined user input includes double tapping on the touch-sensitive surface. For example, in response to detecting a double tap gesture on the touch-sensitive display when the device is in the first mode, the device focuses the camera on the selected object. In some embodiments, the location of the double tap does not need to be over the selected object (e.g., in response to detecting a double tap anywhere on the touch-sensitive surface, the device focuses the camera on the selected object). In some embodiments, when the first mode is not active on the device, in response to detecting a double tap on the touch-sensitive surface, the device focuses the camera at a location that corresponds to the location of the double tap.

Repurposing a predefined input (e.g., a tap gesture on a live preview) when an accessibility mode is active, as compared to when the accessibility mode is not active, allows the user input to be more efficiently customized for low vision and blind users. For example, it is not particularly helpful to blind users for the device to focus the camera at a location of a tap on a live preview. Instead, it is much more helpful to allow a user to navigate between objects in the scene (e.g., with a location-independent input) and, subsequently, allow the user to choose a selected object on which to focus the camera. Providing improved inputs for performing an operation for low vision and blind users enhances the operability of the device and makes the user-device interface more efficient (e.g., by helping the user to provide proper inputs and reducing the amount of effort required to take quality photographs).

In some embodiments, the device detects (636) a plurality of people in the scene (e.g., as shown in FIGS. 5U and 5V). In accordance with a determination that a number of people in the scene is less than a threshold number of people, the device identifies individual people of the plurality of people in the scene (e.g., in the first audible description of the scene). In some embodiments, in accordance with a determination that a number of people in the scene is less than a threshold number of people, the first audible description identifies individual people of the plurality of people in the scene (e.g., as depicted in FIG. 5V). In accordance with a determination that the number of people in the scene is more than the threshold number of people, the device identifies the number of people in the scene (e.g., as depicted in FIG. 5V). In some embodiments, in accordance with a determination that the number of people in the scene is more than the threshold number of people, the first audible description does not identify individual people of the plurality of people in the scene. In some embodiments, when the first audible description does not identify individual people in the scene, the second audible description does identify individual people in the scene (e.g., the device identifies an individual person in the scene in response to detecting a user input selecting an object or bounding box corresponding to the person, as described above).

Selecting an appropriate level of summarization prevents bombarding the user with feedback and helps the user focus on important information about the image. Providing improved feedback for low vision and blind users enhances the operability of the device and makes the user-device interface more efficient (e.g., by helping the user to provide proper inputs and reducing the amount of effort required to take quality photographs).

It should be understood that the particular order in which the operations in FIGS. 6A-6C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6C. For example, the contacts, gestures, user interface objects, and focus selectors described above with reference to method 600 optionally have one or more of the characteristics of the contacts, gestures, user interface objects, and focus selectors described herein with reference to other methods described herein (e.g., method 700). For brevity, these details are not repeated here.

FIGS. 7A-7B are flow diagrams illustrating a method 700 for providing users (e.g., low-vision and blind users) with non-visual assistance for composing artistic photographs, in accordance with some embodiments. Method 700 is performed at an electronic device (e.g., device 300, FIG. 3, or portable multifunction device 100, FIG. 1A) with a camera. In some embodiments, the device includes a display and a touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

Taking a photograph is one of the most important features of any modern smartphone (or other portable multifunction device). Whether it is capturing a memory for a personal library, or for communicating on social media, users are constantly taking and sharing photos. Therefore, it is essential that all users, including low-vision and blind users, be able to take basic photographs, and desirable that they be able to take beautiful and artistic photographs.

Due to the inherent visual aspects of photography, it is difficult for low-vision and blind users to take great photographs with standard user interfaces. For example, the "rule of thirds" in photography suggests that an image should be compositionally divided into nine equal parts by two equally spaced horizontal lines and two equally spaced vertical lines (e.g., a three-by-three grid), and that important compositional elements should be placed along these lines or their intersections. Aligning important compositional elements with these lines creates more tension, energy and interest in the composition than simply centering the subject. However, it is difficult with conventional user interfaces for low-vision and blind users to align compositional elements within images.

As described below, method 700 aids low-vision and blind users in taking high-quality, artistic photographs by providing audible descriptions of images with respect to a set of divisions of the image (e.g., a three-by-three grid). Providing audible descriptions of images with respect to a set of divisions enhances the operability of the device and makes the user-device interface more efficient (e.g., by reducing the number of attempts that a low-vision or blind user must go through to take artistic photographs). For battery-operated electronic devices, allowing low vision and blind users to take quality photographs more efficiently conserves power and increases the time between battery charges.

In some embodiments, the electronic device obtains (702), with the camera, one or more images of a scene (e.g., as shown in FIG. 5X, where the images are displayed in a live preview of image content being captured by the camera). In some embodiments, the live preview is displayed as part of an image capture user interface (e.g., within a camera application). In some embodiments, the live preview is displayed in a camera mini-application in a messaging user interface (e.g., of a messaging application).

The device detects (704) a respective feature within the scene. In some embodiments, the respective feature is (706) an object (e.g., the objects include people, as described with reference to FIG. 5AA). In some embodiments, a detected object is a feature in the foreground of the scene. In some embodiments, a detected object is a feature that is selectable within the image. In some embodiments, a detected object is a feature associated with a bounding box within the image. In some embodiments, detected objects include people, food, plants, and/or animals. In some embodiments, the detected respective feature is (708) a background element of the scene (e.g., the horizon 580 in FIG. 5X). In some embodiments, a detected feature is not an object when it is part of the background of the scene. In some embodiments, detected features are not objects when they are not associated with bounding boxes within the image. In some embodiments, detected features that are not objects include the sky, the horizon, and background or foreground surfaces (e.g., land, ocean). In some embodiments, the respective feature that is not an object extends beyond opposing edges of the one or more images of the scene. In some embodiments, the scene includes a background having a background element, and the first audible description of the scene identifies the background element as part of the background of the scene.

Providing audible descriptions of background elements of the scene, such as the horizon 580 in FIG. 5X, with respect to the first set of divisions, allows low-vision and blind users to compose images in which the background plays a role in creating tension, energy and interest in the composition. Thus, providing audible descriptions of background elements of the scene, with respect to the first set of divisions, enhances the operability of the device and makes the user-device interface more efficient (e.g., by reducing the number of attempts that a low-vision or blind user must go through to take artistic photographs). For battery-operated electronic devices, allowing low vision and blind users to take quality photographs more efficiently conserves power and increases the time between battery charges.

In response to detecting the respective feature within the scene and in accordance with a determination that a first mode (e.g., an artistic accessibility mode) is active on the device, the device provides (710) a first audible description of the scene, wherein the first audible description provides information indicating a size and/or position of the respective feature relative to a first set of divisions applied to the one or more images of the scene. In some embodiments, the first audible description updates as the size and/or position of the respective feature changes (e.g., as the user changes the position, orientation or pose of the device, and/or as objects in the scene change position, orientation or pose) relative to the first set of divisions. For example, as described with reference to FIGS. 5Y-5W, the first audible description includes information indicating the position of the horizon 580 in the scene, and updates as the position changes (FIG. 5W). In some embodiments, the method includes detecting the change in the size and/or position of the respective feature relative to the first set of divisions.

In some embodiments, the first set of divisions is (712) a three-by-three grid (e.g., the grid 590 in FIG. 5Y). In some embodiments, the first set of divisions divides the scene into three sections in the horizontal dimension. In some embodiments, the first set of divisions divides the scene into three sections in the vertical dimension. In some embodiments, the first set of divisions is a two-by-two grid, or a four-by-four grid, or a five-by-five grid. In some embodiments, there are an unequal number of divisions (e.g., sections) in the horizontal dimension as compared to the vertical dimension (e.g., a three-by-two grid). In some embodiments, the first audible description provides (714) a suggestion to move the device so as to position the respective feature within a left, right, top, or bottom third of the three-by-three grid. In some embodiments, the first audible description provides a suggestion to move the device so as to position the respective feature to substantially occupy the left, right, top, or bottom third of the three-by-three grid (e.g., either by moving the camera left/right/up/down or moving the camera (or zooming the camera) closer or farther from the feature).

In some embodiments, the first audible description provides (716) a suggestion to move the device to position the respective feature at a boundary of the first set of divisions (e.g., a line of the grid). As illustrated with FIG. 5Z, in some embodiments, the first audible description provides a suggestion to move the device to position a horizontal feature (e.g., the horizon) at a horizontal boundary of the first set of divisions or position a vertical feature at a vertical boundary of the first set of divisions. In some embodiments, the device detects (718) a plurality of features within the scene (e.g., as illustrated in FIG. 5AA). In some embodiments, the first audible description provides information indicating sizes and/or positions of the plurality of features relative to the first grid.

Providing audible descriptions of a plurality of features within the scene, as described with reference to FIG. 5AA (showing that the device has detected two people, the sky, and the llama) allows low-vision and blind users to choose which features are compositionally important and, thus, which features should align with the first set of divisions. Thus, providing audible descriptions of a plurality of features within the scene enhances the operability of the device and makes the user-device interface more efficient (e.g., by reducing the number of attempts that a low-vision or blind user must go through to take artistic photographs). For battery-operated electronic devices, allowing low vision and blind users to take quality photographs more efficiently conserves power and increases the time between battery charges.

In some embodiments, the device detects (720) a plurality of features within the scene. In some embodiments, the device identifies one or more of the plurality of features as prominent features in the scene (e.g., the device identifies that the people in FIG. 5AA, corresponding to bounding boxes 520/522, are prominent features in the scene). In some embodiments, the first audible description provides information indicating sizes and/or positions of the prominent features without providing information indicating sizes and/or positions of other features of the plurality of the features that were not identified as prominent features in the scene (e.g., without providing information indicating the size and/or position of other features besides the prominent features). In some embodiments, the respective feature is a most prominent object in the scene and the first audible description provides information indicating a size and/or position of the most prominent object in the scene, e.g., without providing information indicating the size and/or position of other features besides the most prominent feature (e.g., as shown in FIG. 5M).

Providing information indicating sizes and/or positions of the prominent features (e.g., the people shown in FIG. 5AA) without providing information indicating sizes and/or positions of other features of the plurality of the features that were not identified as prominent features in the scene helps low-vision and blind users to compose quality photographs by helping place important compositional elements along the first set of divisions. Thus, providing information about prominent features with respect to the first set of divisions enhances the operability of the device and makes the user-device interface more efficient (e.g., by reducing the number of attempts that a low-vision or blind user must go through to take a photograph). For battery-operated electronic devices, allowing low vision and blind users to take quality photographs more efficiently conserves power and increases the time between battery charges.

In response to detecting the respective feature within the scene and in accordance with a determination that the first mode is not active on the device (e.g., in accordance with a determination that a standard accessibility mode, as opposed to the artistic accessibility mode, is active on the device), the device provides (722) a second audible description of the plurality of objects, wherein the second audible description is distinct from the first audible description and does not include the information indicating the size and/or position of the respective feature relative to the first set of divisions. In some embodiments, the second audible description does not provide information indicating a size and/or position of the respective feature relative to the first set of divisions applied to the one or more images of the scene. In some embodiments, the second audible description updates as the size and/or position of the respective feature changes relative to the boundary and/or center of the one or more images. In some embodiments, the method includes detecting the change in the size and/or position of the respective feature relative to the boundary and/or center of the one or more images. For example, FIG. 5X illustrates device 100 displaying a live preview in a standard accessibility mode and providing an audible description of the scene such as "A landscape" or "The horizon is at a distance from the camera in the center of the image." Further, in some embodiments, FIGS. 5A-5W provide examples in which the device is in a standard accessibility mode.

In some embodiments, the second audible description includes (724) information indicating the size and/or position of the respective feature relative to one or more boundaries of the image. For example, in FIG. 5B, in some embodiments, the description of the object in bounding box 522 includes "A smiling, bearded man near the camera on the right edge of the image," or "A bearded man wearing sunglasses and a hat in the lower right corner of the screen.") In some embodiments, the second audible description includes information indicating the size and/or position of the respective feature relative to a center of the image rather than the first set of boundaries. For example, in FIG. 5V, in some embodiments, the description of includes identifying one or more people centered in the image.

Providing information indicating the size and/or position of the respective feature relative to one or more boundaries of the image (e.g., without providing information indicating the size and/or position of the respective feature relative to the first set of divisions, as described with reference to FIGS. 5A-5X) allows low-vision and blind users to take quality photographs of varying styles (e.g., quality selfies versus artistic photos). Thus, providing different audible descriptions depending on whether the first mode is active on the device enhances the operability of the device and makes the user-device interface more efficient (e.g., by reducing the number of attempts that a low-vision or blind user must go through to take a photograph). For battery-operated electronic devices, allowing low vision and blind users to take quality photographs more efficiently conserves power and increases the time between battery charges.

In some embodiments, the device detects (726) a plurality of features within the scene and detects a user input that selects a second feature, distinct from the respective feature, of the plurality of features within the scene. For example, in some embodiments, a user selects features in FIG. 5AA in an analogous manner to selection of objects, as described with reference to FIGS. 5B-5E. In some embodiments, in response to the user input selecting the second feature within the scene, in accordance with a determination that the first mode is active on the device, the method includes providing a third audible description of the second feature, wherein the third audible description provides information indicating a size and/or position of the second feature relative to the first grid (e.g., without providing information indicating the size and/or position of the respective feature). In some embodiments, the second feature is a selected object in the scene (e.g., selected as described above with reference to method 600) and the third audible description provides information indicating a size and/or position of the selected object in the scene. Thus, in some embodiments, a user selects any of the objects shown in FIGS. 5A-5W, and when the first mode (e.g., the artistic accessibility mode) is active on the device, the device provides a description of the selected object with reference to the set of divisions shown in FIGS. 5X-5AA.

In some embodiments, in accordance with a determination that the first mode is not active on the device, the third audible description does not include the information indicating the size and/or position of the second feature relative to the first set of divisions. In some embodiments, the third audible description provides information indicating a size and/or position of the second feature relative to the boundary and/or center of the one or more images.

Allowing a user to select which feature is compositionally important, and providing information indicating the size and/or position of the selected feature helps low-vision and blind users to compose quality photographs by helping place important compositional elements along the first set of divisions. Thus, providing information about selected features with respect to the first set of divisions enhances the operability of the device and makes the user-device interface more efficient (e.g., by reducing the number of attempts that a low-vision or blind user must go through to take a photograph). For battery-operated electronic devices, allowing low vision and blind users to take quality photographs more efficiently conserves power and increases the time between battery charges.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7B. For example, the contacts, gestures, user interface objects, and focus selectors described above with reference to method 700 optionally have one or more of the characteristics of the contacts, gestures, user interface objects, and focus selectors described herein with reference to other methods described herein (e.g., method 600). For brevity, these details are not repeated here.

The operations described above with reference to FIGS. 6A-6C and 7A-7B are, optionally, implemented by components depicted in FIGS. 1A-1B. For example, the user input detection operation described in 726 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
   at an electronic device with a camera:
   obtaining, with the camera, one or more images of a scene;
   detecting a respective feature within the scene; and
   in response to detecting the respective feature within the scene:
   in accordance with a determination that a first mode is active on the electronic device, providing a first audible description of the scene, wherein the first audible description provides information indicating a size and/or position of the respective feature relative to a first set of divisions applied to the one or more images of the scene; and
   in accordance with a determination that the first mode is not active on the electronic device, providing a second audible description of a plurality of objects in the scene, wherein the second audible description is distinct from the first audible description and does not include the information indicating the size and/or position of the respective feature relative to the first set of divisions.

2. The method of claim 1, wherein the first set of divisions is a three-by-three grid.

3. The method of claim 2, wherein the first audible description provides a suggestion to move the electronic device to position the respective feature within a left, right, top, or bottom third of the three-by-three grid in accordance with a composition rule applied by the electronic device.

4. The method of claim 1, wherein the first audible description provides a suggestion to move the electronic device to position the respective feature at a boundary of the first set of divisions based on application of a composition rule by the electronic device.

5. The method of claim 1, further including:
   detecting a plurality of features within the scene;
   wherein the first audible description provides information indicating sizes and/or positions of the plurality of features relative to the first set of divisions.

6. The method of claim 1, wherein the respective feature is an object.

7. The method of claim 1, wherein the respective feature is a background element of the scene.

8. The method of claim 1, wherein the second audible description includes information indicating the size and/or position of the respective feature relative to one or more boundaries of a respective image of the one or more images of the scene.

9. The method of claim 1, further including:
detecting a plurality of features within the scene; and
identifying one or more of the plurality of features as prominent features in the scene;
wherein the first audible description provides information indicating sizes and/or positions of the prominent features without providing information indicating sizes and/or positions of other features of the plurality of the features that were not identified as prominent features in the scene.

10. The method of claim 1, further including:
detecting a plurality of features within the scene;
detecting a user input that selects a second feature, distinct from the respective feature, of the plurality of features within the scene; and
in response to the user input selecting the second feature within the scene, in accordance with a determination that the first mode is active on the electronic device, providing a third audible description of the second feature, wherein the third audible description provides information indicating a size and/or position of the second feature relative to the first set of divisions.

11. The method of claim 1, wherein the first set of divisions compositionally divide the scene in accordance with application of a composition rule by the electronic device to facilitate improving composition of a subsequent image of the scene.

12. The method of claim 1, further comprising, in accordance with a determination that the first mode is active on the electronic device and a change in position of the camera, providing an updated audible description of the scene to facilitate improved composition of a subsequent image of the scene.

13. An electronic device, comprising:
a camera;
one or more processors; and
memory storing one or more programs, wherein the one or more programs are configured to be executed by the one or more processors, the one or more programs including instructions for:
obtaining, with the camera, one or more images of a scene;
detecting a respective feature within the scene; and
in response to detecting the respective feature within the scene:
in accordance with a determination that a first mode is active on the electronic device, providing a first audible description of the scene, wherein the first audible description provides information indicating a size and/or position of the respective feature relative to a first set of divisions applied to the one or more images of the scene; and
in accordance with a determination that the first mode is not active on the electronic device, providing a second audible description of a plurality of objects in the scene, wherein the second audible description is distinct from the first audible description and does not include the information indicating the size and/or position of the respective feature relative to the first set of divisions.

14. The electronic device of claim 13, wherein the first set of divisions is a three-by-three grid.

15. The electronic device of claim 14, wherein the first audible description provides a suggestion to move the electronic device to position the respective feature within a left, right, top, or bottom third of the three-by-three grid in accordance with a composition rule applied by the electronic device.

16. The electronic device of claim 13, wherein the first audible description provides a suggestion to move the electronic device to position the respective feature at a boundary of the first set of divisions based on application of a composition rule by the electronic device.

17. The electronic device of claim 13, wherein the one or more programs include instructions for:
detecting a plurality of features within the scene;
wherein the first audible description provides information indicating sizes and/or positions of the plurality of features relative to the first set of divisions.

18. The electronic device of claim 13, wherein the respective feature is an object.

19. The electronic device of claim 13, wherein the respective feature is a background element of the scene.

20. The electronic device of claim 13, wherein the second audible description includes information indicating the size and/or position of the respective feature relative to one or more boundaries of a respective image of the one or more images of the scene.

21. The electronic device of claim 13, wherein the one or more programs include instructions for:
detecting a plurality of features within the scene; and
identifying one or more of the plurality of features as prominent features in the scene;
wherein the first audible description provides information indicating sizes and/or positions of the prominent features without providing information indicating sizes and/or positions of other features of the plurality of the features that were not identified as prominent features in the scene.

22. The electronic device of claim 13, wherein the one or more programs include instructions for:
detecting a plurality of features within the scene;
detecting a user input that selects a second feature, distinct from the respective feature, of the plurality of features within the scene; and
in response to the user input selecting the second feature within the scene, in accordance with a determination that the first mode is active on the electronic device, providing a third audible description of the second feature, wherein the third audible description provides information indicating a size and/or position of the second feature relative to the first set of divisions.

23. The electronic device of claim 13, wherein the first set of divisions compositionally divide the scene in accordance with application of a composition rule by the electronic device to facilitate improving composition of a subsequent image of the scene.

24. The electronic device of claim 13, wherein the one or more programs include instructions for, in accordance with a determination that the first mode is active on the electronic device and a change in position of the camera, providing an updated audible description of the scene to facilitate improved composition of a subsequent image of the scene.

25. A non-transitory computer readable storage medium storing one or more programs, the one or more programs comprising instructions, which, when executed by an electronic device with a camera, cause the electronic device to:

obtain, with the camera, one or more images of a scene;
detect a respective feature within the scene; and
in response to detecting the respective feature within the scene:
  in accordance with a determination that a first mode is active on the electronic device, provide a first audible description of the scene, wherein the first audible description provides information indicating a size and/or position of the respective feature relative to a first set of divisions applied to the one or more images of the scene; and
  in accordance with a determination that the first mode is not active on the electronic device, provide a second audible description of a plurality of objects in the scene, wherein the second audible description is distinct from the first audible description and does not include the information indicating the size and/or position of the respective feature relative to the first set of divisions.

26. The non-transitory computer readable storage medium of claim 25, wherein the first set of divisions is a three-by-three grid.

27. The non-transitory computer readable storage medium of claim 26, wherein the first audible description provides a suggestion to move the electronic device to position the respective feature within a left, right, top, or bottom third of the three-by-three grid in accordance with a composition rule applied by the electronic device.

28. The non-transitory computer readable storage medium of claim 25, wherein the first audible description provides a suggestion to move the electronic device to position the respective feature at a boundary of the first set of divisions based on application of a composition rule by the electronic device.

29. The non-transitory computer readable storage medium of claim 25, wherein the one or more programs include instructions for:
  detecting a plurality of features within the scene;
  wherein the first audible description provides information indicating sizes and/or positions of the plurality of features relative to the first set of divisions.

30. The non-transitory computer readable storage medium of claim 25, wherein the respective feature is an object.

31. The non-transitory computer readable storage medium of claim 25, wherein the respective feature is a background element of the scene.

32. The non-transitory computer readable storage medium of claim 25, wherein the second audible description includes information indicating the size and/or position of the respective feature relative to one or more boundaries of a respective image of the one or more images of the scene.

33. The non-transitory computer readable storage medium of claim 25, wherein the one or more programs include instructions for:
  detecting a plurality of features within the scene; and
  identifying one or more of the plurality of features as prominent features in the scene;
  wherein the first audible description provides information indicating sizes and/or positions of the prominent features without providing information indicating sizes and/or positions of other features of the plurality of the features that were not identified as prominent features in the scene.

34. The non-transitory computer readable storage medium of claim 25, wherein the one or more programs include instructions for:
  detecting a plurality of features within the scene;
  detecting a user input that selects a second feature, distinct from the respective feature, of the plurality of features within the scene; and
  in response to the user input selecting the second feature within the scene, in accordance with a determination that the first mode is active on the electronic device, providing a third audible description of the second feature, wherein the third audible description provides information indicating a size and/or position of the second feature relative to the first set of divisions.

35. The non-transitory computer readable storage medium of claim 25, wherein the first set of divisions compositionally divide the scene in accordance with application of a composition rule by the electronic device to facilitate improving composition of a subsequent image of the scene.

36. The non-transitory computer readable storage medium of claim 25, wherein the one or more programs include instructions for, in accordance with a determination that the first mode is active on the electronic device and a change in position of the camera, providing an updated audible description of the scene to facilitate improved composition of a subsequent image of the scene.

* * * * *